(12) United States Patent
Mitsuda et al.

(10) Patent No.: US 10,371,040 B2
(45) Date of Patent: Aug. 6, 2019

(54) ENGINE DEVICE AND STATIONARY WORK MACHINE HAVING SAME MOUNTED THEREON

(71) Applicant: YANMAR CO., LTD., Osaka-shi, Osaka (JP)

(72) Inventors: Masataka Mitsuda, Osaka (JP); Hokuto Kusaka, Osaka (JP); Masayuki Yamada, Osaka (JP); Isao Taguchi, Osaka (JP); Yoshiaki Shibata, Osaka (JP)

(73) Assignee: YANMAR CO., LTD., Osaka (JP)

( * ) Notice: Subject to any disclaimer, the term of this patent is extended or adjusted under 35 U.S.C. 154(b) by 15 days.

(21) Appl. No.: 15/270,736

(22) Filed: Sep. 20, 2016

(65) Prior Publication Data
US 2017/0009639 A1    Jan. 12, 2017

Related U.S. Application Data

(63) Continuation of application No. PCT/JP2015/056659, filed on Mar. 6, 2015.

(30) Foreign Application Priority Data

Mar. 20, 2014 (JP) .................................. 2014-059103
Mar. 20, 2014 (JP) .................................. 2014-059112
Mar. 25, 2014 (JP) .................................. 2014-062475

(51) Int. Cl.
*F01N 3/10* (2006.01)
*F01N 3/28* (2006.01)
(Continued)

(52) U.S. Cl.
CPC ................ *F01P 3/20* (2013.01); *F01N 3/021* (2013.01); *F01N 3/023* (2013.01); *F01N 3/0231* (2013.01);
(Continued)

(58) Field of Classification Search
CPC ............. F01N 13/0097; F01N 13/1855; F01N 2340/04; F01N 2560/06; F01N 2560/08;
(Continued)

(56) References Cited

U.S. PATENT DOCUMENTS 8,327,811 B2 * 12/2012 Hokimoto .............. B60K 11/04
123/41.04
9,291,097 B2 * 3/2016 Roozenboom .......... F02B 77/11
(Continued)

FOREIGN PATENT DOCUMENTS

JP   10-115216 A    5/1998
JP   2000-145430 A    5/2000
(Continued)

OTHER PUBLICATIONS

JP2012184602 (provided in IDS) English Machine Tranlsation.*

Primary Examiner — Audrey K Bradley
Assistant Examiner — Anthony Ayala Delgado
(74) Attorney, Agent, or Firm — Norton Rose Fulbright US LLP

(57) ABSTRACT

An engine includes an exhaust-gas purification device. The exhaust-gas purification device purifies exhaust gas. The exhaust-gas purification device includes electrical components. The electrical components detect the states of the exhaust-gas purification device. The engine includes a cooling-water circulation mechanism for circulating cooling water for the engine. Further, a portion of the cooling water circulated by the cooling-water circulation mechanism cools the electrical components.

18 Claims, 33 Drawing Sheets

(51) Int. Cl.
*F01P 3/20* (2006.01)
*F01P 5/02* (2006.01)
*F01P 7/02* (2006.01)
*F01N 11/00* (2006.01)
*F01N 13/00* (2010.01)
*F01N 13/08* (2010.01)
*F01N 13/10* (2010.01)
*F01N 13/18* (2010.01)
*F01N 3/021* (2006.01)
*F01N 3/023* (2006.01)
*F02B 63/04* (2006.01)

(52) U.S. Cl.
CPC ............ *F01N 3/103* (2013.01); *F01N 3/106* (2013.01); *F01N 11/00* (2013.01); *F01N 13/0097* (2014.06); *F01N 13/08* (2013.01); *F01N 13/10* (2013.01); *F01N 13/1805* (2013.01); *F01N 13/1855* (2013.01); *F01P 5/02* (2013.01); *F01P 7/02* (2013.01); *F02B 63/04* (2013.01); *F01N 3/2885* (2013.01); *F01N 2260/024* (2013.01); *F01N 2340/04* (2013.01); *F01N 2560/06* (2013.01); *F01N 2560/08* (2013.01); *F01N 2590/08* (2013.01); *F01N 2590/10* (2013.01); *Y02T 10/47* (2013.01)

(58) Field of Classification Search
CPC .. F01N 2590/08; F01N 2590/10; F01N 3/021; F01N 3/023; F01N 3/0231; F01P 3/20; F01P 5/02; F01P 7/02
See application file for complete search history.

(56) References Cited

U.S. PATENT DOCUMENTS

| | | | |
|---|---|---|---|
| 2010/0043414 | A1 | 2/2010 | Hirose |
| 2011/0120085 | A1* | 5/2011 | Saito .................... F01N 3/0211 60/272 |
| 2013/0203309 | A1 | 8/2013 | Suzuki |

FOREIGN PATENT DOCUMENTS

| | | |
|---|---|---|
| JP | 2002-238214 A | 8/2002 |
| JP | 2002-326520 A | 11/2002 |
| JP | 2003-042885 A | 2/2003 |
| JP | 2007-182705 A | 7/2007 |
| JP | 2008-106727 A | 5/2008 |
| JP | 2008-247084 A | 10/2008 |
| JP | 2010-164021 A | 7/2010 |
| JP | 2012-117384 A | 6/2012 |
| JP | 2012-184602 A | 9/2012 |
| JP | 2013-076367 A | 4/2013 |
| JP | 2013-160202 A | 8/2013 |
| JP | 2014-025404 A | 2/2014 |
| JP | 2014-029157 A | 2/2014 |

* cited by examiner

ENGINE DEVICE AND STATIONARY WORK MACHINE HAVING SAME MOUNTED THEREON

CROSS-REFERENCE TO RELATED APPLICATIONS

The present application is a continuation application of International Application No. PCT/JP2015/56659, filed Mar. 6, 2015, which claims priority to Japanese Patent Application No. 2014-59103, filed Mar. 20, 2014, Japanese Patent Application No. 2014-59112, filed Mar. 20, 2014, and Japanese Patent Application No. 2014-62475, filed Mar. 25, 2014. The contents of these applications are incorporated herein by reference in their entirety.

BACKGROUND OF THE INVENTION

The present invention relates to an engine device and a stationary work machine having the same mounted thereon.

To date, technologies that allow an exhaust-gas purification device (a diesel particulate filter) to be disposed in an exhaust path for an engine to allow an oxidation catalyst, a soot filter, or any other similar assembly included in the exhaust-gas purification device to perform purification processing on exhaust gas discharged from the diesel engine have been developed (see, for example, Japanese Unexamined Patent Application Publication No. 2000-145430). Further, recently, for the purpose of environmental measures, in the field of work machines, such as construction machines and agricultural machines, an exhaust-gas purification device has been required to be installed in a diesel engine used in such a work machine (see, for example, Japanese Unexamined Patent Application Publication No. 2007-182705).

In order to perform appropriate oxidation processing, an oxidation catalyst provided in such an exhaust-gas purification device measures exhaust gas temperature inside the exhaust-gas purification device to adjust the temperature of the exhaust gas to a predetermined temperature. Further, in a soot filter, a clogging state due to accumulation of collected particulate matter occurs, and thus, in an exhaust-gas purification device, the clogging state is detected through a measurement of an exhaust gas pressure, and the collected particulate matter is forcibly burned. For these reasons, electrical components, such as a temperature sensor for measuring the exhaust gas temperature and a pressure sensor for measuring exhaust gas pressure are attached to the exhaust-gas purification device.

SUMMARY OF THE INVENTION

By the way, when such an exhaust-gas purification device is installed, even though just a method of disposing an exhaust-gas purification device in substitution for a sound absorber (muffler) is employed, the exhaust-gas purification device is significantly heavier than the sound absorber. For this reason, even though a supporting structure for a sound absorber in a construction machine disclosed in Japanese Unexamined Patent Application Publication No. 2007-182705 is employed as a supporting structure for an exhaust-gas purification device, it may be difficult to stably assemble the exhaust-gas purification device.

Further, since high-temperature gas flows inside the exhaust-gas purification device, the exhaust-gas purification device becomes a high-temperature heat source. Thus, when electrical components, such as a pressure sensor and a temperature sensor provided in the exhaust-gas purification device, are disposed near an exhaust-gas purification case as disclosed in Japanese Unexamined Patent Application Publication No. 2010-043572, the electrical components are influenced by radiant heat from the exhaust-gas purification device. For this reason, electrical components attached to the exhaust-gas purification device are likely to fail because of heat from the exhaust-gas purification device and an engine. Particularly when such a failure occurs in a temperature sensor and/or a pressure sensor, it is not easy to confirm a state of the exhaust-gas purification device, and thus, a clogging state inside the device is not eliminated, and as a result, a failure, such as an engine stall, occurs.

Accordingly, it is a first object of the present invention to provide an engine device on which enhancement resulting from consideration of the above present situation has been made.

By the way, when an exhaust-gas purification device is installed in a machine chassis of, for example, a stationary work machine, heated air is likely to be confined and accumulated inside the machine chassis after the stop of the engine. For this reason, it is difficult to reduce the occurrence of heat damage on the exhaust-gas purification device itself, the machine chassis, and any other equipment. Thus, it is a second object of the present invention to reduce the occurrence of heat damage on the exhaust-gas purification device itself, the machine chassis, and any other equipment.

According to the invention according to a first aspect of the present invention, an engine device includes an engine, an exhaust-gas purification device configured to purify exhaust gas from the engine, at least one electrical component configured to detect a state of the exhaust-gas purification device, and a cooling-water circulation mechanism configured to circulate cooling water for cooling the engine. Further, a portion of the cooling water circulated by the cooling-water circulation mechanism cools the at least one electrical component.

According to the invention according to a second aspect of the present invention, the engine device according to the first aspect of the present invention may further include an exhaust-gas purification case included in the exhaust-gas purification device, a support bracket secured to the exhaust-gas purification case and supporting the at least one electrical component, and a cooling-water supply tube disposed on the support bracket and configured to allow the portion of the cooling water, circulated by the cooling-water circulation mechanism, to be flown in the cooling-water supply tube itself.

According to the invention according to a third aspect of the present invention, in the engine device according to the second aspect of the present invention, the support bracket may support the at least one electrical component at a position outside the exhaust-gas purification device, and the cooling-water supply tube may be disposed at a position between the at least one electrical component and the exhaust-gas purification device.

According to the invention according to a fourth aspect of the present invention, the engine device according to any one of the first to third aspects of the present invention may further include a flywheel housing disposed at one side of the engine, and a crankshaft for the engine. Further, the exhaust-gas purification device may be disposed on the flywheel housing so as to allow the long-length direction of the exhaust-gas purification device itself to be a direction perpendicular to the crankshaft.

According to the invention according to a fifth aspect of the present invention, in the engine device according to the first aspect of the present invention, the at least one electrical component may be disposed at a position located at the outside of the exhaust-gas purification device and located at the upstream side in a direction in which the exhaust gas moves in the inside of the exhaust-gas purification device.

According to the invention according to a sixth aspect of the present invention, the engine device according to the fifth aspect of the present invention may further include an exhaust manifold disposed at one side of the engine, and an exhaust-gas introduction unit coupling the exhaust-gas purification device to the exhaust manifold. Further, with the support bracket, secured to one end face of the exhaust-gas purification case of the exhaust-gas purification device, the at least one electrical component may be disposed at a position outside the exhaust-gas introduction unit.

According to the invention according to a seventh aspect of the present invention, the engine device according to the first aspect of the present invention may further include a cooling fan disposed at one side of the engine, a flywheel housing disposed at the other side of the engine, and a flywheel disposed inside the flywheel housing. Further, the flywheel may be coupled to the work unit so as to transfer engine power to the work unit, and the exhaust-gas purification device may be disposed at an upper-face side of the flywheel housing to allow the exhaust-gas purification device to be located above the work unit.

According to the invention according to an eighth aspect of the present invention, a stationary work machine includes a work unit serving as a compressor or a power generator, the engine device according to the seventh aspect of the present invention, a chassis containing the work unit and the engine device, and a ventilation opening disposed in an upper face of the chassis and configured to bring the inside and the outside of the chassis into communication with each other allow, and to allow the exhaust-gas purification device, included in the engine device, to face the ventilation opening itself from below.

According to the invention according to a ninth aspect of the present invention, the stationary work machine according to the eighth aspect of the present invention may further include a shutter plate disposed inside the chassis and may be configured to, when the engine, included in the engine device, is in a driven state, allow cooling wind from the cooling fan, included in the engine device, to shut the ventilation opening, and to, when the engine is in a stop state, allow the ventilation opening to open by weight of the shutter plate itself.

According to the invention according to a tenth aspect of the present invention, a stationary work machine includes a work unit serving as a compressor or a power generator, the engine device according to the seventh aspect of the present invention, a chassis containing the work unit and the engine device, a ventilation opening disposed in an upper face of the chassis and configured to bring an inside and an outside of the chassis into communication with each other, and to allow the exhaust-gas purification device, included in the engine device, to face the ventilation opening itself from below, a shutter plate configured to open/shut the ventilation opening, a key switch, and an actuator configured to, upon ON-operation of the key switch, drive the shutter plate so as to allow the shutter plate to shut the ventilation opening, and to, upon OFF-operation of the key switch, drive the shutter plate so as to allow the shutter plate to open the ventilation opening.

According to the embodiment of the present invention, an engine device includes an engine, an exhaust-gas purification device configured to purify exhaust gas from the engine, at least one electrical component configured to detect a state of the exhaust-gas purification device, and a cooling-water circulation mechanism configured to circulate cooling water for cooling the engine. Further, a portion of the cooling water circulated by the cooling-water circulation mechanism cools the at least one electrical component. This configuration, therefore, reduces the influence of heat from the exhaust-gas purification device and the engine, and as a result, reduces the malfunction of the at least one electrical component due to the heat.

According to the embodiment of the invention according to the second aspect of the present invention, the engine device according to the embodiment of the first aspect of the present invention further includes an exhaust-gas purification case included in the exhaust-gas purification device, a support bracket secured to the exhaust-gas purification case and supporting the at least one electrical component, and a cooling-water supply tube disposed on the support bracket and configured to allow the portion of the cooling water, circulated by the cooling-water circulation mechanism, to be flown in the cooling-water supply tube itself. This configuration, therefore, facilitates constituting a cooling mechanism for cooling the at least one electrical component merely by incorporating the cooling-water supply tube into tubes for the cooling-water circulation mechanism. Further, this configuration reduces the application of radiant heat from the exhaust-gas purification device to the at least one electrical component using the support bracket, and further, reduces the application of conductive heat from the exhaust-gas purification device to the support bracket using cooling water flowing in the cooling-water supply tube.

According to the embodiment of the invention according to the third aspect of the present invention, the support bracket supports the at least one electrical component at a position outside the exhaust-gas purification device, and the cooling-water supply tube is disposed at a position between the at least one electrical component and the exhaust-gas purification device. In this configuration, therefore, the at least one electrical component is disposed at a position distanced from the exhaust-gas purification device, and this disposition reduces the influence of not only conductive heat but also radiant heat from the exhaust-gas purification case, and as a result, reduces the malfunction of the at least one electrical component due to the heat.

According to the embodiment of the invention according to the fourth aspect of the present invention, the exhaust-gas purification device is disposed on the flywheel housing so as to allow the long-length direction of the exhaust-gas purification device itself to be a direction perpendicular to the crankshaft. This configuration, therefore, not only realizes compact component attachment height at the side faces of the engine, but also realizes a highly rigid structure for supporting the exhaust-gas purification device, having a heavy weight, because the exhaust-gas purification device is fixed to the flywheel housing, having high rigidity.

According to the embodiment of the invention according to the fifth aspect of the present invention, the at least one electrical component is disposed at a position located at the outside of the exhaust-gas purification device and located at an upstream side in a direction in which the exhaust gas moves in the inside of the exhaust-gas purification device. This configuration, therefore, reduces the influence of heat from the exhaust-gas purification device and the engine, and as a result, reduces the malfunction of the at least one electrical component due to the heat. Further, in this configuration, the at least one electrical component is disposed at a side where the heat capacity is smaller, and thus, this disposition reduces the influence of radiant heat from the exhaust-gas purification device on the at least one electrical component.

According to the embodiment of the invention according to the sixth aspect of the present invention, the exhaust-gas purification device is coupled to the exhaust manifold, disposed at one side of the engine, via the exhaust-gas introduction unit, and with the support bracket, secured to one end face of the exhaust-gas purification case of the exhaust-gas purification device, the at least one electrical component is disposed at a position outside the exhaust-gas introduction unit. In this configuration, therefore, the at least one electrical component is disposed at a position located at a more upstream side than the exhaust-gas purification device and located distanced from the exhaust-gas purification device, and this disposition reduces the influence of conductive heat and radiant heat from the exhaust-gas purification device, and as a result, reduces the malfunction of the at least one electrical component due to the heat.

According to the embodiment of the invention according to the seventh aspect of the present invention, the cooling fan is disposed at one side of the engine, the flywheel housing is disposed at the other side of the engine. Further, the flywheel is coupled to the work unit so as to transfer engine power to the work unit, and the exhaust-gas purification device is disposed at the upper-face side of the flywheel housing to allow the exhaust-gas purification device to be located above the work unit. This configuration, therefore, realizes a highly rigid structure for supporting the exhaust-gas purification apparatus with the flywheel housing, which is a highly rigid component for the engine, and as a result, reduces the damage on the exhaust-gas purification apparatus due to the vibration and any other damage cause. Further, a space above the work unit is utilized as an installation space of the exhaust-gas purification device, and this configuration increases the utilization efficiency of an inside space of the chassis, which contains the engine device.

According to the embodiment of the invention according to the eighth aspect of the present invention, in a stationary work machine including a work unit serving as a compressor or a power generator, the engine device according to the embodiment of the seventh aspect of the present invention, a chassis containing the work unit and the engine device, a ventilation opening configured to bring the inside and the outside of the chassis into communication with each other is disposed in an upper face of the chassis so as to allow the exhaust-gas purification device to face the ventilation opening itself from below. In this configuration, therefore, excessively heated air generated in the exhaust-gas purification device is discharged to the outside of the chassis via the ventilation opening, and thus, this configuration contributes to the optimization of a heat balance inside the chassis.

According to the embodiment of the invention according to the ninth aspect of the present invention, the stationary work machine includes a shutter plate disposed inside the chassis and configured to, when the engine is in a driven state, allow cooling wind from the cooling fan to shut the ventilation port, and to, when the engine is in a stop state, allow the ventilation port to open by weight of the shutter plate itself. Accordingly, when the engine is in a driven state, this configuration certainly blocks the invasion of dust and any other fine material into the chassis through the ventilation opening. After the stop of the engine, heated air generated in the exhaust-gas purification device is discharged to the outside of the chassis via the ventilation opening, and this configuration reduces the occurrence of a situation in which the heated air is confined inside the chassis. Thus, this configuration reduces the occurrence of heat damage on the exhaust-gas purification device itself, the chassis, and any other equipment.

According to the embodiment of the invention according to the tenth aspect of the present invention, in a stationary work machine including a work unit serving as a compressor or a power generator, the engine device according to the embodiment of the seventh aspect of the present invention, a chassis containing the work unit and the engine device, a ventilation opening configured to bring the inside and the outside of the chassis into communication with each other is disposed in an upper face of the chassis so as to allow the exhaust-gas purification device to face the ventilation opening itself from below. Further, an actuator configured to perform opening/closing drive of the shutter plate is provided, and the actuator is configured to, upon ON-operation of the key switch, drive the shutter plate so as to allow the shutter plate to shut the ventilation opening, and to, upon OFF-operation of the key switch, drive the shutter plate so as to allow the shutter plate to open the ventilation opening. Accordingly, just like the embodiment of the third aspect of the present invention, when the engine is in a driven state, this configuration blocks the invasion of dust and any other fine material into the chassis through the ventilation opening. After the stop of the engine, heated air generated in the exhaust-gas purification device is discharged to the outside of the chassis via the ventilation opening, and thus, this configuration reduces the occurrence of a situation in which the heated air is confined inside the chassis. Accordingly, this configuration reduces the occurrence of heat damage on the exhaust-gas purification device itself, the chassis, and any other equipment.

DESCRIPTION OF THE EMBODIMENTS

Figure 1:
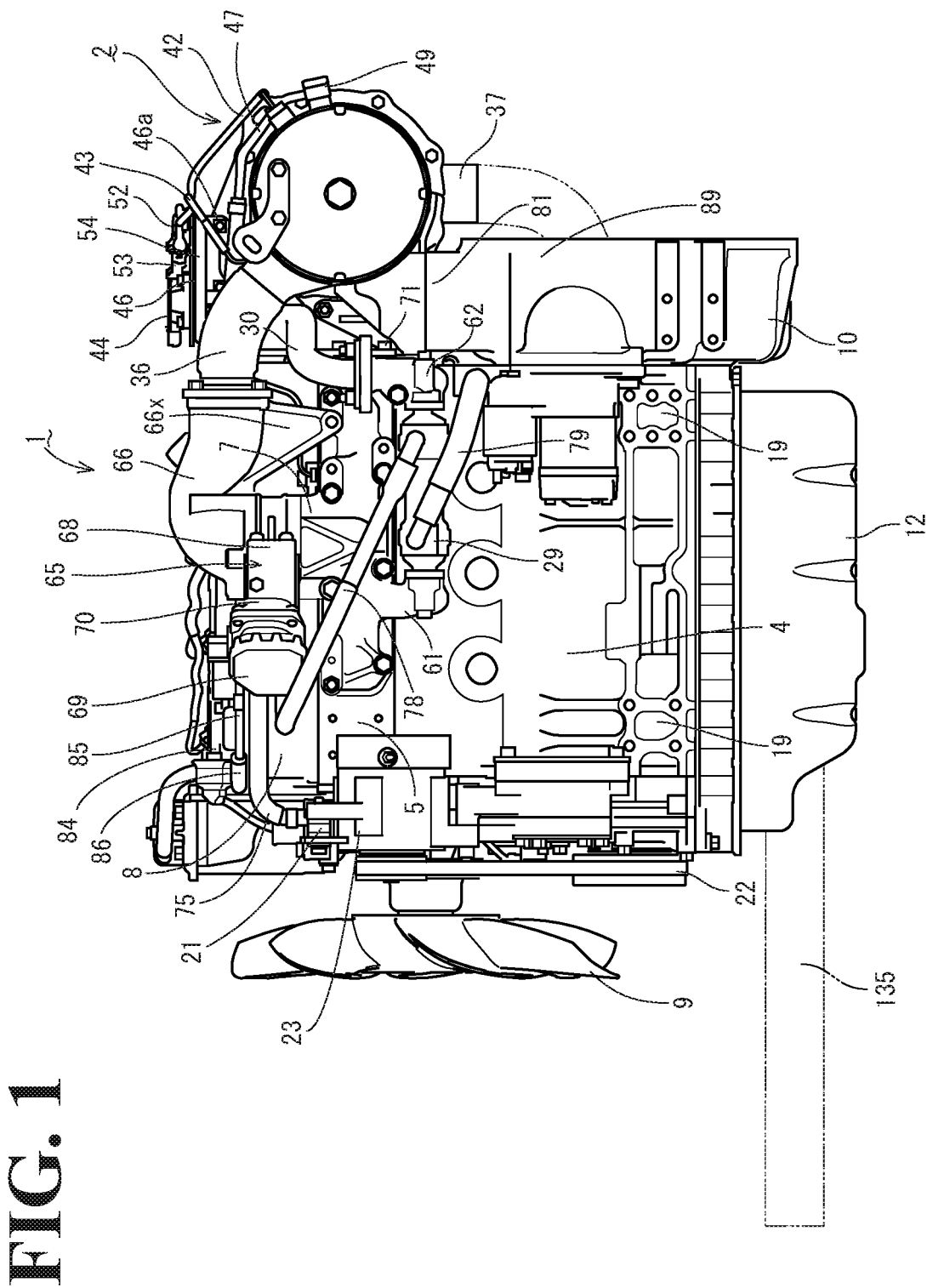
FIG. 1 is a right side view of a diesel engine, an embodiment of the present invention.
Figure 2:
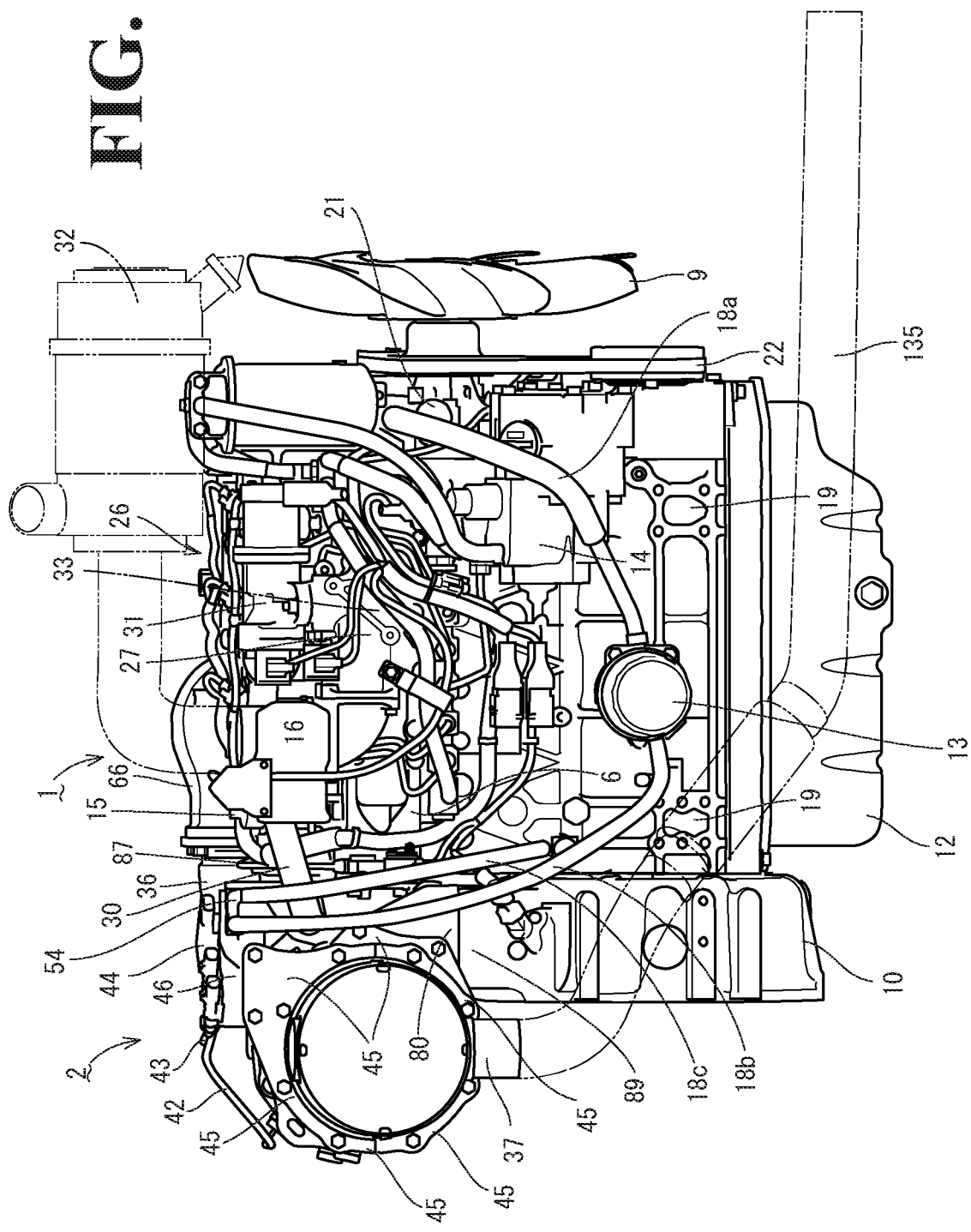
FIG. 2 is a left side view of the diesel engine.
Figure 3:
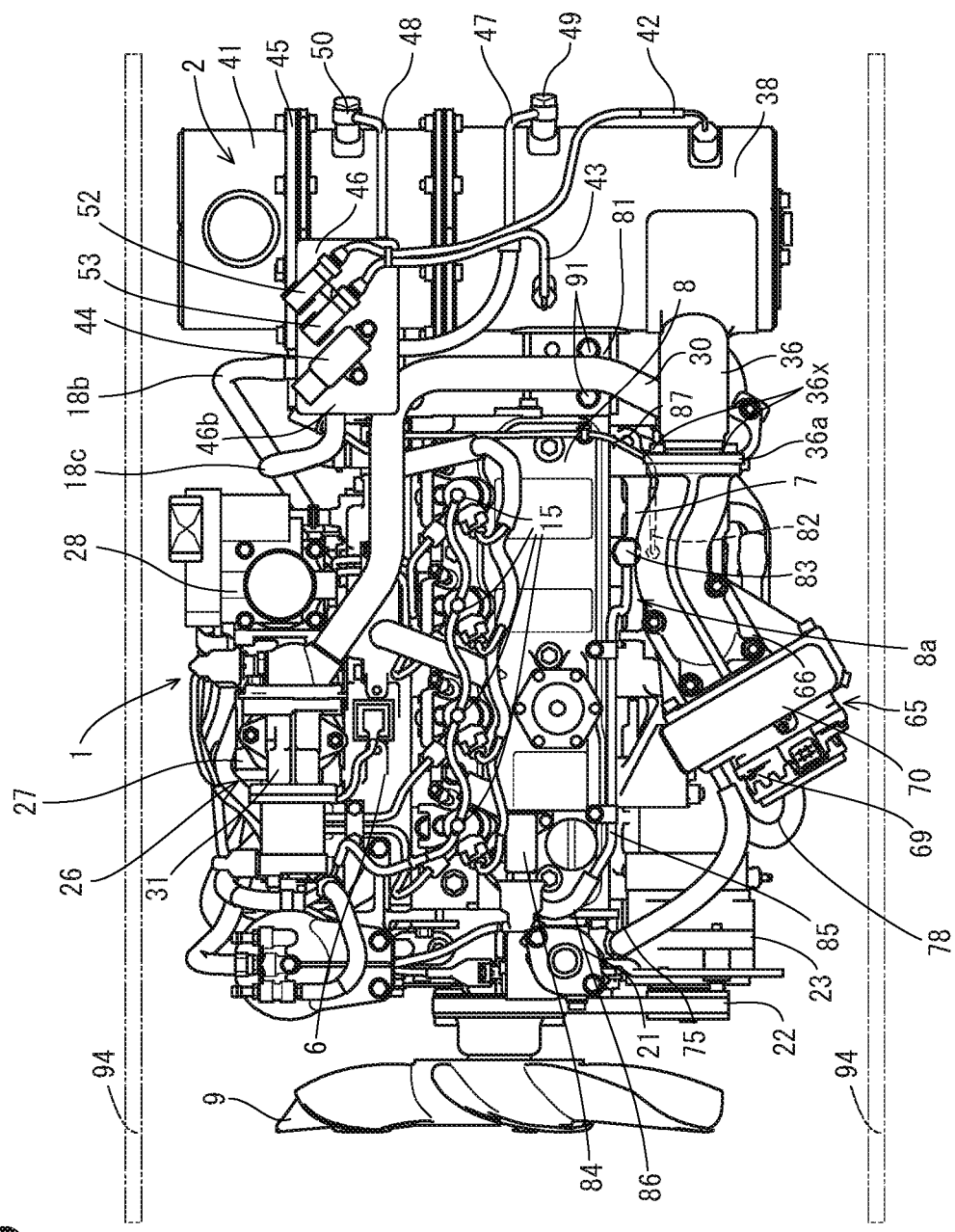
FIG. 3 is a plan view of the same diesel engine.
Figure 4:
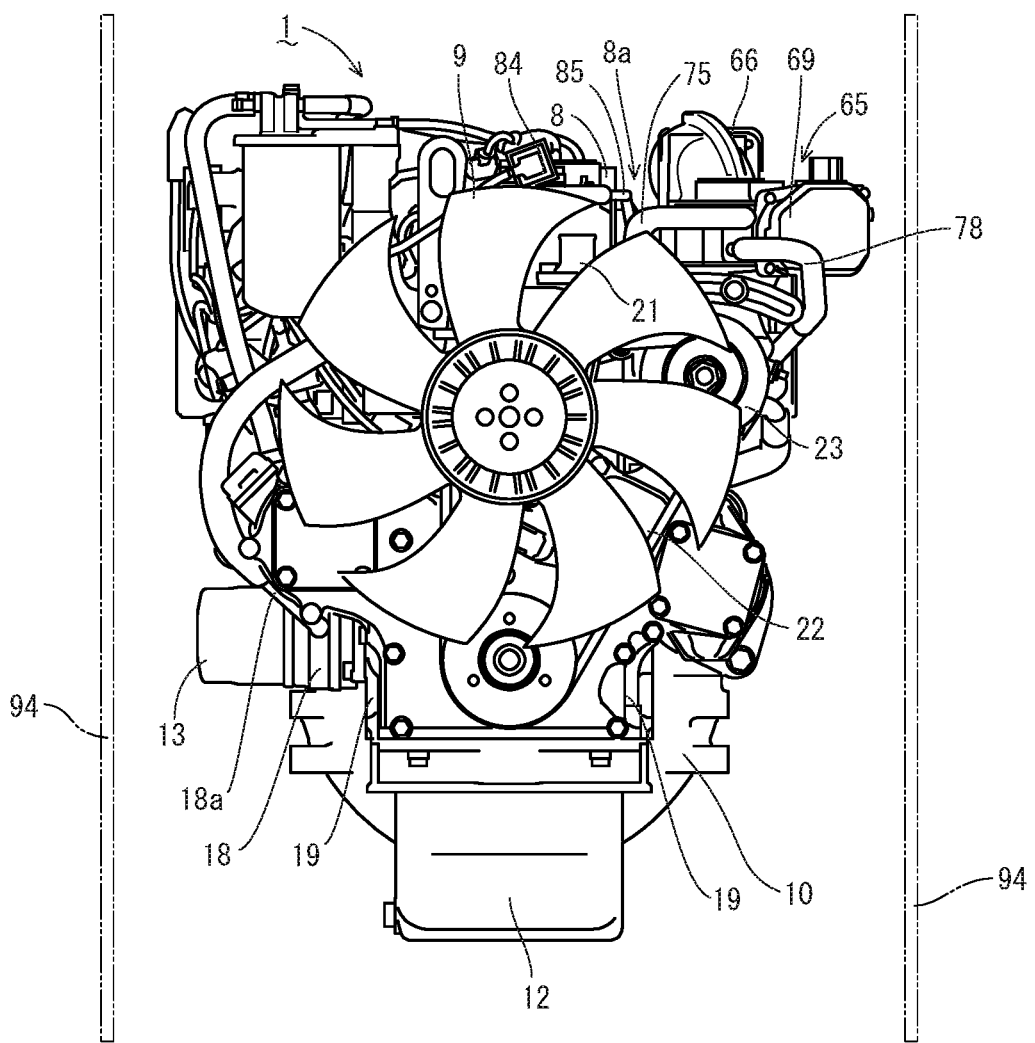
FIG. 4 is a back view of the diesel engine.
Figure 5:
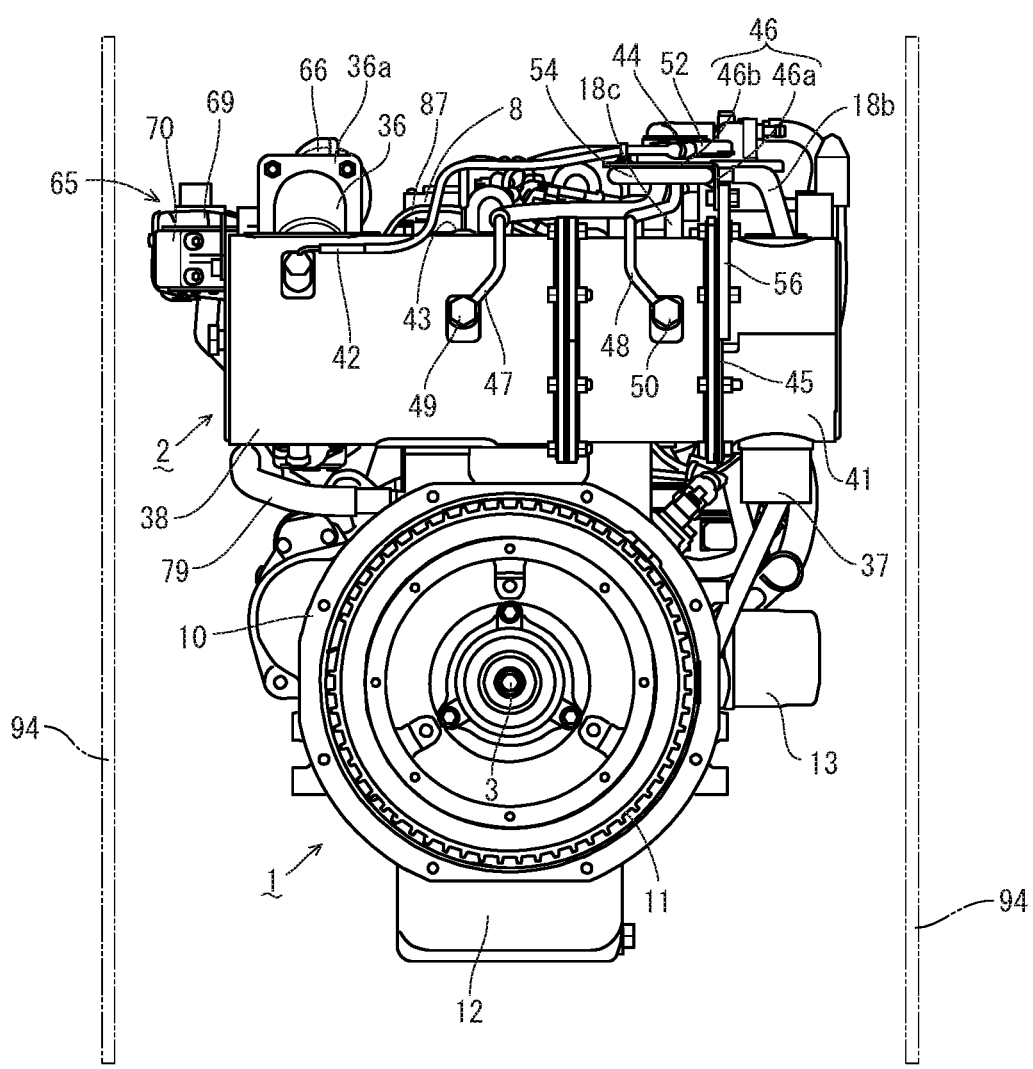
FIG. 5 is a front view of the diesel engine.
Figure 6:
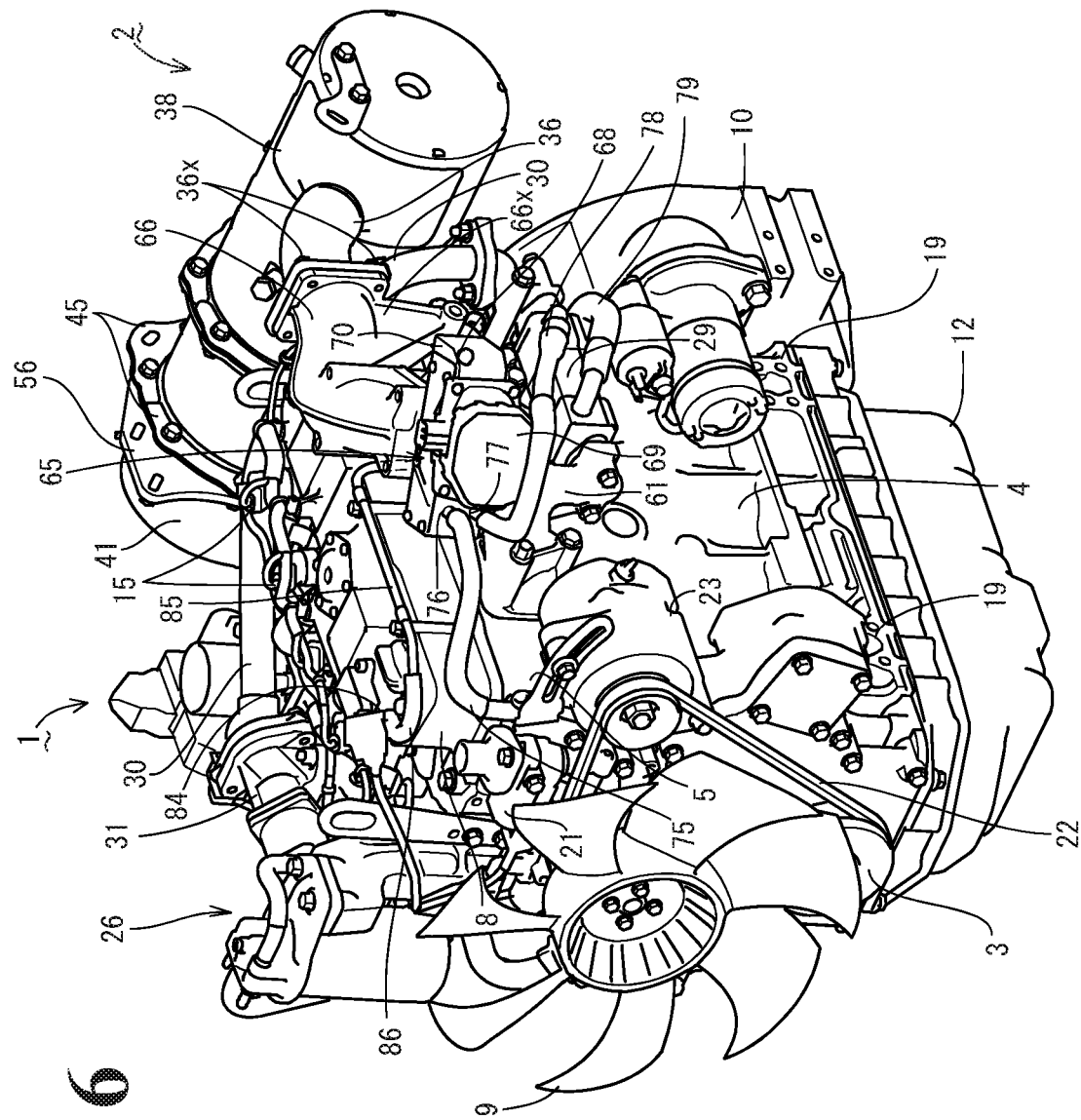
FIG. 6 is a perspective back view of the diesel engine.
Figure 7:
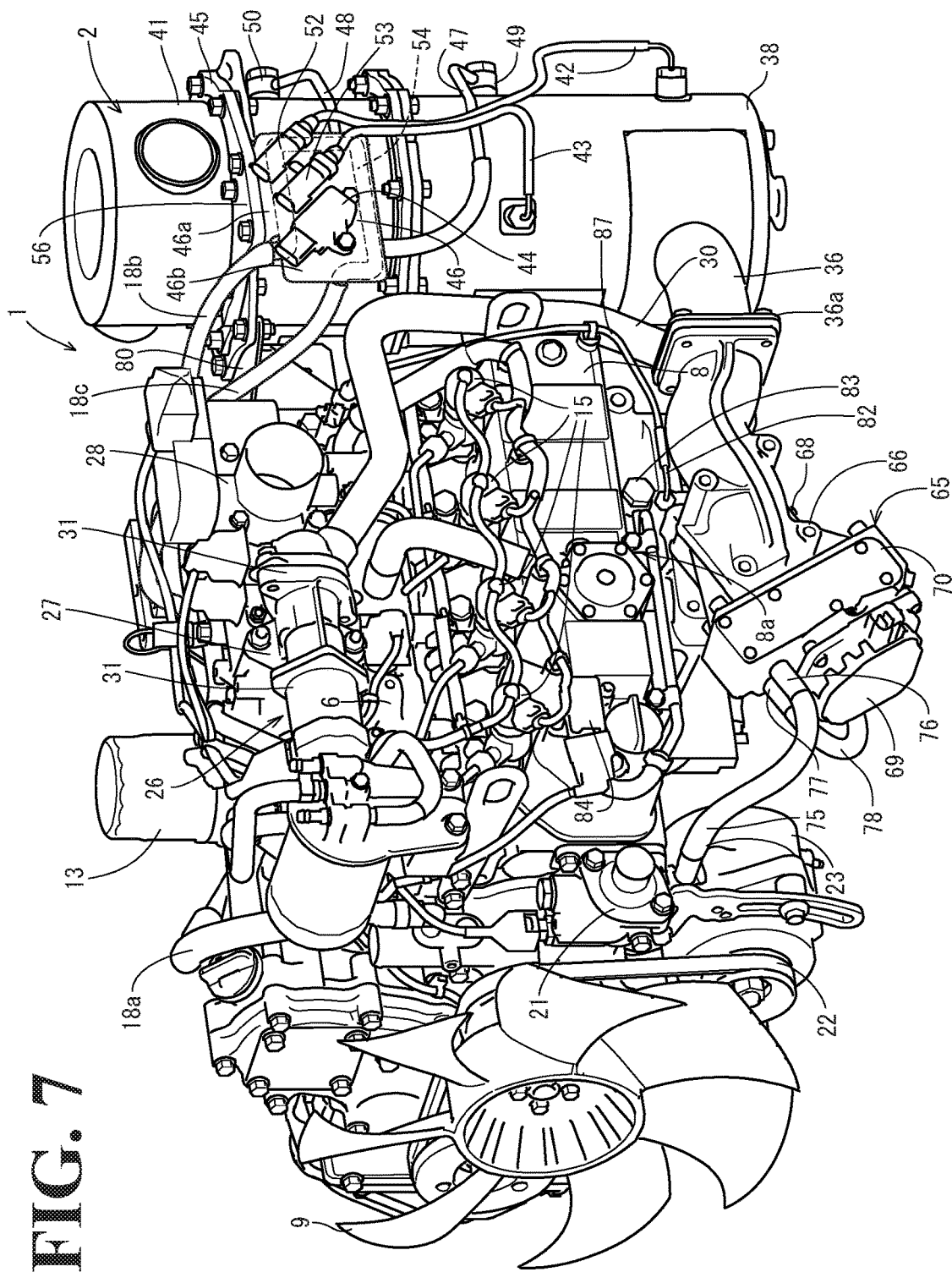
FIG. 7 is a perspective plan view of the diesel engine.
Figure 8:
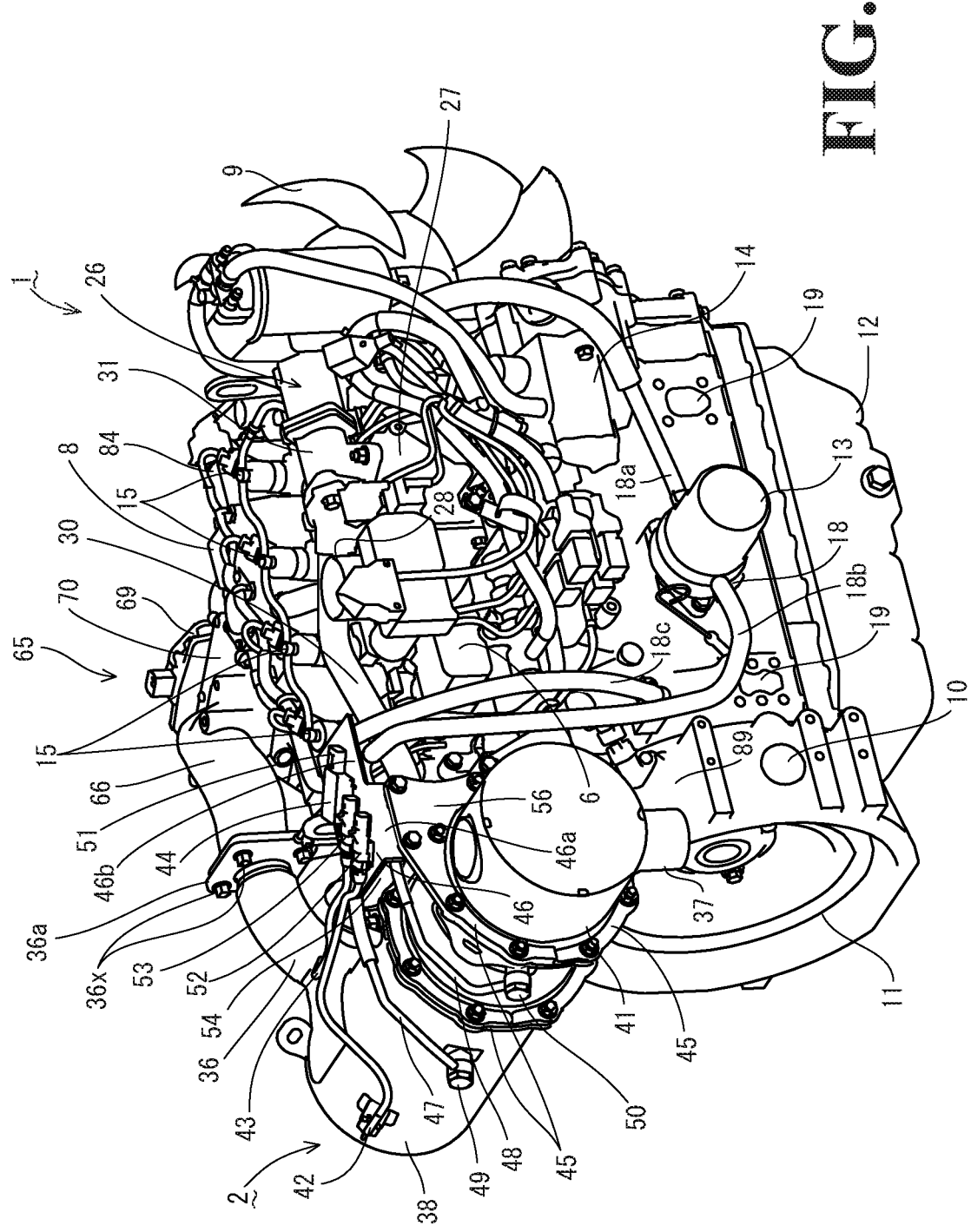
FIG. 8 is a perspective front view of the diesel engine.
Figure 9:
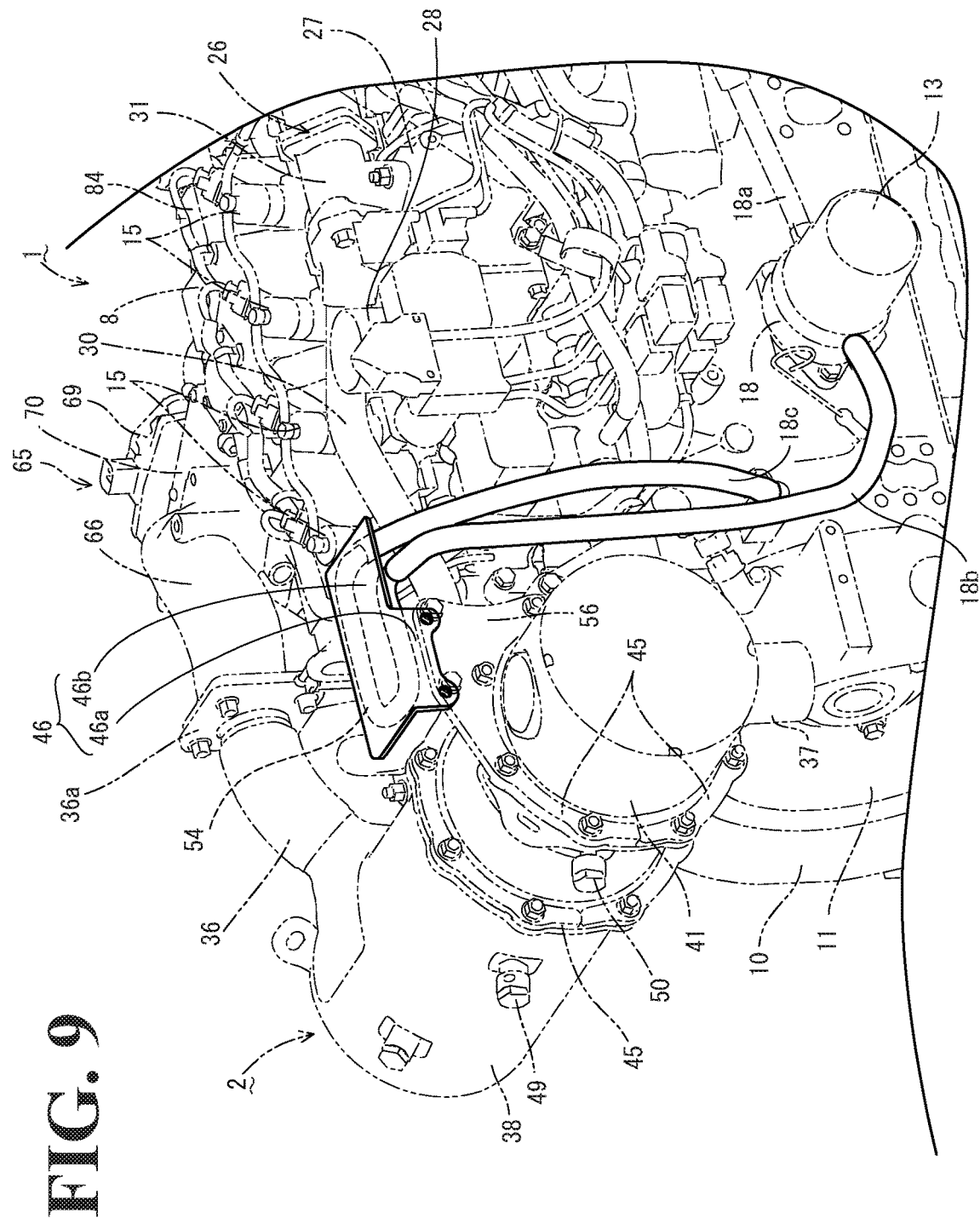
FIG. 9 is a partial enlarged view of FIG. 8.
Figure 10:
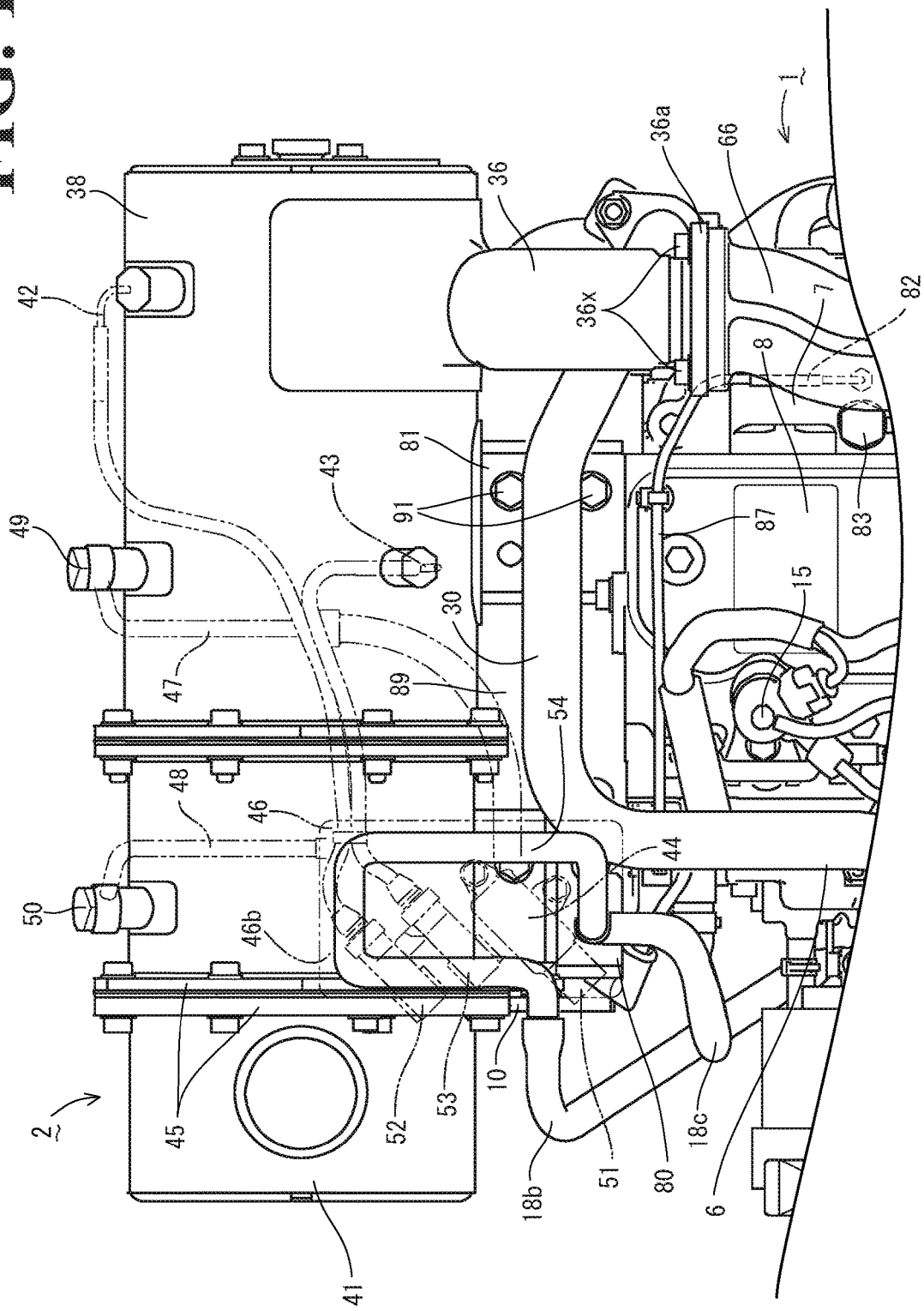
FIG. 10 is a partial enlarged view of FIG. 3.
Figure 11:
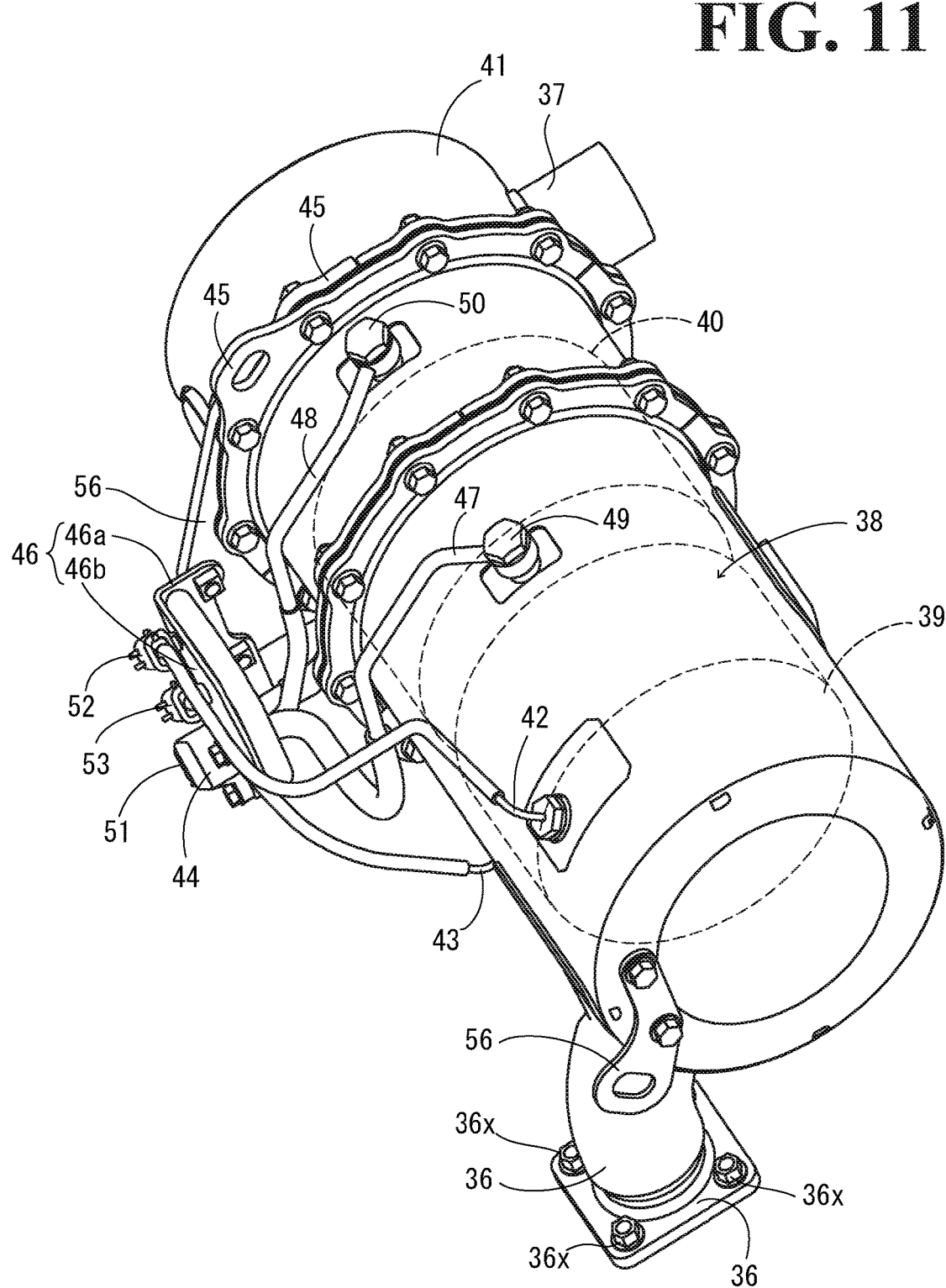
FIG. 11 is an external perspective view of an exhaust-gas purification device included in the diesel engine.
Figure 12:
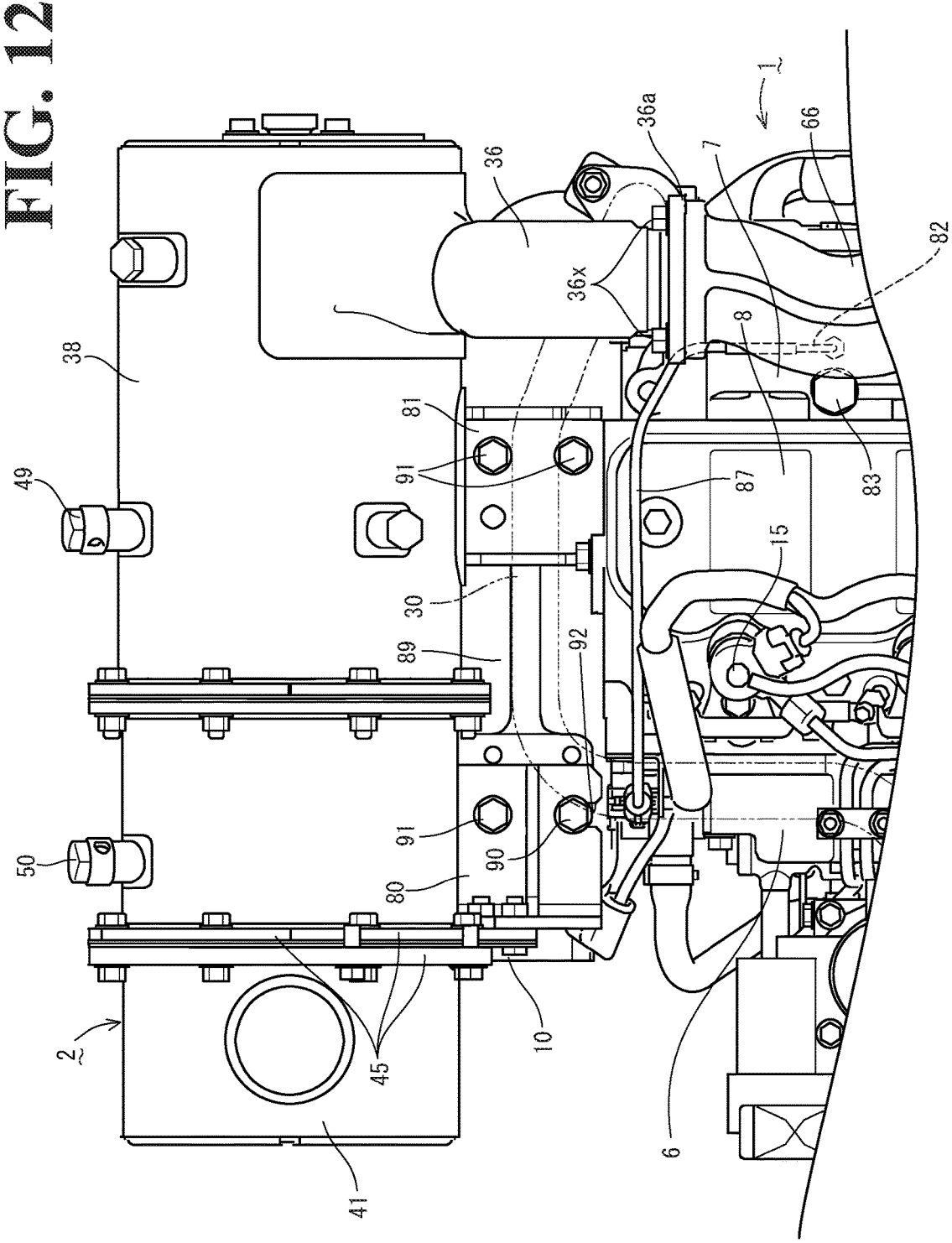
FIG. 12 is a partial enlarged view of FIG. 3 illustrating the assembly configuration of the exhaust-gas purification device.
Figure 13:
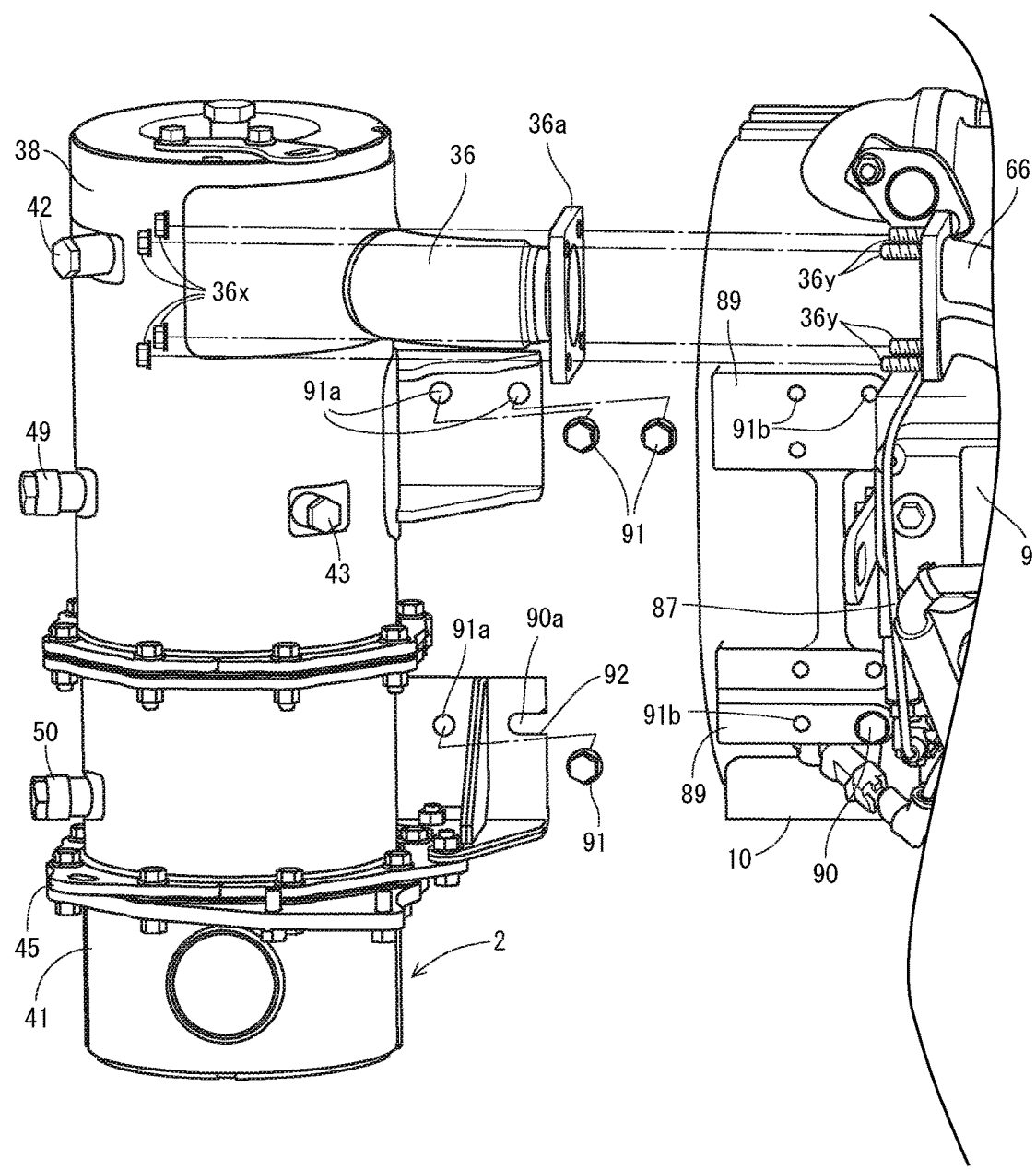
FIG. 13 is a diagram illustrating assembling (disassembling) of the exhaust-gas purification device.
Figure 14:
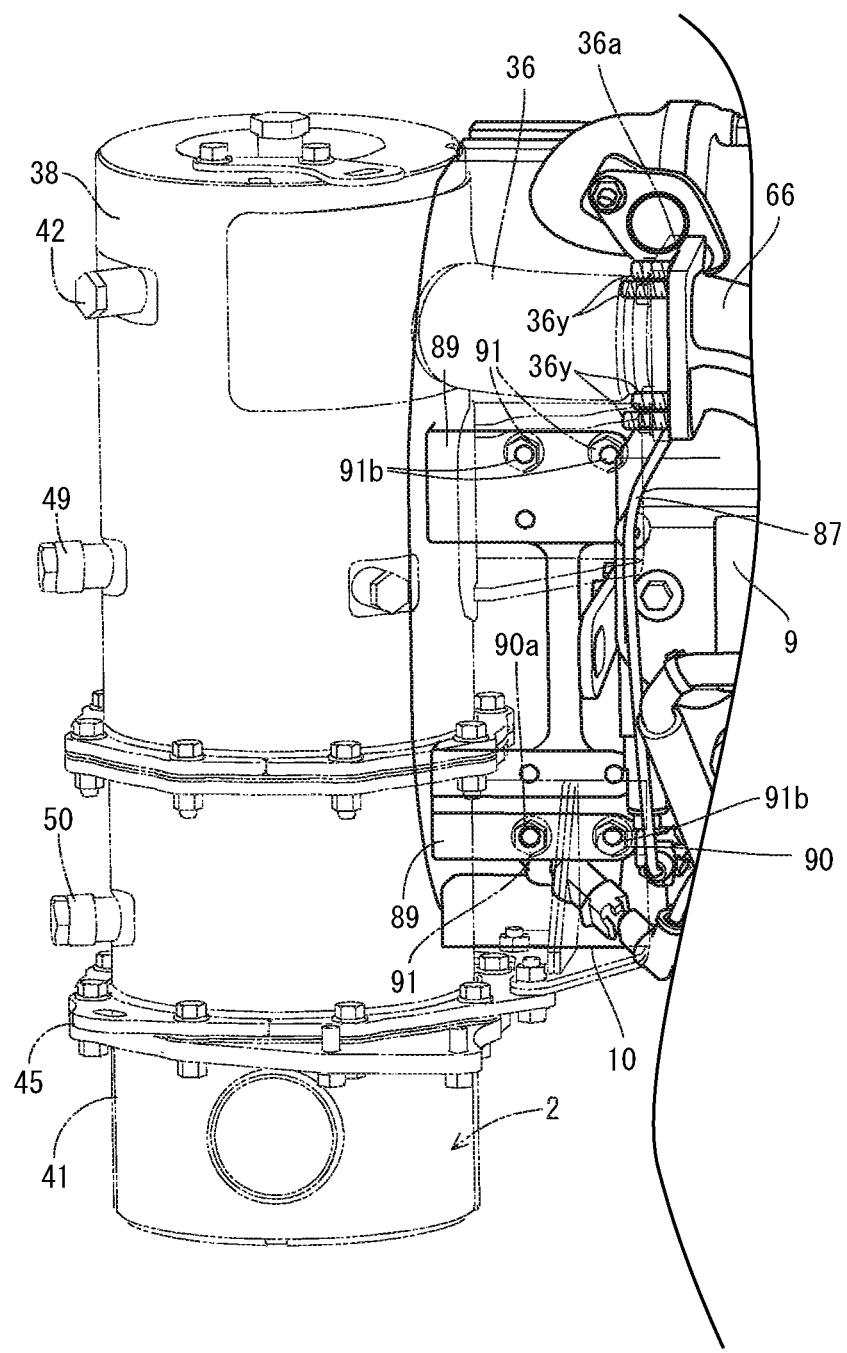
FIG. 14 is an enlarged view of an assembling portion on a flywheel housing included in the diesel engine, illustrating the configuration of the assembling portion.

Hereinafter, an embodiment of an engine device according to the present invention and an embodiment of a work machine according to the present invention including the engine device will be described with reference to FIGS. 1 to 17. A stationary work machine will be given below as the embodiment of a work machine according to the present invention, and the details of the configuration of the stationary work machine will be described below.

First, a diesel engine 1, an embodiment of an engine device according to the present invention, will be described with reference to FIGS. 1 to 14. This diesel engine 1 is mounted in a work machine, such as a stationary work machine described below, and serves as a prime mover for the work machine. As described above, the diesel engine 1 includes an exhaust-gas purification device 2, and this exhaust-gas purification device 2 is coupled to the diesel engine 1 via an exhaust-gas throttle device 65. The exhaust-gas purification device 2 includes not only a mechanism for removing particulate matter (PM) contained in exhaust gas discharged from the diesel engine 1, but also a mechanism for reducing carbon monoxide (CO) and hydrocarbon (HC) contained in the exhaust gas discharged from the diesel engine 1.

The diesel engine 1 includes a cylinder block 4, and this cylinder block 4 incorporates a crankshaft 3 and pistons (omitted from illustration). The crankshaft 3 and the pistons serve as engine output components. A cylinder head 5 is mounted on the cylinder block 4. An intake manifold 6 is disposed on the right side face of the cylinder head 5. An exhaust manifold 7 is disposed on the left side face of the cylinder head 5. A head cover 8 is disposed on the upper side face of the cylinder head 5. A cooling fan 9 is disposed on the back side face of the cylinder block 4. A flywheel housing 10 is disposed on the front side face of the cylinder block 4. A flywheel 11 is disposed inside the flywheel housing 10.

The flywheel 11 is secured to a crankshaft 3 (an engine output shaft) so as to be able to rotate together with the crankshaft 3. A configuration that allows the power of the diesel engine 1 to be drawn and transmitted to a work unit of a work vehicle (such as a backhoe or a forklift) via the crankshaft 3 is employed.

Further, an oil pan 12 is disposed under the lower face of the cylinder block 4. Lubrication oil is stored inside an oil pan 12. The lubrication oil inside the oil pan 12 is sucked by an oil pump (omitted from illustration) disclosed in a portion located inside the cylinder block 4 and located near the left-side face of the cylinder block 4, and then is supplied to individual lubrication units of the diesel engine 1 via an oil cooler 18 and an oil filter 13. The oil cooler 18 and the oil filter 13 are disposed on the left-side face of the cylinder block 4. The lubrication oil, having been supplied to the individual lubrication units, is returned back to the oil pan 12 afterward. The oil pump (omitted from illustration) is configured to be driven by the rotation of the crankshaft 3. The oil cooler 18 serves as a component for cooling the lubrication oil with cooling water.

The oil cooler 18 is secured on the left-side face of the cylinder block 4 so as to be located above the oil pan 12. The oil cooler 18 has a structure that allows cooling-water supply tubes 18a and 18b to be coupled to the oil cooler 18 and allows cooling water to be recirculated inside the cooling-water supply tubes 18a and 18b. The oil filter 13 is disposed at the left side of the oil cooler 18 so as to overlap the oil cooler 18. That is, the oil filter 13 and the oil cooler 18 are respectively coupled to the left side of the oil cooler 18 and the right side of the oil filter 13, and the oil filter 13 and the oil cooler 18 are disposed at a position above the oil pan 12 so as to protrude from the left-side face of the cylinder block 4 toward the outside (the left side).

A fuel pump 14 is secured to a portion located on the left-side face of the cylinder block 4 and located above the oil filter 13 (located below an intake manifold 6). The fuel supply pump 14 serves as supplying fuel. Injectors 15 each associated with a corresponding one of four cylinders are disposed in the diesel engine 1. Each of the injectors 15 includes a fuel ejection valve (omitted from illustration) of an electromagnetic open/close control type. A fuel tank (omitted from illustration) mounted in the work vehicle is coupled to the individual injectors 15 via the fuel supply pump 14, a common rail 16, having a cylindrical shape, and a fuel filter (omitted from illustration).

Fuel of the fuel tank is flown in a pressurized state to the common rail 16 from the fuel supply pump 14, and the highly pressurized fuel is stored in the common rail 16. The open/close control of the fuel ejection valve of each of the injectors 15 allows the highly pressurized fuel inside the common rail 16 to be ejected from the each of the injectors 15 to a corresponding one of the cylinders of the diesel engine 1.

In a portion at the back right side of the cylinder block 4, a cooling-water pump 21 is disposed concentrically with a fan shaft of the cooling fan 9. The cooling-water pump 21 circulates the cooling water. The cooling fan 9 and the cooling-water pump 21 are driven by the rotation of the crankshaft 3 via a cooling-fan driving V belt 22. A radiator 24 is mounted in the work vehicle, and cooling water inside this radiator 24 is supplied to the cooling-water pump 21 by the drive of the cooling-water pump 21. Further, the cooling water is supplied to the cylinder block 4 and the cylinder head 5 to cool the diesel engine 1. An alternator 23 is disposed at the right side of the cooling-water pump 21.

Engine leg securing portions 19 are disposed on each of the left and right side faces of the cylinder block 4. Engine leg assembles (omitted from illustration) are coupled to left and right side walls of a body frame 94 constituting a travelling machine body of the work vehicle. Each of the engine leg assemblies includes a rubber vibration isolator, and is bolted to a corresponding one of the engine leg securing portions 19. The diesel engine 1 is supported in a vibration-isolating manner by the body frame 94, constituting the travelling machine body of the work vehicle, via the individual engine leg assemblies (omitted from illustration). This configuration blocks the transfer of the vibration of the diesel engine 1 to the frame body 94.

Moreover, an EGR device 26 (an exhaust-gas recirculation device) will be described. An air cleaner 32 is coupled to a projecting inlet portion of the intake manifold 6 via the EGR device 26 (the exhaust-gas recirculation device). Fresh air (external air) is sent from the air cleaner 32 to the intake manifold 6 via the EGR device 26. The EGR device 26 includes an EGR body case 27 (a collector), an inlet throttle member 28, a recirculation exhaust gas tube 30, and an EGR valve member 31. The EGR body case 27 mixes part of the exhaust gas discharged from the diesel engine 1 (i.e., EGR gas from the exhaust manifold) with fresh air (i.e., external air from the air cleaner 32), and supplies the mixed gas to the intake manifold 6. The inlet throttle member 28 brings the EGR body case 27 into communication with the air cleaner 32 via an inlet tube 33. The recirculation exhaust gas tube 30 serves as a recirculation tube, and is coupled to the exhaust manifold 7 via an EGR cooler 29. The EGR valve member 31 brings the EGR body case 27 into communication with the recirculation exhaust gas tube 30.

That is, the intake manifold 6 and the inlet throttle member 28, for use in the introduction of fresh air, are coupled to each other via the EGR body case 27. Further, the outlet side of the recirculation exhaust gas tube 30, extending from the exhaust manifold 7, is in communication with the EGR body case 27. The EGR body case 27 is formed in a long cylindrical shape. The inlet throttle member 28 is bolted to one long-length direction end portion of the EGR body case 27. The downwardly-directed, open end portion of the EGR body case 27 is attachably/detachably bolted to the inlet portion of the intake manifold 6.

Further, the outlet side of the recirculation exhaust gas tube 30 is coupled to the EGR body case 27 via the EGR valve member 31. The inlet side of the recirculation exhaust gas tube 30 is coupled to the lower-face side of the exhaust manifold 7 via the EGR cooler 29. The recirculation exhaust gas tube 30 is laid above the flywheel housing 10 so as to detour around the front face of the cylinder head 5. Further, the amount of EGR gas supplied to the EGR body case 27 is adjusted by adjusting an aperture degree of an EGR valve (omitted from illustration) inside the EGR valve member 31.

With the above configuration, fresh air (eternal air) is supplied from the air cleaner 32 into the EGR body case 27 via the inlet throttle member 28; while EGR gas (part of the exhaust gas discharged from the exhaust manifold) is supplied from the exhaust manifold 7 into the EGR body case 27 via the EGR valve member 31. The fresh air from the air cleaner 32 and the EGR gas from the exhaust manifold 7 are mixed inside the EGR body case 27 and then the mixed gas inside the EGR body case 27 is supplied to the intake manifold 6. That is, part of the exhaust gas discharged from the diesel engine 1 into the exhaust manifold 7 is recirculated from the intake manifold 6 into the diesel engine 1 to decrease the highest combustion temperature in a high-load driving state so as to reduce the amount of NOx (nitrogen oxide) discharged from the diesel engine 1.

When the EGR cooler 29 is disposed in such a way as described above, an EGR gas drawing tube 61 is formed integrally with the exhaust manifold 7. Further, a tube joint member 62 is bolted to the exhaust manifold 7. The EGR-gas inlet portion of the EGR cooler 29 is supported by the EGR gas drawing tube 61; while the EGR-gas outlet portion of the EGR cooler 29 is supported by the tube joint member 62, which couples the recirculation exhaust gas tube 30 to the EGR cooler 29. As a result, the EGR cooler 29 is disposed at a position distanced from the cylinder block 4 (specifically, its left-side face).

Further, the recirculation exhaust gas tube 30, coupled to the tube joint member 62, is laid toward the front face of the cylinder head 5 so as to hide under a purification inlet tube 36 of the exhaust-gas purification device 2. That is, the recirculation exhaust gas tube 30 and the purification inlet tube 36 intersect with each other above the flywheel housing 10 so as to allow the purification inlet tube 36 to be located above the recirculation exhaust gas tube 30. Accordingly, at the front side of the cylinder head 5 above the flywheel housing 10, the recirculation exhaust gas tube 30 is disposed so as to extend from the right-side face toward the left-side face of the cylinder head 5 and the purification inlet tube 36 is disposed so as cross above the recirculation exhaust gas tube 30 and extend in a front-and-back direction.

In this way, on the right-side face of the cylinder block 4, the EGR cooler 29, for cooling the EGR gas, is disposed below the exhaust manifold 7. Accordingly, with this configuration, the exhaust manifold 7 and the EGR cooler 29 are compactly disposed along one side face of the engine 1. Further, a cooling-water supply path for coupling the cooling-water pump 21 to the EGR cooler 29 and the exhaust-gas throttle device 56 is disposed at the right side of the diesel engine 1 (i.e., at the exhaust manifold 7 side). With this cooling water supply path, cooling water from the cooling-water pump 21 is configured not only to be supplied to water cooling portions of the diesel engine 1, but also to allow part of the cooling water itself, from the cooling-water pump 21, to be sent to the EGR cooler 29 and the exhaust-gas throttle device 65.

Further, the exhaust-gas throttle device 65 is disposed at the right side of the cylinder head 5. The exhaust-gas throttle device 65 causes the exhaust gas pressure of the diesel engine 1 to rise. The exhaust outlet of the exhaust manifold 7 is upwardly opened. The exhaust outlet of the exhaust manifold 7 is attachably/detachably coupled to a relay tube 66, which is an elbow-shaped relay tube, via the exhaust-gas throttle device 65, for use in adjusting the exhaust gas pressure of the diesel engine 1. The exhaust-gas throttle device 65 includes a throttle valve case 68, an actuator case 69, and a water cooling case 70. The throttle valve case 68 incorporates an exhaust-gas throttle valve. The actuator case 69 incorporates a power transfer mechanism for transferring the power from a motor (an actuator) for controlling the opening/closing operation of the exhaust-gas throttle valve, and any other component. The cooling case 70 allows the throttle valve case 68 and the actuator case 69 to be mechanically coupled to each other via the cooling case 70 itself. With the power transmission mechanism, the rotation shaft of the motor is configured to be able to rotate in conjunction with the rotation shaft of the exhaust-gas throttle valve, incorporated in the throttle valve case 68, via a gear and any other component.

The throttle valve case 68 is placed on the exhaust outlet of the exhaust-gas manifold 7, the relay tube 66 is placed on the throttle valve case 68, and the relay tube 66 is secured to an exhaust outlet member of the exhaust-gas manifold 7 with four bolts via the throttle valve case 68. The lower-face side of the exhaust manifold 7 is fixedly secured to the exhaust outlet member of the exhaust-gas manifold 7. An opening portion of the lower-face side of the relay tube 66 is fixedly secured to the upper-face side of the throttle valve case 68. A laterally-directed opening portion of the relay tube 66 is brought into connection with the purification inlet tube 36 of the exhaust-gas purification device 2.

Accordingly, the exhaust manifold 7 is coupled to the above-described exhaust-gas purification device 2 via the relay tube 66 and the exhaust-gas throttle device 65. The exhaust gas moves from the outlet of the exhaust manifold 7 to the inside of the exhaust-gas purification device 2 via the throttle valve case 68 and the relay tube 66. After having been purified in the exhaust-gas purification device 2, the exhaust gas moves from a purification outlet tube 37 to the tail pipe 135, and then is finally discharged to the outside of the machine.

Further, the relay tube 66 includes a coupling support portion 66x at a position between the exhaust-gas throttle device 65 and the exhaust-gas inlet tube 36 of the exhaust-gas purification device 2, and the coupling support portion 66x is secured to the exhaust manifold 7. The coupling support portion 66x is constituted by a wing-shaped plate protruding from the outer circumference of the relay tube 66 toward the manifold 7, and is bolted at the right-side face of the exhaust manifold 7. The relay tube 66 allows its exhaust inlet to be coupled to the exhaust outlet of the exhaust manifold 7 via the exhaust-gas throttle device 65. Further, the relay tube 66 allows its tube portion in which the exhaust gas is flown toward the exhaust-gas inlet tube 36 to be secured to the side face of the exhaust manifold 7 so as to be supported by the exhaust-gas manifold 7. As a result, the relay tube 66 is supported by the exhaust manifold 7, having a high rigidity, and this configuration allows the structure of supporting the exhaust-gas purification device 2 via the relay tube 66 to be highly rigid.

With the above configuration, the motor, included in the exhaust-gas throttle device 65, is driven on the basis of a pressure difference detected by a differential pressure sensor 44, which is included in the exhaust-gas purification device 2, so as to allow the regeneration control of a soot filter 40 to be performed. That is, when soot is accumulated in the soot filter 40, through control of closing the throttle valve of the exhaust-gas throttle device 65, the exhaust gas pressure of the diesel engine 1 is caused to rise to cause the exhaust gas temperature of the diesel engine 1 to rise to a high temperature so as to cause the soot, having been accumulated in the soot filter 40, to burn. As a result, the soot is removed and the soot filter 40 is regenerated.

Further, even when a lightly loaded work likely to cause the temperature of the exhaust gas to be low (i.e., a work likely to cause the soot to be accumulated) is continuously performed, the exhaust-gas throttle device 65 is allowed to serve as a mechanism for causing the exhaust gas temperature to rise by forcibly causing the exhaust gas pressure to rise, and as a result, the soot filter 40 is regenerated to allow the capability of the exhaust-gas purification device 2 for purifying the exhaust gas to be kept to an appropriate level. Further, a burner or any other tool to burn the soot, having been accumulated in the soot filter 40, is unneeded. Further, in a starting operation of the engine 1, the warm-up of the diesel engine 1 is accelerated by controlling the exhaust-gas throttle device 65 to cause the pressure of the exhaust gas discharged from the diesel engine 1 to rise so as to cause the temperature of the exhaust gas, discharged from the diesel engine 1, to rise to a high temperature.

As described above, the exhaust-gas throttle device 65 allows the exhaust-gas inlet side of the throttle valve case 68 to be bolted to the upwardly opened exhaust outlet of the exhaust manifold 7 to allow the relay tube 66 to be coupled to the exhaust manifold 7 via the throttle valve case 68. Accordingly, this configuration not only allows the exhaust-gas throttle device 65 to be supported by the exhaust manifold 7, having a high rigidity, to enable the structure of supporting the exhaust-gas throttle device 65 to be highly rigid, but also reduces the volume of the exhaust-gas inlet side of the exhaust-gas throttle device 65 to enable the exhaust gas pressure inside the exhaust manifold 7 to be adjusted with a higher accuracy, as compared with, for example, a structure of securing the throttle valve case 68 to the manifold 7 via the relay tube 66. For example, this configuration facilitates the keeping of the temperature of exhaust gas to be supplied to the exhaust-gas purification device 2 and any other device to a temperature appropriate to the purification of the exhaust gas.

Further, the throttle valve case 68 is secured to the upper-face side of the exhaust manifold 7 and the relay tube 66, having an elbow shape, is secured to the upper-face side of the throttle valve case 68 so as to allow the throttle valve case 68 and the relay tube 66 to be disposed in a multi-layer state relative to the exhaust manifold 7, and to allow an exhaust tube 72 to be coupled to the relay tube 66, located at the highest layer. This configuration, therefore, enables the attachment attitude of the relay tube 66 (i.e., the coupling direction of the exhaust tube 72) to be changed in accordance with, for example, the attachment attitude of the exhaust-gas purification device 2, without not only changing the supporting attitude of the exhaust-gas throttle device 65, but also changing the specification of the relay tube 66.

Further, the exhaust outlet of the exhaust manifold 7 is upwardly opened; the throttle valve case 68 is disposed at the upper-face side of the exhaust manifold 7; a throttle-valve gas outlet is formed at the upper-face side of the throttle valve case 68; and the EGR cooler 29, for use in cooling the EGR gas, is disposed below the throttle valve case 68 so as to allow the exhaust manifold 7 to be interposed between the EGR cooler 29 and the throttle valve case 68. Accordingly, the exhaust manifold 7, the exhaust-gas throttle device 65, and the EGR cooler 29 are compactly disposed along one side face of the engine 1.

In this way, the diesel engine 1 allows the relay tube 66 to be secured to the upper-face side of the exhaust-gas throttle device 65, allows the exhaust-gas throttle device 65 and the relay tube 66 to be disposed in a multi-layer state relative to the exhaust manifold 7, and allows the exhaust-gas inlet of the exhaust-gas throttle device 65 to be coupled to the relay tube 66, located at the highest layer. Accordingly, as a result, the exhaust-gas purification device 65 is compactly and adjacently disposed between the exhaust manifold 7 and the exhaust-gas purification device 2, and this configuration realizes a compact assembly of the exhaust-gas throttle device 65 in a restricted engine installation space. Further, this configuration facilitates the disposition of the exhaust-gas purification device 2 at a desired position merely by changing the shape of the relay tube 66.

The cooling-water supply path, disposed at the right side of the diesel engine 1 (i.e., at the exhaust manifold 7 side), will be described below. One end of a cooling-water return hose (a cooling-water-pump intake-side tube) 75 is coupled to the cooling-water pump 21, and the other end of the cooling-water return hose 75 is coupled to a cooling-water outlet tube 76 of the water cooling case 70. One end of a relay hose (an EGR cooler discharge-side tube) 78 is coupled to a cooling-water inlet tube 77 of the cooling water case 70, and the other end of the relay hose 78 is coupled to a cooling-water drain port of the EGR cooler 29. Further, a cooling-water intake port of the EGR cooler 29 is coupled to the cylinder block 4 via a cooling-water drawing hose (an EGR cooler intake-side tube) 79.

That is, the EGR cooler 29 and the exhaust-gas throttle device 65 are serially coupled to the cooling-water pump 21. Further, in the cooling-water circulation path constituted of the individual hoses 75, 78, and 79 and any other hose, the exhaust-gas throttle device 65 is disposed between the cooling water pump 21 and the EGR cooler 29. The exhaust-gas throttle device 65 is located at the downstream side of the EGR cooler 29. Part of the cooling water from the cooling water pump 21 is supplied from the cylinder block 4 to the exhaust-gas throttle device 65 via the EGR cooler 29, and as a result, is circulated.

Further, the cooling water case 70 allows each of the cooling-water outlet tube 76 and the cooling-water inlet tube 77 to protrude from the back side of the cooling water case 70 (i.e., from the fan 9 side) toward the cooling-water pump 21. That is, the cooling case 70 is disposed at a position posterior to the throttle valve case 68 (i.e., at the fan 9 side) so as to allow the edge portions of the cooling water outlet tube 76 and the cooling water inlet tube 77 to face the cooling-water pump 21. As a result, the cooling-water outlet tube 76 to be disposed close to the cooling-water pump 21, and this configuration enables the return hose 75 to be formed in a short length. Further, the cooling-water outlet tube 76 is disposed at the upper side of the cooling-water inlet tube 77 (i.e., at the exhaust-gas throttle outlet side).

As described above, the oil cooler 18 and the EGR cooler 29, which will be described below in detail, are respectively disposed at the intake manifold 6 side and the exhaust manifold 7 side so as to interpose the crankshaft 3 between the oil cooler 18 and the EGR cooler 29. That is, in a plan view, since the oil cooler 18 is disposed at the intake manifold 6 side and the EGR cooler 29 is disposed at the exhaust manifold 7 side so as to allow the crankshaft 3 of the diesel engine 1 to be interposed between the oil cooler 18 and the EGR cooler 29, as a result, a cooling-water circulation system for the EGR cooler 29 and a cooling-water circulation system for the oil cooler 18 are sorted into both right and left sides that are opposite each other with the crankshaft 3. This configuration, therefore, makes it easy to distinguish the dispositions of the respective cooling-water circulation systems to increase the ease of assembling work and maintenance.

The exhaust-gas throttle device 65 is disposed so as to be distanced from the right-side face of the head cover 8 and extend toward the cooling fan 9 side (i.e., toward the backside), and is also distanced so as to cause a rotational axial direction 65a of the exhaust-gas throttle valve, included in the throttle valve case 68 (i.e., a rotational axial direction of the motor, included in the actuator case 69) to be oblique to the right-side face of the head cover 8. Accordingly, as a result, the left-side front end of the throttle valve case 68 is located at a position closest to the right-side face of the head cover 8 and the right-side back end of the actuator case 69 is located at a position farthest from the right-side face of the head cover 8.

That is, the exhaust-gas throttle device 65 is disposed so as to be oblique to the right-side face of the diesel engine 1 in a plan view, and a space 8a is formed between the right-side face of the head cover 8 and the inner-side face (the left-side face) of the exhaust-gas throttle device 65. With this configuration, the exhaust-gas throttle device 65 is allowed to, at its back side (i.e., at the cooling fan 9 side), coupling portions (i.e., the cooling-water outlet tube 76 and the cooling-water inlet tube 77) coupled to cooling-water hoses (i.e., the cooling-water return hose 75 and the cooling-water relay hose 78) to be formed in an outward direction. This configuration, therefore, not only realizes compact support of the exhaust-gas throttle device 65 at a position adjacent to the right-side face of the diesel engine 1, but also reduces the damages of the cooling-water hoses due to their contacts with the diesel engine 1 that are caused by the mechanical vibration.

In the exhaust-gas throttle device 65, the actuator case 69 is disposed at the right side relative to the throttle valve case 68, and the cooling-water outlet tube 76 and the cooling-water inlet tube 77 are respectively disposed in an upper portion and a lower portion at the left side of the back end of the cooling case 70. That is, in a portion at the back side (at the fan 9 side) of the cooling case 70, a space enough to lay the cooling-water return hose 75 and the cooling-water relay hose 78 is ensured between the left-side face of the actuator case 69 and the right-side face of the head cover 8. This configuration, therefore, reduces the damage on the cooling-water return hose 75 and the cooling-water relay hose 78 due to their contacts with the engine body that are caused by the mechanical vibration.

The exhaust manifold 7 is configured to allow an exhaust-gas pressure sensor pipe 85 to be coupled to a pressure drawing port 83. That is, the pressure drawing port 83 is disposed on the upper face of the exhaust manifold 7; while the exhaust-gas pressure sensor tube 85 is disposed so as to extend along the right-side face of the head cover 8, and the pressure drawing port 83 is coupled to one end of the exhaust-gas pressure sensor pipe 85. Further, an exhaust-gas pressure sensor 84 is disposed at the back end side (i.e., at the cooling pump 21 side) of the head cover 8, and this exhaust-gas pressure sensor 84 is coupled to the other end of the exhaust-gas sensor pipe 85 via an exhaust-gas pressure hose 86 (a coupling component) constituted by a flexible rubber hose or any other appropriate component.

That is, the exhaust-gas sensor pipe 85 is disposed so as to pass through the space 8a between the head cover 8 and the exhaust-gas throttle device 65. This configuration, therefore, not only makes it unnecessary to cause a connection route of the exhaust-gas sensor pipe 85 from the pressure drawing port 83 of the exhaust manifold 7 to the exhaust-gas pressure sensor 84 to detour around other components so as to allow the exhaust-gas pressure sensor pipe 85 to be formed in a shot length, but also simplifies the vibration isolation structure of the exhaust-gas pressure sensor pipe 85 and coupling components. Further, in the space 8a, a space between the head cover 8 and a left end face constituting the faces of the cooling case 70 and located at a position closest to the head cover 8 is also ensured. This configuration, therefore, realizes the disposition of the cooling-water hoses (the cooling-water return hose 75 and the cooling-water relay hose 78) at a position distanced from the exhaust-gas pressure sensor tube 85 and along the exhaust-gas pressure sensor tube 85. Accordingly, this configuration reduces the damage on the cooling-water hoses due to their contacts with the engine body that are caused by the mechanical vibration.

The pressure drawing port 83 is disposed at a position between the cylinder head 5 and the relay tube 66 on the upper face of the exhaust manifold 7. Further, on the upper face of the exhaust manifold 7, a gas temperature sensor 82 is attached to the exhaust manifold 7 at a position at the outside of the pressure drawing port 83 (i.e., at the relay tube 66 side). The gas temperature sensor 82 is used for measuring an exhaust gas temperature inside the exhaust manifold 7. An electric wiring 87 of the gas temperature sensor 82 passes above the front end (the flywheel 9 side) of the head cover 8 and is coupled to a connecter disposed on the left-side face.

In a portion at the back of the diesel engine 1, the radiator 24 is disposed at a position facing the cooling fan 9 via a fan shroud (omitted from illustration). Further, an oil cooler 25 is disposed on the front face of the radiator 24 so as to face the cooling fan 9. In this way, the radiator 24 and the oil cooler 25 are disposed at a position facing the cooling fan 9 at the back side of the diesel engine 1 so as to align in a direction along the blow-off direction of cooling wind in ascending order from a smaller one of the heat radiation amounts of the radiator 24 and the oil cooler 25. Accordingly, external air is suctioned from the back side of the diesel engine 1 by the driving rotation of the cooling fan 9, and as a result, the individual radiator 24 and oil cooler 25, which are heat exchangers, are subjected to flow of the external air (cooling wind) and are air-cooled.

Next, the exhaust-gas purification device 2 will be described with reference to FIGS. 9 to 14. The exhaust-gas purification device 2 includes an exhaust-gas purification case 38, and this exhaust-gas purification housing 38 includes the purification inlet tube 36 and the purification outlet tube 37. The exhaust-gas purification case 38 is formed in a long, cylindrical shape extending in a left-and-right direction. Further, the purification inlet tube 36 and the purification outlet tube 37 are respectively disposed at the right side of the exhaust-gas purification case 38 (i.e., at the upstream side in an exhaust-gas movement direction) and the left side of the exhaust-gas purification case 38 (i.e., at the downstream side in the exhaust-gas movement direction).

Further, the exhaust-gas purification device 2 is secured on the flywheel hosing 10, and is disposed at the front side of the cylinder head 5 and the head cover 8. At this time, the purification inlet tube 36 is disposed at the back right side of the side face of the cylindrical-shaped exhaust-gas purification case 38. Further, the purification inlet tube 36 is formed in a shape obliquely upwardly bending toward the backside so as to cross the recirculation exhaust gas tube 30, and is attachably/detachably bolted to the relay tube 66. Meanwhile, the purification outlet tube 37 is disposed at the lower left side of the side face of the cylindrical-shaped exhaust-gas purification case 38, and is coupled to the tail pipe 135.

In the inside of the exhaust-gas purification case 38, a diesel oxidation catalyst 39 (a gas purification assembly) and a soot filter 40 (a gas purification assembly) are serially arranged in the exhaust-gas movement direction. The diesel oxidation catalyst 39 is made of a platinum material or any other similar material, and generates nitrogen dioxide ($NO_2$). The soot filter 40 has a honeycomb structure in which collected particulate matter (PM) is continuously oxidized and removed at a relatively low temperature. One side portion of the exhaust-gas purification case 38 is formed as a sound absorber 41, and this sound absorber 41 includes the purification outlet tube 37, which is coupled to the tail pipe 135.

With the above configuration, the nitrogen dioxide ($NO_2$), which is generated by the oxidation behavior of the diesel oxidation catalyst 39, is supplied into the soot filter 40 from its one side end face (its intake side end face). The particulate matter (PM) contained in the exhaust gas of the diesel engine 1 is collected into the soot filter 40 and then is continuously oxidized and removed by the nitrogen dioxide ($NO_2$). In addition to the removal of the particulate matter (PM) contained in the exhaust gas of the diesel engine 1, the amounts of carbon monoxide (CO) and hydrocarbon (HC) that are contained in the exhaust gas of the diesel engine 1 are reduced.

Further, a thermistor-type, upstream-side exhaust-gas temperature sensor 42 and a thermistor-type, downstream-side exhaust-gas temperature sensor 43 are attached to the exhaust-gas purification case 38. The upstream-side exhaust-gas temperature sensor 42 detects an exhaust-gas temperature at the gas-inflow-side end face of the diesel oxidation catalyst 39. The downstream-side exhaust-gas temperature sensor 43 detects an exhaust-gas temperature at the gas-outflow-side end face of the diesel oxidation catalyst.

Moreover, a differential pressure sensor 44 is attached to the exhaust-gas purification case 38. The differential pressure sensor 44 serves as an exhaust-gas pressure sensor, and detects the difference between upstream-side exhaust gas pressure and downstream-side exhaust gas pressure in the soot filter 40. With this configuration, the amount of accumulated particulate matter inside the soot filter 40 is calculated on the basis of a value of the difference between upstream-side exhaust gas pressure and downstream-side exhaust gas pressure in the soot filter 40 to grasp a clogging state of the inside of the soot filter 40.

The differential pressure sensor 44 integrally includes an electric wiring connector 51, and is supported together with electric wiring connectors 52 and 53 for the gas temperature sensors 42 and 43 by an approximately L-shaped sensor bracket (sensor support member) 46. This sensor bracket 46 is attachably/detachably secured to a sensor support portion 56, and this sensor support portion 56 is formed on a circular-arc shaped portion of one flange among outlet pinching flanges 45. That is, the sensor support portion 56 is formed as one of the outlet pinching flanges 45 that is located at the sound-absorbing side farthest from the purification inlet tube 36 side. Further, a vertical plate portion of the sensor bracket 46 is bolted to the sensor support portion 56, formed on the circular-arc shaped portion, so as to allow the sensor bracket 46 to be attachably/detachably secured to the sound-absorbing side outlet pinching flange 45. The sensor bracket 46 may be bolted to, without limited to, the outlet pinching flange 45, a different pinching flange, such as a central pinching flange bolted when the exhaust-gas purification case 38 is assembled.

One end side of each of an upstream-side sensor tube 47 and a downstream-side sensor tube 48 is coupled to the differential sensor 44. An upstream-side, sensor-tube boss member 49 and a downstream-side, sensor-tube boss member 50 are disposed in the exhaust-gas purification case 38 so as to interpose the soot filter 40 inside the exhaust-gas purification case 38 between the upstream-side, sensor-tube boss member 49 and the downstream-side, sensor-tube boss member 50. The other end side of the upstream-side sensor tube 47 and the other end side of the downstream-side sensor tube 48 are coupled to the respective sensor-tube boss members 49 and 50.

With the above configuration, the difference between exhaust gas pressure at the inflow side of the soot filter 40 and exhaust gas pressure at the outflow side of the soot filter 40 (i.e., the exhaust-gas differential pressure) is detected via the differential pressure sensor 44. Since the remaining amount of the particulate matter contained in the exhaust gas and collected by the soot filter 40 is proportional to the exhaust-gas differential pressure, when the amount of the particulate matter remaining in the soot filter 40 is increased to an amount larger than or equal to a predetermined amount, regeneration control for reducing the amount of the particulate matter remaining in the soot filter 40 (for example, control for causing the exhaust gas temperature to rise) is performed. Further, when the remaining amount of the particulate matter is further increased to an amount larger than or equal to a maximum amount of a regeneration controllable range, maintenance work for disassembling the exhaust-gas purification case 38, cleaning the soot filter 40, and assembling the exhaust-gas purification case 38 is performed to manually remove the particulate matter.

The sensor bracket 46 includes a sensor mounting portion 46*b*. This sensor mounting portion 46*b* is bent relative to a coupling portion 46*a* (i.e., the vertical plate portion) mechanically coupled to the sensor support portion 56, and supports the differential sensor 44 and the connectors 52 and 53. The sensor mounting portion 46*b* includes a lower face facing the outer circumference face of the exhaust-gas purification case 38. On this lower face, tube coupling portions coupled to the sensor tubes 47 and 48 for the differential sensor 44 are disposed so as to protrude, and a cooling-water supply tube 54 is disposed so as to surround the tube coupling portions. The sensor mounting portion 46*b* includes an upper face directed opposite a direction toward the outer circumference face of the exhaust-gas purification case 38. This upper face supports the differential sensor 44 and the connectors 51 to 53.

The sensor bracket 46 supports the differential sensor 44 and the connectors 51 to 53 on the face, which is directed opposite a direction toward the exhaust-gas purification device 2, to block radiant heat from the exhaust-gas purification device 2. That is, the differential sensor 44 and the connectors 51 to 53 are disposed at a position distanced from the exhaust-gas purification device 2, and this configuration reduces the influence of the radiant heat from the exhaust-gas purification case 38 on the electrical components, and as a result, reduces their malfunctions due to the heat.

As described below, the diesel engine 1 includes a cooling-water circulation mechanism through which cooling water is circulated into individual units of the diesel engine 1 by the cooling-water pump 21. Further, part of the cooling water, which is circulated through the cooling water circulation mechanism, is flown into the cooling-water supply tube 54, on the sensor bracket 46. This configuration of flowing part of engine cooling water into the cooling-water supply tube 54 reduces the influence of the conductive heat from the exhaust-gas purification device 2 on the sensor bracket 46, and reduces the malfunction due to the heat applied to the electrical components supported by the sensor bracket 46.

The sensor bracket 46 allows the cooling-water supply tube 54 to be disposed on a face opposite the face on which the differential sensor 44 and the connectors 51 to 53 are supported. That is, the sensor bracket 46 allows the differential sensor 44 and the connectors 51 to 53 to be supported on a face distanced from the exhaust-gas purification case 38; while the sensor bracket 46 allows the cooling-water supply tube 54 to be disposed on a face near the exhaust-gas purification case 38. The sensor bracket 46 allows the cooling-water supply tube 54 to be disposed at a position between the exhaust-gas purification case 38 and the differential sensor 44 and the connectors 51 to 53. Accordingly, this configuration, in which cooling water is flown between the exhaust-gas purification device 2 and the differential sensor 44 and the connectors 51 to 53, reduces the influence of not only the conductive heat but also the radiant heat from the exhaust-gas purification case 38 on the electrical components.

A cooling-water supply path disposed at the left side (i.e., at the intake manifold 6 side) of the diesel engine 1 will be described below. One end of a cooling-water discharge hose (a cooling-water-pump discharge-side tube) 18*a* is coupled to the cooling-water pump 21, and the other end of the cooling-water discharge hose 18*a* is coupled to a cooling-water intake port of the oil cooler 18. One end of a relay hose (an oil-cooler discharge-side tube) 18*b* is coupled to a cooling-water drain port of the oil cooler 18, and the other end of the relay hose 18*b* is coupled to a cooling-water intake port of the cooling-water supply tube 54, laid on the sensor bracket 46. Further, a cooling-water drain port of the cooling-water supply tube 54 is coupled to the cylinder block 4 via a relay hose (a cylinder-block supply-side tube) 18*c*.

That is, the oil cooler 18 and the cooling-water supply tube 54, which is laid on the sensor bracket 46, are serially coupled to the cooling-water pump 21. Further, in a cooling-water circulation path constituted of the individual hoses 18*a* to 18*c* and any other component, the oil cooler 18 and the cooling-water supply tube 54 of the sensor bracket 46 are disposed between the cooling-water pump 21 and the cylinder block 4. The cooling-water supply tube 54 of the sensor bracket 46 is positioned in a portion located at the downstream side of the oil cooler 18 and located at the upstream side of the cylinder block 4. As a result, part of the cooling water from the cooling-water pump 21 is supplied from the oil cooler 18 to the cylinder block 4 via the cooling-water supply tube 54 of the sensor bracket 46.

As described above, a configuration in which the cooling-water supply tube 54 of the sensor bracket 46 is incorporated in part of the cooling-water path for the diesel engine 1 is employed. This configuration, therefore, reduces the application of heat discharged from the diesel engine 1 and the exhaust-gas purification device 2 to the sensor 44 and the connectors 51 to 53, which are secured to the sensor bracket 46. Specifically, this configuration reduces the influence of not only the conductive heat from the exhaust-gas purification case 38 but also the radiant heat from the exhaust-gas purification device 2 and the diesel engine 1, and as a result, reduces the malfunction of the detection body of the differential pressure sensor 44 and the connectors 51 to 53 due to the heat.

Next, the securing structure of the exhaust-gas purification device 2 will be described below. The exhaust-gas purification case 38 of the exhaust-gas purification device 2 allows a coupling leg member (a left bracket) 80 to be attachably/detachably bolted to a downstream-side one of the outlet pinching flanges 45 and allows a fixing leg member (a right bracket) 81 to be welded and secured to the exhaust-gas purification case 38. At this time, securing boss portions of the coupling leg member 80 are bolted and secured to a leg fastening portion of the outlet pinching flange 45. This leg fastening portion includes through-holes, and is disposed in the circular-arc shaped portion of the outlet pinching flange 45. Further, the fixing leg member 81 is welded and secured to the outer circumference face of the exhaust-gas purification case 38 at the purification inlet tube 36 side. That is, the fixing leg member 81 is disposed at the inlet side (i.e., at the upstream side) of the exhaust-gas purification case 38, and the coupling leg member 80 is disposed at the outlet side (i.e., at the downstream side) of the exhaust-gas purification case 38. The coupling leg member 80 may be fastened to, not limited to the outlet pinching flange 45, a different pinching flange, such as a central flange fastened when the exhaust-gas purification case 38 is assembled.

Each of the coupling leg member 80 and the fixing leg member 81, which are disposed on the outer circumference of the exhaust-gas purification case 38, is bolted to a corresponding one of purification device securing portions (DPF securing portions) 89. The purification device securing portions 89 are formed on the upper-face side of the flywheel housing 10. That is, the exhaust-gas purification device 2 is stably secured and supported on the flywheel housing 10, which is a highly rigid member, by the coupling leg member 80 and the fixing leg member 81. Accordingly, the exhaust-gas purification device 2 is involved in a vibration system of the engine 1, but is tightly secured to the flywheel housing 10, which is a highly rigid component, as one of the constituent components of the engine 1, and thus, this configuration reduces the damage on the exhaust-gas purification device 2 due to the vibration of the engine 1. This configuration enables the shipment of the engine 1 provided with the exhaust-gas purification device 2, having been incorporated into the engine 1 at a place where the engine 1 is produced. Further, this configuration brings the exhaust-gas purification device 2 into communication with the exhaust manifold 7 of the engine 1 at an extremely close distance. Thus, this configuration facilitates the keeping of the exhaust-gas purification device 2 to an appropriate temperature to ensure the maintaining of the high exhaust-gas purification performance.

As described above, the exhaust-gas purification device (DPF) 2 is structured to allow the diesel oxidation catalyst 39, made of, for example, a platinum material, and the soot filter 40, having a honeycomb structure, to be serially arranged and contained in a DPF casing 38 (i.e., the exhaust-gas purification case 38), made of a heat-resistant, metallic material, via an inner case (omitted from illustration) having a cylindrical shape. The exhaust-gas purification device 2 is secured to the flywheel housing 10 via a flange-side bracket leg 80 (i.e., the coupling leg member 80) and a casing-side bracket leg 81 (i.e., the fixing leg member 81). The flange-side bracket leg 80 and the casing-side bracket leg 81 serve as support members. In this case, one end of the flange-side bracket leg 80 is attachably/detachably bolted to the outer circumference side of the DPF casing 38 via the flange 45. One end of the casing-side bracket leg 81 is integrally welded and secured to the outer circumference face of the DPF casing 38.

Meanwhile, the other end of the flange-side bracket leg 80 is attachably/detachably secured to the upper face (i.e., one of the DPF securing portions) of the flywheel housing 10 using a pre-mounted bolt 90 and a post-mounted bolt 91. That is, bolt through-holes 90a and 91a are formed in the flange-side bracket 80. Screw holes 90b and 91b are upwardly formed in the DPF securing portions 89. The casing-side bracket leg 81 is mounted on the flat, upper face of one of the DPF securing portions 89, and the pre-mounted bolt 91 and the post-mounted bolt 91 are respectively fastened to the screw hole 90b and the screw hole 91b via the bolt through-hole 90a and the bolt through-hole 91a. In this way, the exhaust-gas purification device 2 is configured to be attachably/detachably fixed to the upper face of the flywheel housing 10 via the flange-side bracket leg 80.

Further, the other end of the casing-side bracket leg 81 is attachably/detachably fastened to one of the DPF securing portions 89 on the upper face of the flywheel housing 10 using two post-mounted bolts 91. That is, bolt through-holes 91a are formed in the casing-side bracket leg 81. Screw holes 91b are upwardly formed in the one of the DPF securing portions 89. The casing-side bracket leg 81 is mounted on the flat, upper face of the one of the DPF securing portions 89, and the post-mounted bolts 91 are fastened to the screw holes 91b via the bolt through-holes 91a. In this way, the exhaust-gas purification device 2 is configured to be attachably/detachably fixed to the upper face of the flywheel housing 10 via the casing-side bracket leg 81.

Moreover, a notch groove 92 is formed at the other side of the flange-side bracket leg 80. This notch groove 92 is used for allowing the pre-mounted bolt 90 to be engageably inserted into the bolt through-hole 90a. The notch groove 92 is formed at the front edge of the flange-side bracket leg 80 so as to allow an opening portion of the notch groove 92 to be located at the forefront when the exhaust-gas purification device 2 is assembled to the diesel engine 1. The open edge portion of the notch groove 92 is formed in a taper shape gradually widened toward the end (gradually widened forward).

With the above configuration, when the exhaust-gas purification device 2 is assembled to the diesel engine 1, first, the pre-mounted bolt 90 is incompletely secured to one of the DPF securing portions 89, disposed on the upper face of the flywheel housing 10, via the screw hole 90b. In a state in which the head portion of the pre-mounted bolt 90 protrudes from the upper face of the one of the DPF securing portions 89 by a distance larger than or equal to the plate thickness of the flange-side bracket leg 80, the pre-mounted bolt 90 is supported by the one of the DPF securing portion 89. Further, a worker lifts the exhaust-gas purification device 2 with his or her both hands and allows the head portion of the pre-mounted bolt 90t to be latched with the screw hole 90b of the flange-side bracket leg 80 via the notch grove 92 to temporarily secure the exhaust-gas purification device 2 to the upper face of the flywheel housing 10. In this state, the worker is able to release his or her both hands from the exhaust-gas purification device 2.

Afterward, the flange-side bracket leg 80 and the casing-side bracket leg 81 are fastened to the respective DPF securing portions 89, disposed on the upper face of the flywheel housing 10, using three post-mounted bolts 91. Meanwhile, an inlet flange member 36a is fastened to the relay tube 66 via studs 36x and inlet flange nuts 36y to allow an exhaust-gas inlet tube 36 (i.e., the purification inlet tube 36) to be fixedly secured to the relay tube 66.

Next, the pre-mounted bolt 90 is completely fastened to the one of the DPF securing portions 89, disposed on the face of the flywheel housing 10, so as to allow the exhaust-gas purification device 2 to be attachably/detachably secured to the exhaust-gas outlet side of the relay tube 66 and the upper face of the flywheel housing 10, and, as a result, the work for assembling the exhaust-gas purification device 2 to the diesel engine 1 is completed. Since the bolt through-hole 90a, for use in the insertion of a bolt, is formed at the front-side edge of the flange-side bracket leg 80 so as to communicate with the notch groove 92, the worker is able to, in a state in which the worker has temporarily secured the pre-mounted bolt 90 and has placed the pre-mounted bolt 90 in an incompletely fastened (semi-fixed) attitude, lift the DPF casing 38 with his or her both hands and shift the DPF casing 38 to the securing portion of the diesel engine 1 (or the machine body), that is, to the upper face of the flywheel housing 10 to engage the pre-mounted bolt 90 with the bolt through-hole 90a via the notch groove 92.

When the diesel engine 1, to which the exhaust-gas purification device 2 is secured, is viewed from its top side, the securing position of the pre-mounted bolt 90 in the one of the DPF securing portions 89 overlaps the installation position of a recirculation exhaust-gas tube 61; while each of the securing positions of the post-mounted bolts 91 in the both DPF securing portions 89 does not overlap the installation position of the recirculation exhaust-gas tube 6. That is, the screw hole 90*b* in the one of the DPF securing portions 89 is disposed below the recirculation exhaust-gas tube 61, installed at the front side of the cylinder head 5; while the screw holes 91*b* are disposed at positions out of the installation position of the recirculation exhaust-gas tube 61 in a plan view.

Accordingly, when temporarily securing the pre-mounted bolt 90 to the one of the DPF securing portions 89, the worker secures the pre-mounted bolt 90 to the screw hole 90*b*, located below the recirculation exhaust-gas tube 61, but this securing operation is performed before assembling the exhaust-gas purification device 2, the worker is able to easily perform the securing operation from the front side of the diesel engine 1 (i.e., from the front side of the flywheel housing 10). Further, after the operation of temporarily securing the pre-mounted bolt 90, the worker slides the exhaust-gas purification device 2 from the front side of the diesel engine 1 (i.e., from the front of the flywheel housing 10) toward the front face of the cylinder head 5 while causing the lower faces of the leg members (the bracket legs) 80 and 81 to be along the upper faces of the DPF assembling portions 89. That is, the worker slides the exhaust-gas purification device 2 so as to allow the pre-mounted bolt 90 to pass through the notch groove 92 to set the leg members (the bracket legs) 80 and 81 onto the respective DPF assembling portions 89.

With this operation, the exhaust-gas purification device 2 is mounted on the DPF securing portions 89 in a state in which the pre-mounted bolt 90 is latched with the bolt through-hole 90*a* of the flange-side bracket leg 80. At this time, as a result, the bolt through-holes 91*a* of the leg members (the bracket legs) 80 and 81 are each located above a corresponding one of the screw holes 91*b* of the DPF securing portions 89. Further, the worker is able to, from the top side of the diesel engine 1, confirm the positions of each bolt through-hole 91*a* and each screw hole 91*b*, which communicate with each other in a state of overlapping with each other in an upper-and-lower direction, at a position in the vicinity of the recirculation exhaust-gas tube 61. That is, since each bolt through-hole 91*a* and each screw hole 91*b* are located at positions not overlapping the recirculation exhaust-gas tube 61 in a plan view, the worker is able to insert and secure each post-mounted bolt 91 from a position immediately above the each bolt through-hole 91*a* and the each screw hole 91*b*.

When performing the assembling in such a manner as described above, the worker is able to, in a state of releasing his or her hands from the DPF casing 38, fasten the post-mounted bolts 91 (bolts) to secure the flange-side bracket leg 80 and the casing-side bracket leg 81. The worker is able to remove the exhaust-gas purification device 2 in a procedure reverse to the procedure described above. As a result, the exhaust-gas purification device 2 (the DPF casing 38) is stably secured and supported through the bracket legs 80 and 81 and the relay tube 66 at a position located on the upper portion of the flywheel housing 10, having a high rigidity, and located at the front side of the diesel engine 1. Further, one worker is able to perform the operation of attaching/detaching the exhaust-gas purification device 2 to/from the diesel engine 1.

In this way, the diesel engine 1 includes the exhaust-gas purification case 2, which purifies the exhaust gas, and disposes the exhaust-gas purification device 2 at the upper-face side of the diesel engine 1. Further, a structure that allows a temporarily securing engagement member 90 to be disposed in one of the diesel engine 1 and the exhaust-gas purification device 2 and allows a temporarily securing engagement notch 92 to be disposed in the other one of the diesel engine 1 and the exhaust-gas purification device 2 is employed, and a temporarily securing engagement member 87 or the temporarily securing engagement notch 92 is disposed at the lower side of attachment components of the diesel engine 1. Accordingly, this configuration enables the worker to fasten the post-mounted bolt 91 for the exhaust-gas purification device 2 at a position out of the attachment components, and thus, increases the ease of the operation of assembling/disassembling the exhaust-gas purification device 2.

The diesel engine 1 is structured to allow the exhaust-gas purification device 2 to be mounted on the flywheel housing 10, and allows the recirculation exhaust-gas tube 61, serving as an attachment component, to be disposed so as to extend between the diesel engine 1 and the exhaust-gas purification device 2. With this configuration, therefore, the recirculation exhaust-gas tube 61 is allowed to detour to a side face (a front-side side face) of the diesel engine 1, and this configuration realizes forming of the attachment height into a compact height. Further, the method of temporarily securing and supporting the exhaust-gas purification device 2 at the upper side of the flywheel housing 10 via the temporarily securing engagement member 90 increases the ease of the securing operation.

Further, the diesel engine 1 allows an exhaust-gas outlet tube 66 (i.e., the relay tube 66) to be fixedly secured to the exhaust manifold 7 via an exhaust-gas throttle valve case 68 (i.e., the throttle valve case 68) and allows the exhaust-gas outlet tube 66 to be coupled to the inlet tube 36 of the exhaust-gas purification device 2. This configuration, therefore, facilitates changing the securing position of the exhaust-gas purification device 2 and any other position merely by changing the specification for the exhaust-gas outlet tube 66, and thus, facilitates installing the diesel engine 1, in which the exhaust-gas purification device 2 is mounted, in accordance with an engine room space of any desired one of various types of work vehicles.

Figure 15:
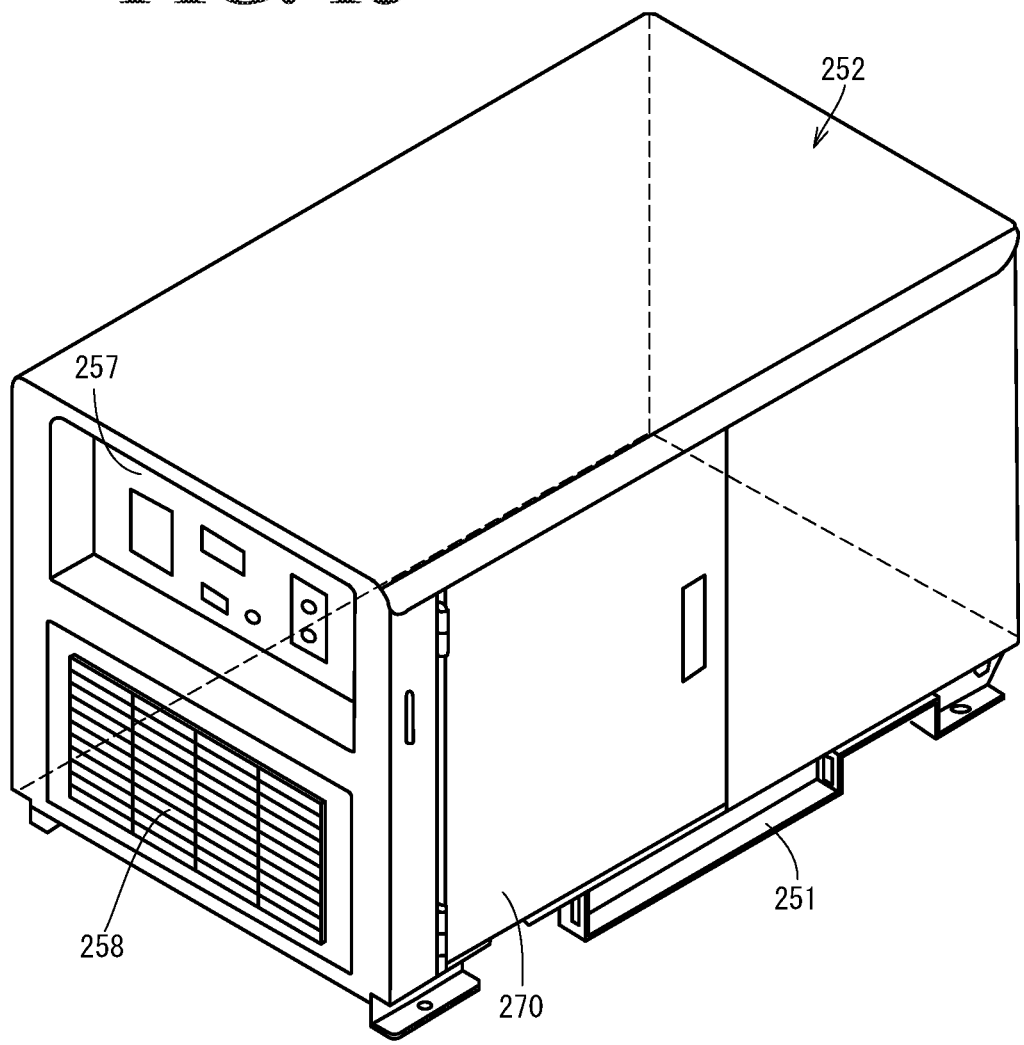
FIG. 15 is a perspective view of a stationary work machine, an embodiment of a work machine mounting a diesel engine, an embodiment of the present invention.
Figure 16:
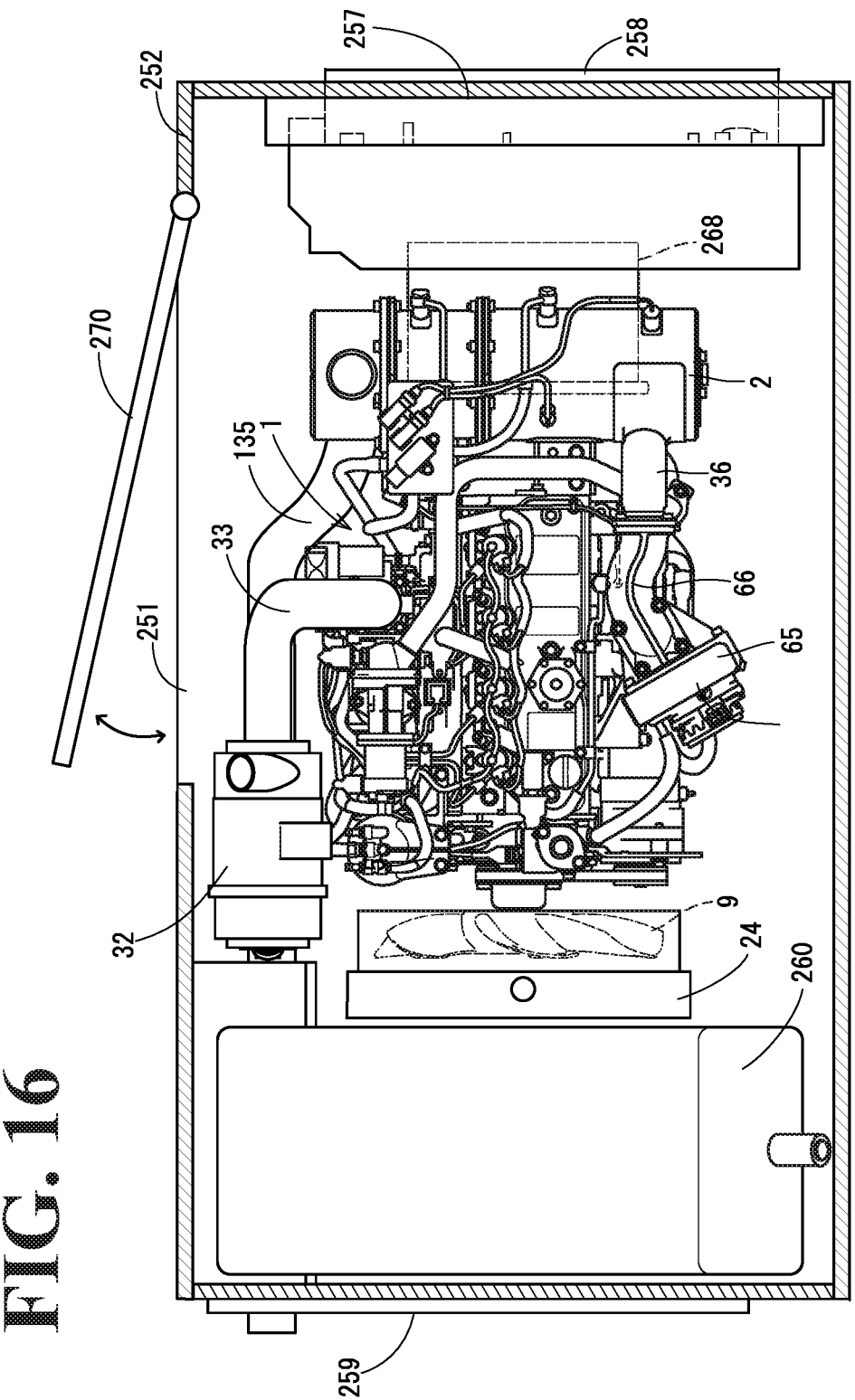
FIG. 16 is a plan, cross-sectional view of the stationary work machine illustrated in FIG. 13.
Figure 17:
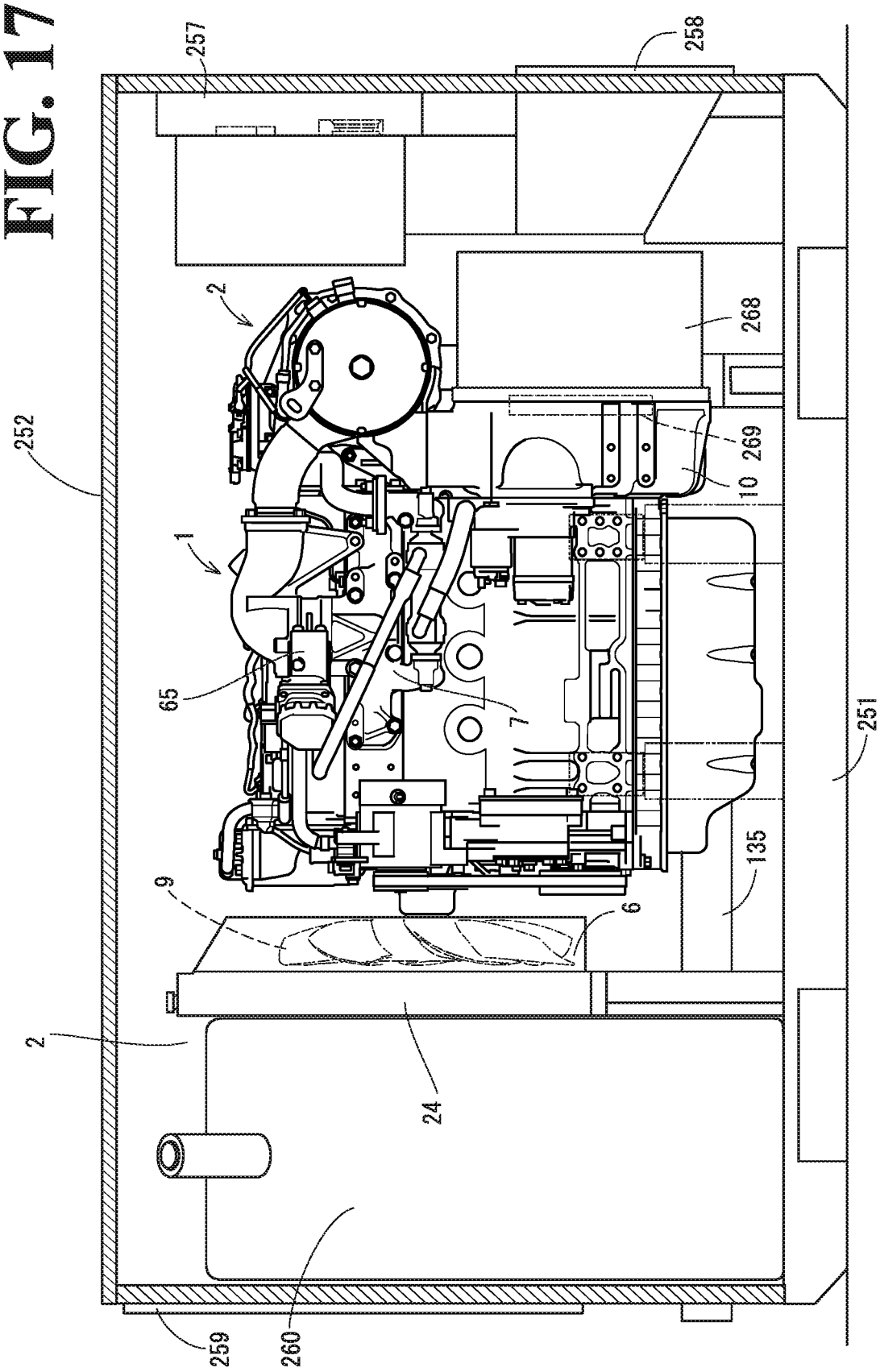
FIG. 17 is a side, cross-sectional view of the stationary work machine.

Hereinafter, referring to FIGS. 15 to 17, a work machine mounting the above diesel engine 1 will be described on the basis of some of the drawings. FIGS. 15 to 17 are diagrams illustrating an engine generator serving as a stationary work machine.

The structure of a stationary work machine according to this embodiment will be described below with reference to FIGS. 15 to 17. As shown in FIGS. 15 to 17, a machine chassis 252 is mounted on a machine frame base 251. This machine chassis 252 has a rectangular box shape. The diesel engine 1 is disposed at a place located in the inside of the machine chassis 252 and located at the center of the upper face of the machine frame base 251. The radiator 24 is disposed at a side where the cooling fan 9 is installed, that is, at the front side of the diesel engine 1. A power generator 268 described below is disposed at the back side of the diesel engine 1, and an operation panel 257 and an external-air intake port 258 are disposed in a wall of the machine chassis 252 at the side where the power generator 268 is installed.

Further, the air cleaner 32 and the exhaust-gas recirculation device (EGR) 26 are disposed at the side of the intake manifold 3, which is disposed on the right side-face of the diesel engine 1. The air cleaner 32 performs the dust-removal and the purification of external air. The exhaust-gas recirculation device (EGR) 26 recirculates part of the exhaust gas to the individual cylinders of the diesel engine 1 via the intake manifold 6. The air cleaner 32 is coupled to the intake manifold 6 via the exhaust-gas recirculation device 26 and the intake tube 33, and fresh air is supplied to the diesel engine 1 from the air cleaner 32.

Meanwhile, an exhaust-gas throttle valve 65 (i.e., the exhaust-gas throttle device 65) is disposed at the side of the exhaust manifold 7, which is disposed on the left side-face of the diesel engine 1. The inlet tube 36 of the exhaust-gas purification device 2 is coupled to the exhaust manifold 7, which is fixed on the flywheel housing 10, via the exhaust-gas throttle valve 65. Further, the exhaust-gas purification device 2 is coupled to the tail pipe 135, and exhaust gas discharged from the diesel engine 1 is emitted from the tail pipe 135 to the outside of the machine chassis 252.

A warm-air discharge port 259 is disposed in a wall of the machine chassis 252 at the side where the radiator 24 is installed, and a fuel tank 260 for the diesel engine 1 is disposed at a position located on the upper face of the machine frame base 251 and located at the side where the radiator 24 is installed. Further, a door 270 is openably/closably disposed on a side wall of the machine chassis 252, and is used for maintenance work for the air cleaner 32 and/or the exhaust-gas purification case 21. This door 270 is configured to enable a worker to enter/exit the inside of the machine chassis 252.

The power generator 268, serving as a work machine, is secured to the flywheel housing 10 of the diesel engine 1. A driving shaft of the power generator 268 is caused to be coupled to an output shaft 3 (i.e., the crankshaft 3) of the diesel engine 1 via a PTO clutch 269, which is connected/disconnected by manual operation by a worker, to allow the diesel engine 1 to drive the power generator 268. Power generated by the power generator 268 is configured to serve as a power source supplied to remotely-placed, electrically-powered devices via electric cables. A compressor, a hydraulic pump, or any other device that is driven by the diesel engine 1 in a way similar to that for the power generator 268 may be provided to constitute a stationary work machine for use in building work, civil engineering work, or any other similar work.

Figure 18:
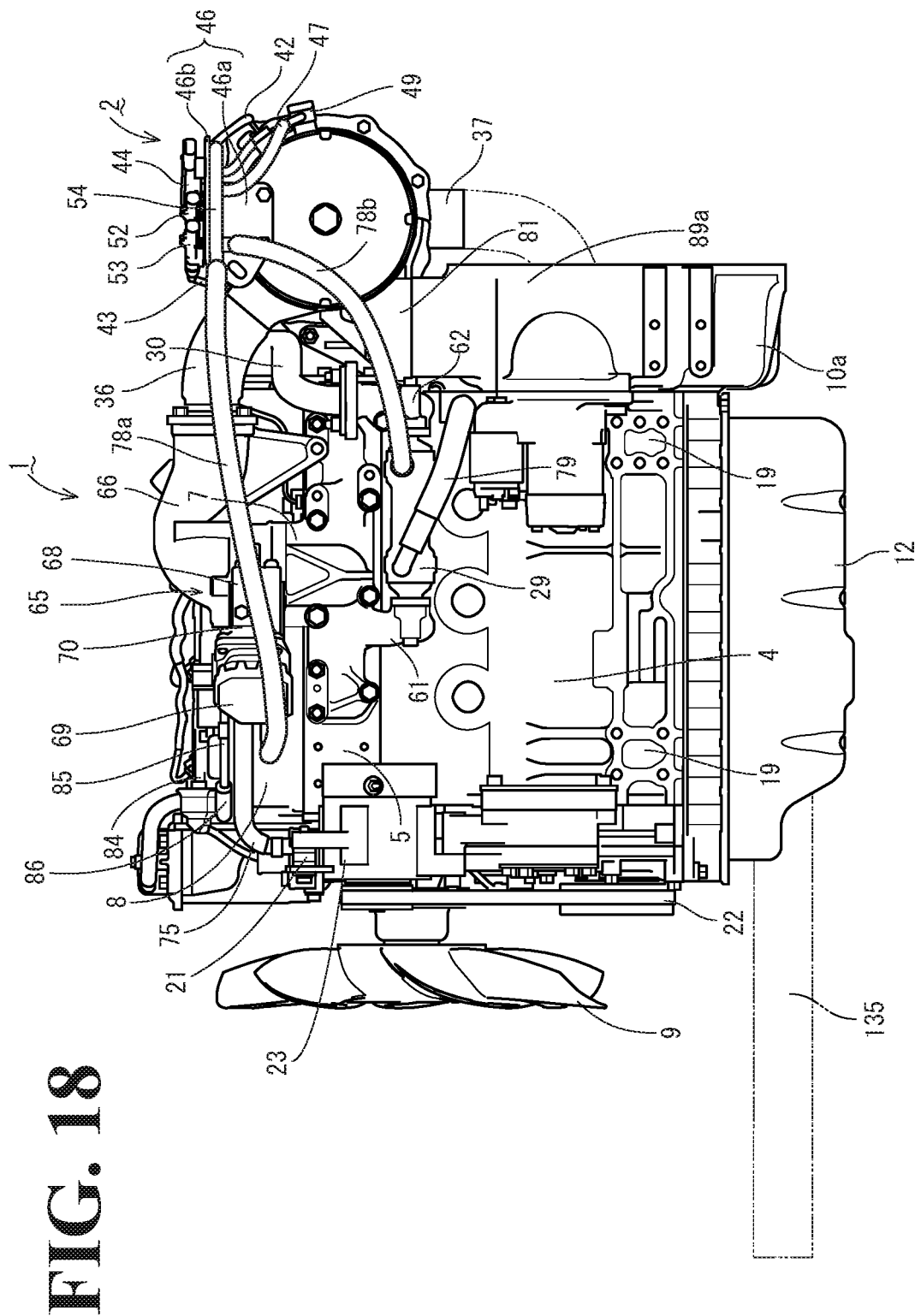
FIG. 18 is a right side view of a diesel engine, another embodiment of the present invention.

The present invention is not limited to the aforementioned embodiment, and may be embodied into various embodiments. For example, as shown in FIG. 18, in a diesel engine 1a, an engine device according to another embodiment of the present invention, cooling water may be supplied to the sensor bracket (sensor support member) 46 from a cooling-water supply path disposed at the right side of the diesel engine 1a (i.e., at the exhaust manifold 7 side). A cooling-water path to the sensor bracket 46 in the diesel engine 1a shown in FIG. 18 will be described below.

As shown in FIG. 18, the diesel engine 1a allows the sensor bracket 46 to be secured to the right-side end face of the exhaust-gas purification case 38 (i.e., to a cover disposed at the upstream side in the exhaust-gas movement direction) in the exhaust-gas purification device 2. The sensor bracket 46 is disposed at a position located at the outside of the exhaust-gas purification case 38 and located along the long-length direction of the exhaust-gas purification device 2. That is, the sensor bracket 46 is secured to the right-side end face of the exhaust-gas purification device 2 and is disposed at a position at the outside of the right-side end face (i.e., at the right side of the right-side end face) of the exhaust-gas purification device 2.

The cooling-water supply path disposed at the right side (i.e., at the exhaust manifold 7 side) of the diesel engine 1a will be described below. One end of the cooling-water return hose (the cooling-water-pump intake-side tube) 75 is coupled to the cooling-water pump 21, and the other end of the cooling-water return hose 75 is coupled to the cooling-water outlet tube 76 of the water cooling case 70. One end of a relay hose (a water cooling case supply side tube) 78a is coupled to the cooling-water inlet tube 77 of the cooling water case 70, and the other end of the relay hose 78a is coupled to the cooling-water drain port of the cooling-water supply tube 54, provided on the bracket 46. Further, one end of a relay hose (an EGR cooler discharge-side tube) 78b is coupled to the cooling-water intake port of the cooling-water supply tube 54, and the other end of the relay hose 78b is coupled to the cooling-water drain port of the EGR cooler 29. Further, the cooling-water intake port of the EGR cooler 29 is coupled to the cylinder block 4 via the cooling-water drawing hose (the EGR cooler intake-side tube) 79.

That is, the cooling-water supply tube 54, laid on the sensor bracket 46, is serially coupled to the cooling water pump 21 together with the EGR cooler 29 and the exhaust-gas throttle device 65. Further, in the cooling-water circulation path constituted of the individual hoses 75, 78a, 78b, and 79 and any other hose, the exhaust-gas throttle device 65 and the cooling-water supply tube 54, which is laid on the sensor bracket 46, are disposed between the cooling water pump 21 and the EGR cooler 29. The cooling-water supply tube 54, laid on the sensor bracket 46, is disposed at a position located at the downstream side of the EGR cooler 29 and located at the upstream side of the exhaust-gas throttle device 65. Part of the cooling water from the cooling water pump 21 is flown into the cooling-water supply tube 54, laid on the sensor bracket 46, via the EGR cooler 29, and then is supplied to the exhaust-gas throttle device 65. Afterward, as a result, the part of the cooling water is circulated.

Further, the engine device according to the present invention can be broadly applied to, not only the engine generator described above, but also various work machines, such as agricultural machines including a combine, a tractor, and any other similar agricultural machine, and particular work vehicles including a forklift car, a wheel loader, and any other similar work vehicle. Hereinafter, a structure in which the above diesel engine 1 is mounted in a tractor 280 will be described with reference to FIGS. 19 and 20.

Figure 19:
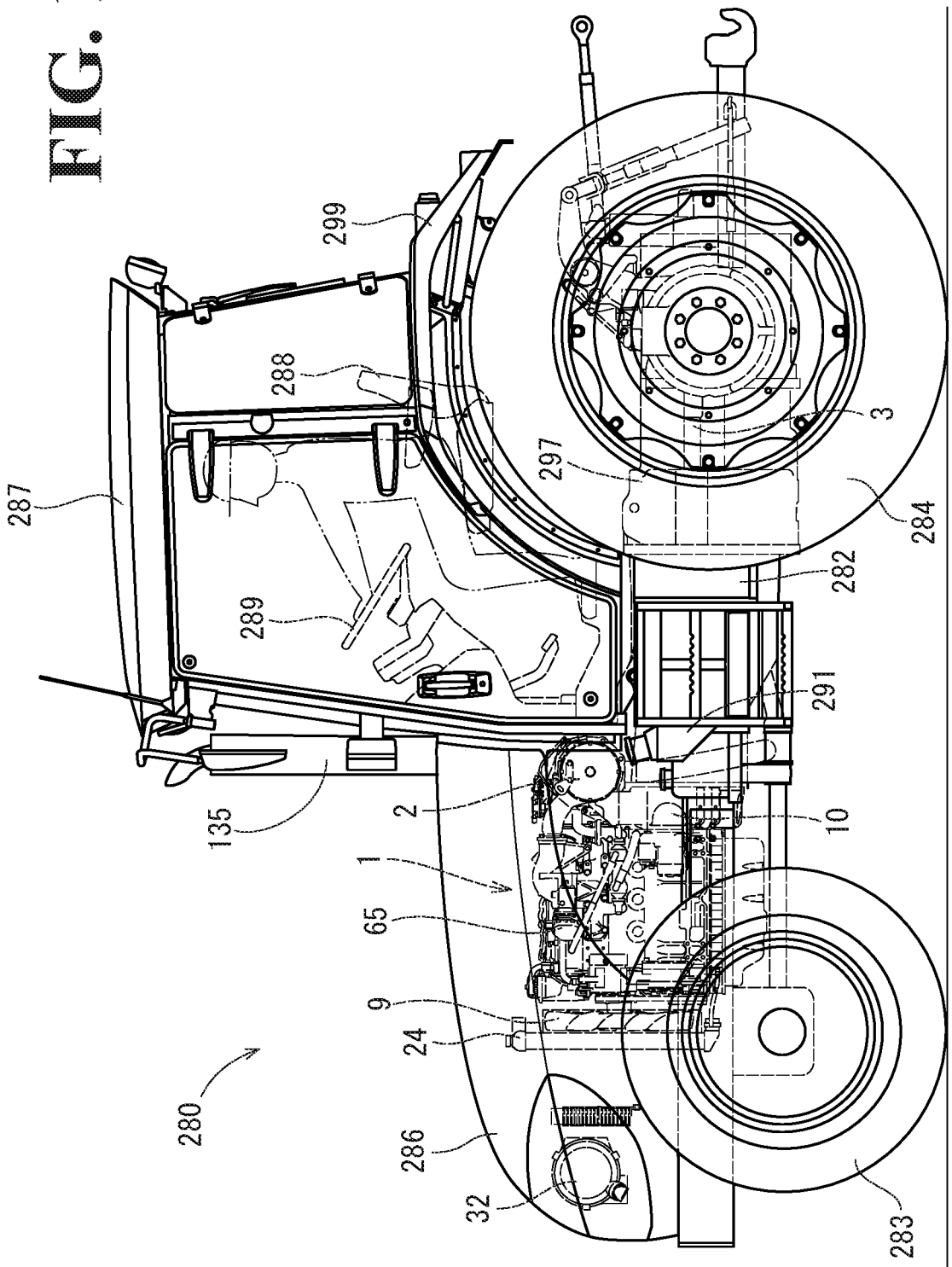
FIG. 19 is a side view of a tractor, another embodiment of a work machine mounting a diesel engine, an embodiment of the present invention.
Figure 20:
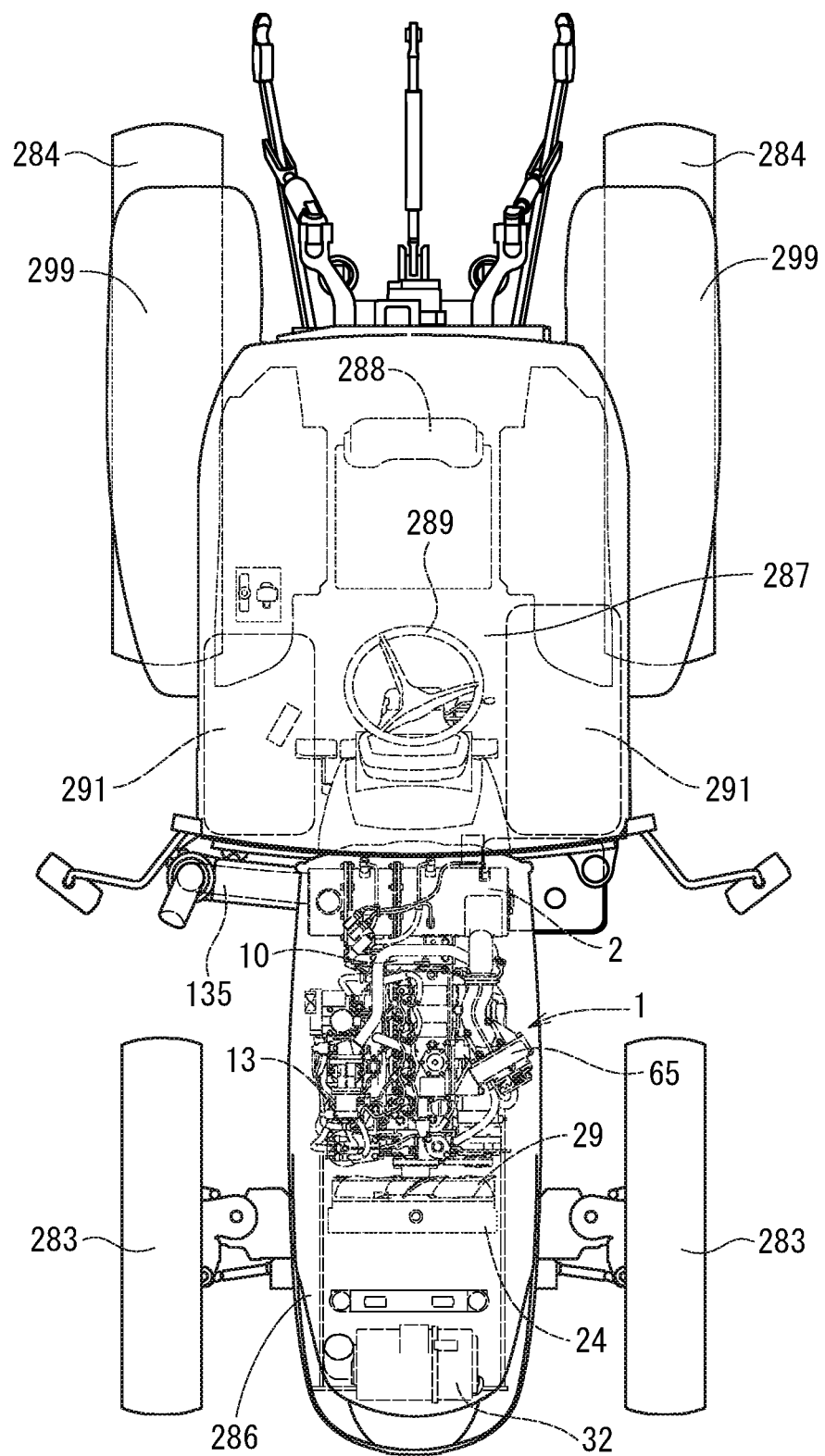
FIG. 20 is a plan view of the tractor.

The outline of the tractor 280 shown in FIGS. 19 and 20 will be described below. The tractor 280 in this embodiment includes a travelling machine body 282, and this travelling machine body 282 is supported by a pair of left and right front wheels 283 and a pair of left and right rear wheels 284. The pair of front wheels 283 and the pair of rear wheels 284 serve as travelling units. The diesel engine 1, which is of a common rail type, is mounted at the front side of the travelling machine body 282 and serves as a power source. The diesel engine 1 is configured to drive the rear wheels 284 and the front wheels 283 to allow the tractor 280 to travel forward and backward. The engine 1 is covered by a bonnet 286.

A cabin 287 is disposed on the upper face of the travelling machine body 282. In the inside of the cabin 287, a steering seat 288 and a steering handle (a circular handle) 289 are disposed. The steering operation of the steering handle 289 changes the steering direction so as to cause the travelling direction of the front wheels 283 to be changed to the left or the right. A fuel tank 291 is disposed below the bottom of the cabin 287, and fuel is supplied from this fuel tank 291 to the engine 1. A mission case 297 is mounted at the back side of the travelling machine body 282. The rotation power from the engine 1 is appropriately gear-changed in the mission case 297, and then is transmitted to the four front and rear wheels 283, 283, 284, and 284. The upper portions of the left and right rear wheels 284 are covered by fenders 299. These fenders 299 are fixed to the travelling machine body 282.

In this tractor 280, the engine 1 is disposed inside an engine room below the bonnet 286, which is located anterior to the cabin 287, and the flywheel housing 10 is disposed so as to be located anterior to the cabin 287. Further, the exhaust-gas purification device 2 is disposed at the upper back side of the engine 1. That is, the exhaust-gas purification device 2 is disposed above the flywheel housing 10, which is disposed at the back side of the engine 1. Further, the radiator 24, the oil cooler 25, and the air cleaner 32 are disposed at positions located at the front side of the engine 1 and located facing the cooling fan 9.

The engine 1, the exhaust-gas purification device 2, and the radiator 24, and the air cleaner 32, which are disposed anterior to the cabin 287 in such a way as described above, are covered by the bonnet 286, disposed anterior to the cabin 287. Further, the bonnet 286 is openably and closably configured so as to enable a worker to access the engine 1 and the exhaust-gas purification device 2. Further, the engine 1 is disposed so as to allow the crankshaft 3 to be along the front-and-back direction of the tractor 280. Further, the exhaust-gas purification device 2 is disposed so as to allow its long-length direction to be along the left-and-right direction of the tractor 280, that is, so as to its long-length direction perpendicular to the crankshaft 3 of the engine 1.

Figure 21:
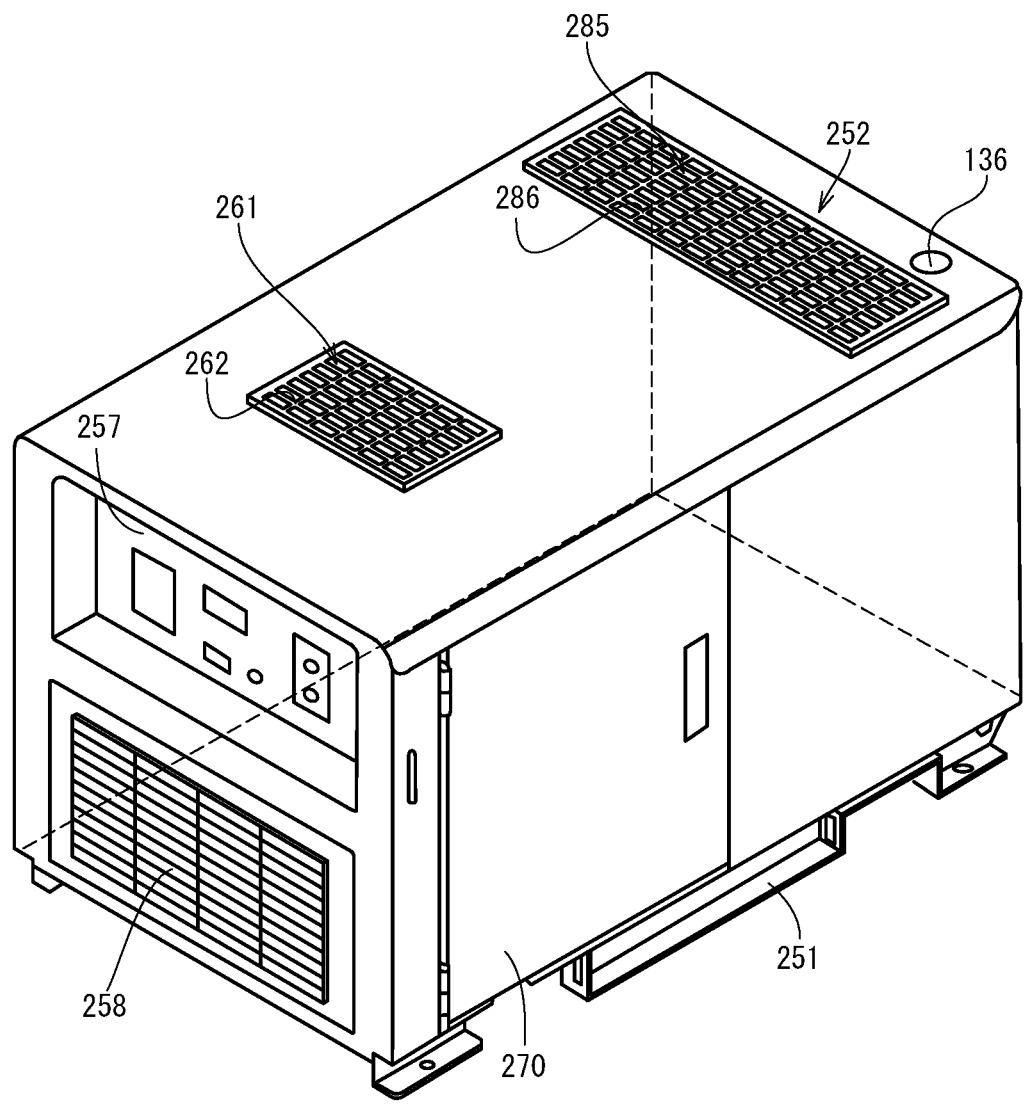
FIG. 21 is a perspective view of a stationary work machine, another embodiment of a work machine mounting a diesel engine, an embodiment of the present invention.
Figure 22:
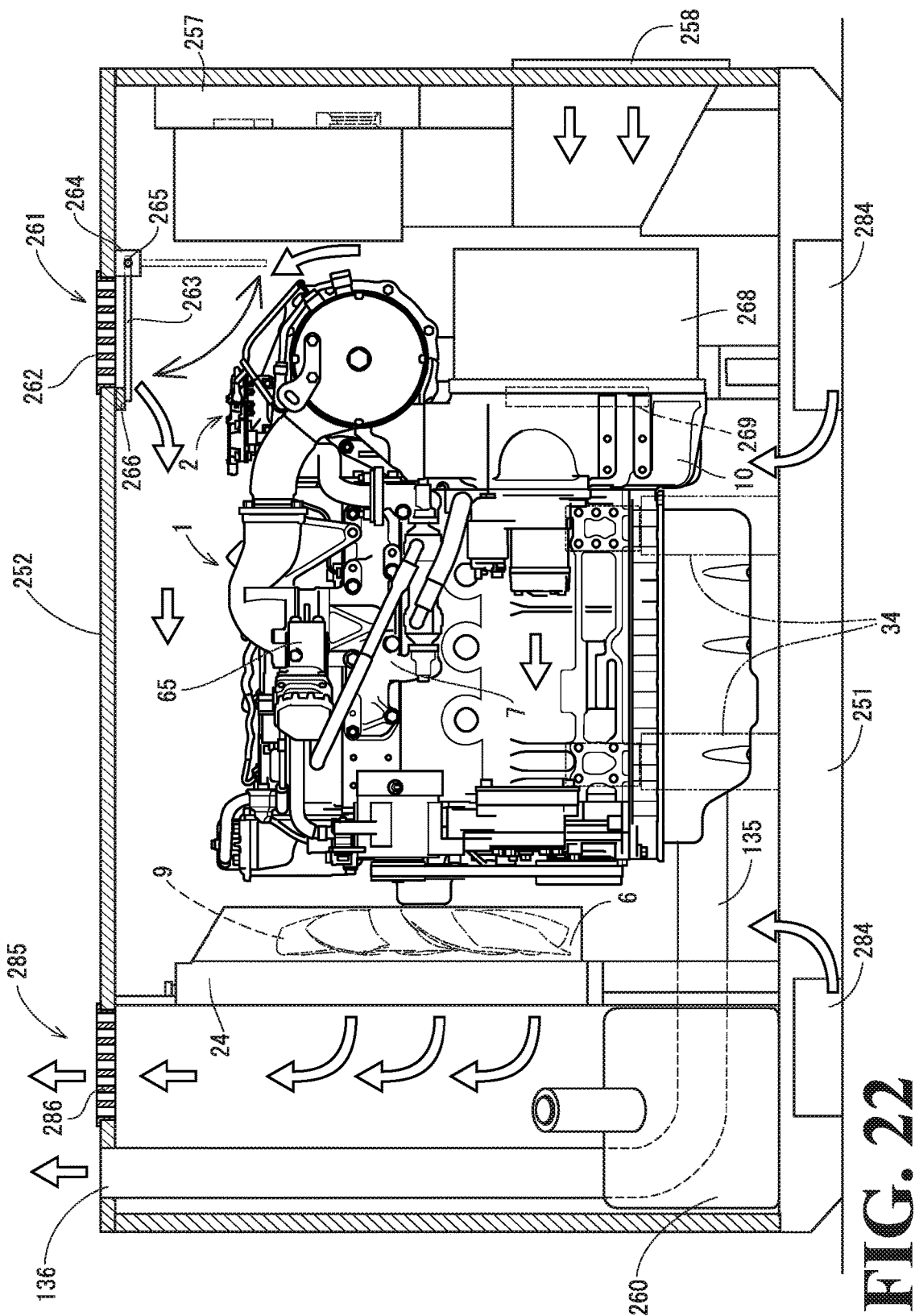
FIG. 22 is a side, cross-sectional view of the stationary work machine.

Next, another embodiment of the stationary work machine in which the above engine 1 is mounted will be described with reference to FIGS. 21 and 22. In this another embodiment, a compressor is employed as the stationary work machine. This compressor is of an engine driven type, and is used for an air conditioner (omitted from illustration). FIGS. 21 and 22 are diagrams illustrating the engine driven-type compressor.

As shown in FIGS. 21 and 22, a machine chassis 252 is mounted on a machine frame base 251. This machine chassis 252 has a rectangular box shape. The engine 1 is disposed at a place located in the inside of the machine chassis 252 and located at the center of the upper face of the machine frame base 251. The radiator 24 is disposed at a side where the cooling fan 9 is installed, that is, at the front side of the engine 1. A compressor 268 is disposed at the back side of the engine 1, and an operation panel 257 and an external-air intake port 258 are disposed in a wall of the machine chassis 252 at the side where the compressor 268 is installed. In the machine frame base 251, lower-side external-air intake ports 284 are disposed in a plurality of portions to take external air into the machine chassis 252.

Further, the air cleaner 32 and the exhaust-gas recirculation device (EGR) 26 are disposed at the side of the intake manifold 6, which is disposed on the right side-face of the diesel engine 1. The air cleaner 32 performs the dust-removal and the purification of external air. The exhaust-gas recirculation device (EGR) 26 recirculates part of the exhaust gas to the individual cylinders of the diesel engine 1 via the intake manifold 6. The air cleaner 32 is coupled to the intake manifold 6 via the exhaust-gas recirculation device 26 and the intake tube 33, and fresh air is supplied to the engine 1 from the air cleaner 32.

Meanwhile, an exhaust-gas throttle valve 65 (i.e., the exhaust-gas throttle device 65) is disposed at the side of the exhaust manifold 7, which is disposed on the left side-face of the diesel engine 1. The inlet tube 36 of the exhaust-gas purification device 2 is coupled to the exhaust manifold 7, which is fixed on the flywheel housing 10, via the exhaust-gas throttle valve 65. Further, the exhaust-gas purification device 2 is coupled to the tail pipe 135, and the exhaust gas from the diesel engine 3 is emitted from the exhaust port 136 of the tail pipe 135 to the outside of the machine chassis 252. The tail pipe 135 extends toward the side where the radiator 24 is installed, and upwardly bends at a midst position. The exhaust port 136 of the tail pipe 136 penetrates the upper face of the machine chassis 252 and communicates with the outside.

A warm-air discharge port 285 is disposed in a portion located adjacent to the exhaust outlet 136 of the tail pipe 135 and is formed in the upper face of the machine chassis 252. The warm-air discharge port 285 brings communication between the inside and the outside of the machine chassis 252. The warm-air discharge port 285 includes a grid-shaped exhaust frame 286. The fuel tank 260, for the engine 1, is disposed on the upper face of the machine frame base 251 at the side where the radiator 24 is installed. Further, the door 270 is openably/closably disposed on a side wall of the machine chassis 252 to allow maintenance work on the air cleaner 32 and/or the exhaust-gas purification case 21 to be carried out. This door 270 is configured to enable a worker to enter/exit the inside of the machine chassis 252. Fresh air (cooling wind) taken from the external-are intake port 258 of the machine chassis 252 by the rotation of the cooling fan 9 is blown against the compressor 268, the engine 1, and the radiator 24, and then is emitted toward the outside through the warm-air discharge port 259 of the machine chassis 252.

The compressor 268, serving as a work unit, is secured to the flywheel housing 10 of the engine 1. A driving shaft of the compressor 268 is coupled to the crankshaft 3 of the diesel engine 1 via the PTO clutch 269, which is connected/disconnected by manual operation by a worker, to allow the diesel engine 1 to drive the compressor 268. For example, a configuration is made such that the compressor 268 is allowed to compress a refrigeration medium of the air conditioner to cause temperature inside a freight transport container to be kept to an cold storage temperature appropriate to the storage of frozen freight (for example, around −20° C.). A power generator, a hydraulic pump, or any other device that is driven by the engine 1 in a way similar to that for the compressor 268 may be provided to constitute a stationary work machine for use in building work, civil engineering work, or any other similar work.

As shown in FIGS. 21 and 22, a ventilation opening 261 is formed in the upper face of the machine chassis 252. The ventilation opening 261 brings communication between the inside and the outside of the machine chassis 252. The exhaust-gas purification device 2 faces the ventilation opening 261 from below. The ventilation opening 261 includes a grid-shaped ventilation frame 262. A shutter plate 263 is disposed inside the machine chassis 252. This shutter plate 263 is used for opening/shutting the ventilation opening 261. In this case, on the upper inner face of the machine chassis 252, a pair of downwardly protruding support plates 264 are disposed at both left and right sides of the periphery of the ventilation opening 261. The both left and right edges of a laterally-long pivot support shaft 265, which is formed in the shutter plate 263, are pivotably supported by the both left and right support plates 264. Accordingly, the shutter plate 263 is upwardly/downwardly pivotable about the pivot support shaft 265. A shock-absorbing material 266 is bonded to the peripheral edge portion of the ventilation opening 261, on the upper inner face of the machine chassis 252, so as to surround the ventilation opening 261. The shock-absorbing material 266 is made of a rubber material or any other similar material. When the shutter plate 263 is thrown up and pivoted, the shock of collision of the shutter plate 263 against the upper inner face of the machine chassis 252 is absorbed by the shock-absorbing material 266 to reduce the occurrence of undesired sound.

In the above configuration, when the engine 1 is in a driven state, cooling wind generated by the rotation of the cooling fan 9 is flown from the external-air intake port 258 toward the warm-air discharge port 259 and is brought into collision with one side face of the shutter plate 263, and this collision causes the shutter plate 263 to be thrown up, upwardly pivoted, and kept in an attitude along the upper inner face of the machine chassis 252. As a result, when the engine 1 is in a driven state, the ventilation opening 261 of the upper face of the machine chassis 252 is shut by the shutter plate 263. Further, when the engine 1 is brought to stop, the rotation of the cooling fan 9 stops and the cooling wind is not flown inside the machine chassis 252, and thus, the shutter plate 263 downwardly pivots by its weight about the pivot support shaft 265. As a result, the ventilation opening 261 of the upper face of the machine chassis 252 is opened, and even when the engine 1 is in a stop state, heated air inside the machine chassis 252 is discharged via the ventilation opening 261 by itself.

Obviously from the above description and FIGS. 21 and 22, in such an engine device including the engine 1, which drives the work unit 268, serving as the compressor or the power generator, and the exhaust-gas purification device 2, which purifies exhaust gas discharged from the engine 1, the cooling fan 9 is disposed at one side of the engine 1; while, at the other side of the engine 1, the flywheel housing 10 is disposed, the work unit 268 is coupled to the flywheel 11, included in the flywheel housing 10, so as to allow the power of the engine 1 to be transferred to the work unit 268, the exhaust-gas purification device 2 is secured to the upper-face side of the flywheel housing 10, and the exhaust-gas purification device 2 is located above the work unit 268. Accordingly, the exhaust-gas purification device 2 is highly rigidly supported by the flywheel housing 10, which is a highly rigid component of the engine 1, and this configuration reduces the damage on the exhaust-gas purification device 2 due to the vibration and any other damage cause. Further, a space above the work unit 268 is utilized as an installation space of the exhaust-gas purification device 2, and this configuration increases the utilization efficiency of an inside space of the machine chassis 252, which contains the engine device.

Obviously from the above description and FIGS. 21 and 22, the configuration is made such that the shutter plate 263, which opens/shuts the ventilation opening 261, is disposed inside the machine chassis 252, and when the engine 1 is in a driven state, the shutter plate 263 is shut by cooling wind from the cooling fan 9, and when the engine 1 is in a stop state, the shutter plate 263 opens by its weight. Accordingly, when the engine 1 is in a driven state, this configuration certainly blocks the invasion of dust and any other fine material into the machine chassis 252 through the ventilation opening 261. After the engine 1 has entered a stop state, heated air generated in the exhaust-gas purification device 2 is discharged to the outside of the machine chassis 252 via the ventilation opening 261, and this configuration reduces the occurrence of a situation in which the heated air is confined inside the machine chassis 252. Thus, this configuration reduces the occurrence of heat damage on the exhaust-gas purification device 2 itself, the machine chassis 252, and any other component.

Figure 23:
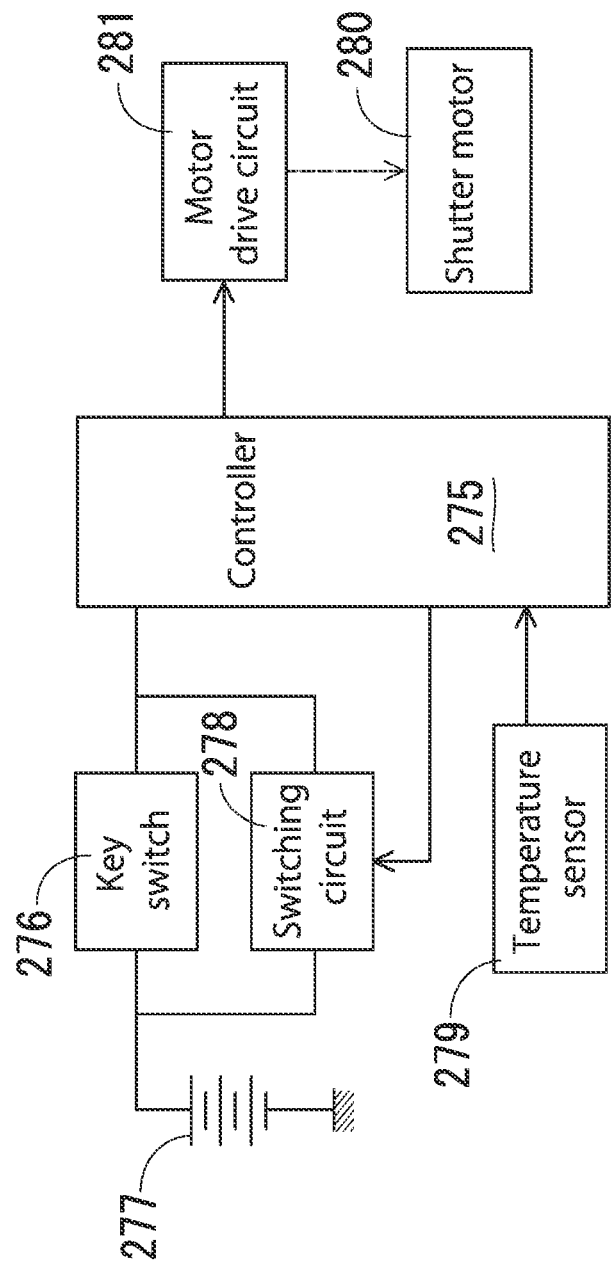
FIG. 23 is a functional block diagram of a controller.

FIG. 23 is a functional block diagram illustrating opening/shutting control of the shutter plate 263 in the stationary work machine, the another embodiment of a work machine. A controller 275 is disposed in the operation panel 257 of the machine chassis 252. This controller 275 performs ON/OFF of a key switch 276 and performs opening/shutting control of the shutter plate 263 on the basis of temperature inside the machine chassis 252. The controller 275 includes a central processing unit (CPU), storage units, and any other component. The key switch 276 is used for supplying electric power to the controller 275, and a battery 277 is coupled to the controller 275 via this key switch 276. A switch circuit 278 is coupled in parallel to the key switch 276 between the battery 277 and the controller 275. This switch circuit 278 is capable of supplying electric power to the controller 275 via a bypass in accordance with a command from the controller 275. A temperature sensor 279 is coupled to the input side of the controller 275. This temperature sensor 279 serves as a temperature detection member for detecting temperature inside the machine chassis 252. A motor drive circuit 281 is coupled to the output side of the controller 275. The motor drive circuit 281 drives a shutter motor 280, and this shutter motor 280 serves as an actuator for driving the opening/shutting of the shutter plate 263. Although detailed illustration is omitted, the shutter motor 280 is coupled to the pivot support shaft 265 of the shutter plate 263 so as to be able to transfer the rotation power of the shutter motor 280 itself to the pivot support shaft 265.

In the above configuration, upon ON-operation of the key switch 276 by an operator to start the engine 1, the shutter motor 280 is driven in, for example, a normal rotation direction in accordance with a command from the controller 275 so as to cause the shutter plate 263 to be thrown up, upwardly pivoted about the pivot support shaft 265, and kept in an attitude along the upper inner face of the machine chassis 252. As a result, when the engine 1 is in a driven state, the ventilation opening 261 of the upper face of the machine chassis 252 is shut by the shutter plate 263. Meanwhile, upon OFF-operation of the key switch 276 by the operator to stop the engine 1, the operation of the controller 275 is allowed to be maintained for a predetermined period of time by a bypass power supply through the switching circuit 278, and the shutter motor 280 is driven in, for example, a reverse rotation direction in accordance with a command from the controller 275 to cause the shutter plate 263 to be downwardly pivoted about the pivot support shaft 265. As a result, the ventilation opening 261 of the upper face of the machine chassis 252 is opened, and after the engine 1 has entered a stop state, heated air inside the machine chassis 252 is discharged via the ventilation opening 261 by itself. Upon elapse of the predetermined period of time from the OFF-operation of the key switch 276, the switching circuit 278 enters an OFF-state, and the controller 275 stops its own power consumption during a period until a next ON-operation of the key switch 276.

Further, when the engine 1 is in a driven state, the temperature sensor 279 detects that a temperature inside the machine chassis 252 is higher than or equal to a predetermined temperature (i.e., a high temperature), the shutter motor 280 is driven in, for example, a reverse direction in accordance with a command from the controller 275 to cause the shutter plate 263 to be downwardly pivoted about the pivot support shaft 265. As a result, the shutter plate 263 is opened, and external air is guided and introduced into the machine chassis 252 by an amount equivalent to a shortage amount of cooling wind from the cooling fan 9. This configuration, therefore, reduces the occurrence of an excess rise of ambient temperature of the exhaust-gas purification device 2. When the temperature sensor 279 detects that the temperature inside the machine chassis 252 is lower than the predetermined temperature, the shutter motor 280 is driven by in, for example, a normal rotation direction in accordance with a command from the controller 275 to cause the shutter plate 263 to be thrown up, upwardly pivoted about the pivot support shaft 265, and shut.

Obviously from the above description and FIGS. 21 to 23, in such a stationary work machine including the work unit 268, serving as the compressor or the power generator, the engine device, and the machine chassis 252, which contains the work unit 268 and the engine device, the ventilation opening 261, which allows communication between the inside and the outside of the machine chassis 252, is disposed in the upper face of the machine chassis 252, the exhaust-gas purification device 2 is allowed to face the ventilation opening 261 from below, and an actuator 280, which drives the opening/shutting of the shutter plate 263, is disposed. Further, the configuration is made such that, upon ON-operation of the key switch 276 by the actuator 280, the shutter plate 263 is shut, and upon OFF-operation of the key switch 276 by the actuator 280, the shutter plate 263 is opened. Accordingly, when the engine 1 is in a driven state, this configuration certainly blocks the invasion of dust and any other fine material into the machine chassis 252 through the ventilation opening 261. After the engine 1 has entered a stop state, heated air generated in the exhaust-gas purification device 2 is discharged to the outside of the machine chassis 252 via the ventilation opening 261, and this configuration reduces the occurrence of a situation in which heated air is confined inside the machine chassis 252. This configuration reduces the occurrence of heat damage on the exhaust-gas purification device 2 itself, the machine chassis 252, and any other component.

Figure 24:
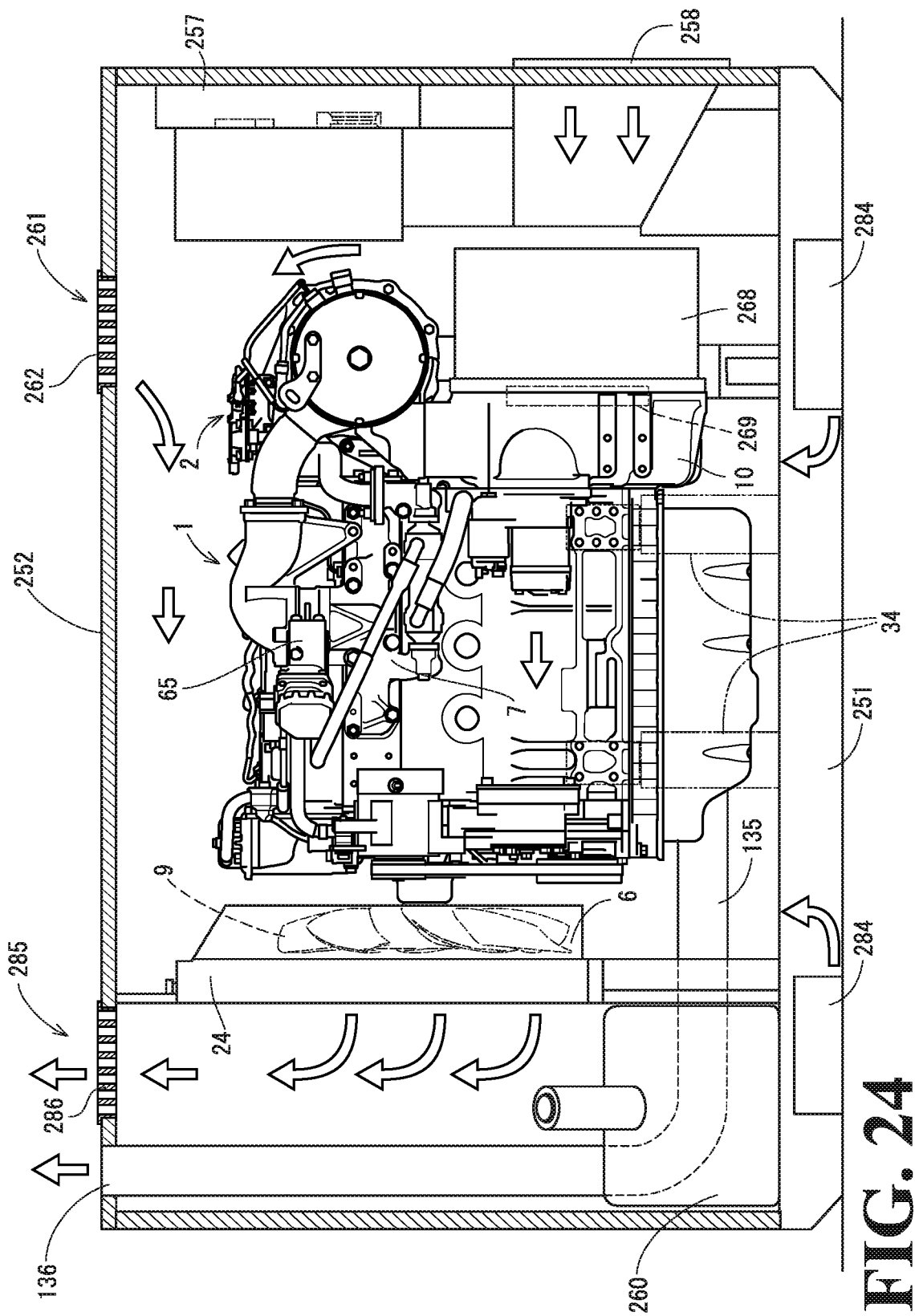
FIG. 24 is a side, cross-sectional view of a stationary work machine in which a shutter plate is omitted.
Figure 25:
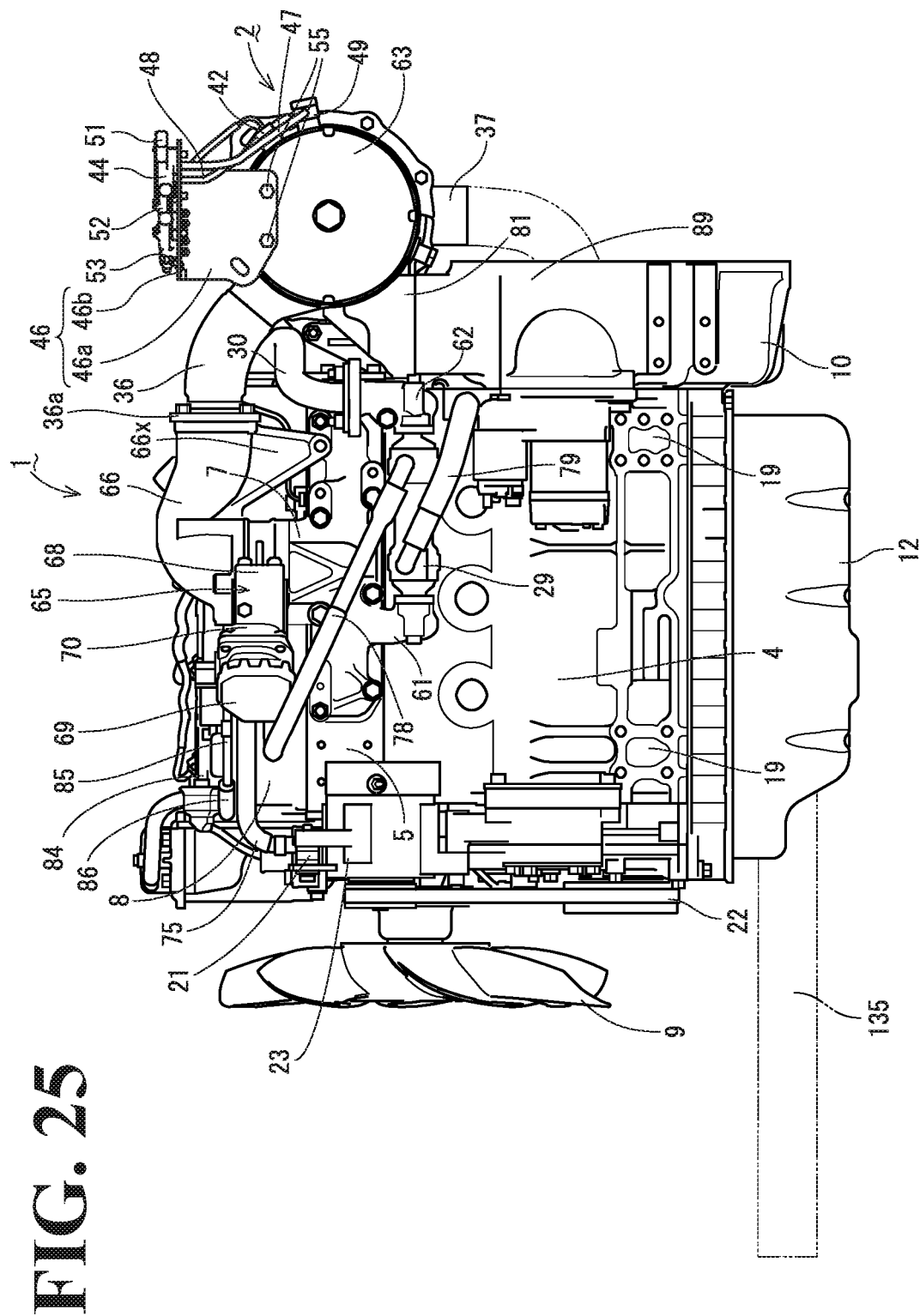
FIG. 25 is a left side view of a diesel engine, further another embodiment of the present invention.
Figure 26:
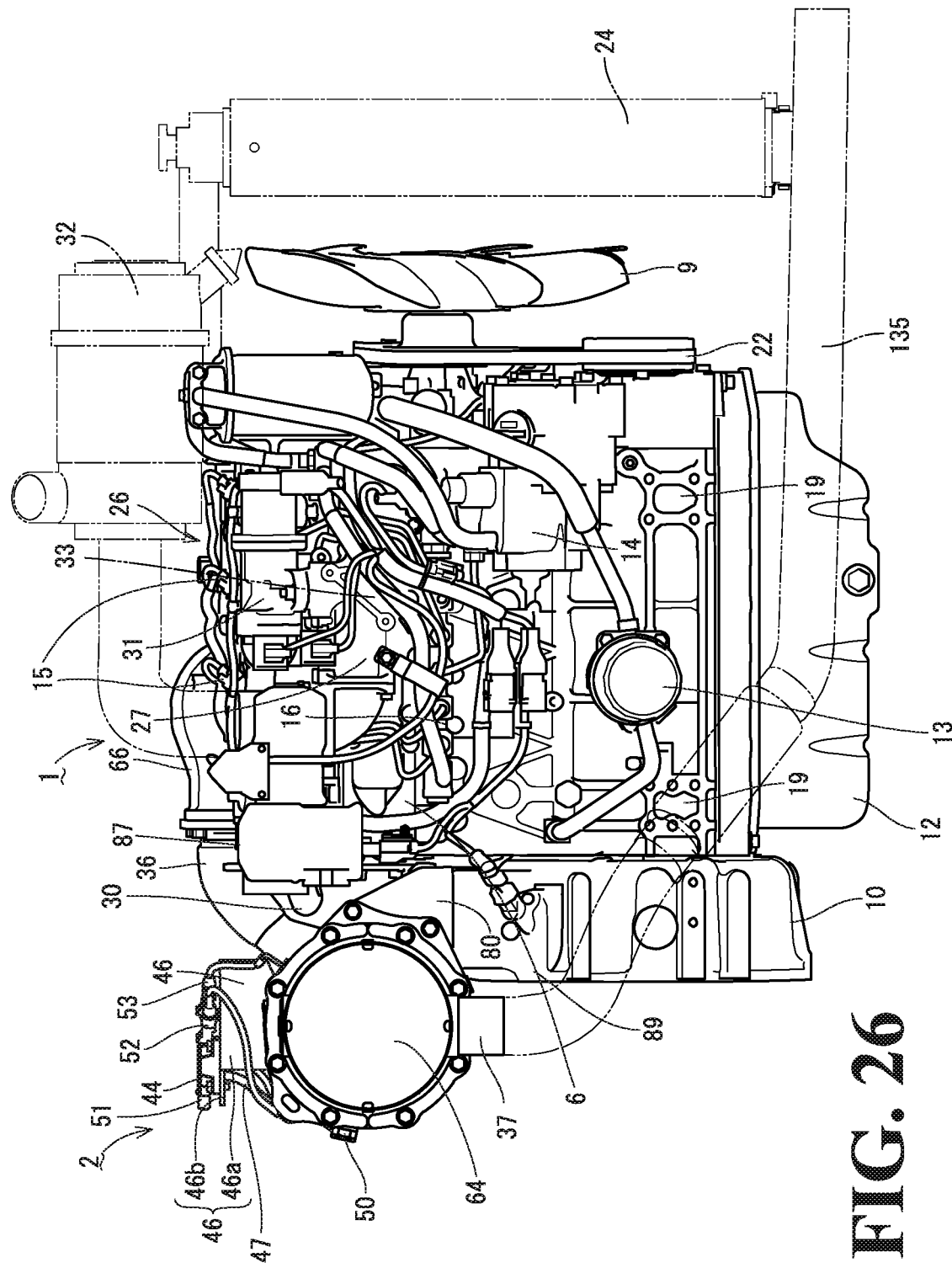
FIG. 26 is a plan view of the diesel engine.
Figure 27:
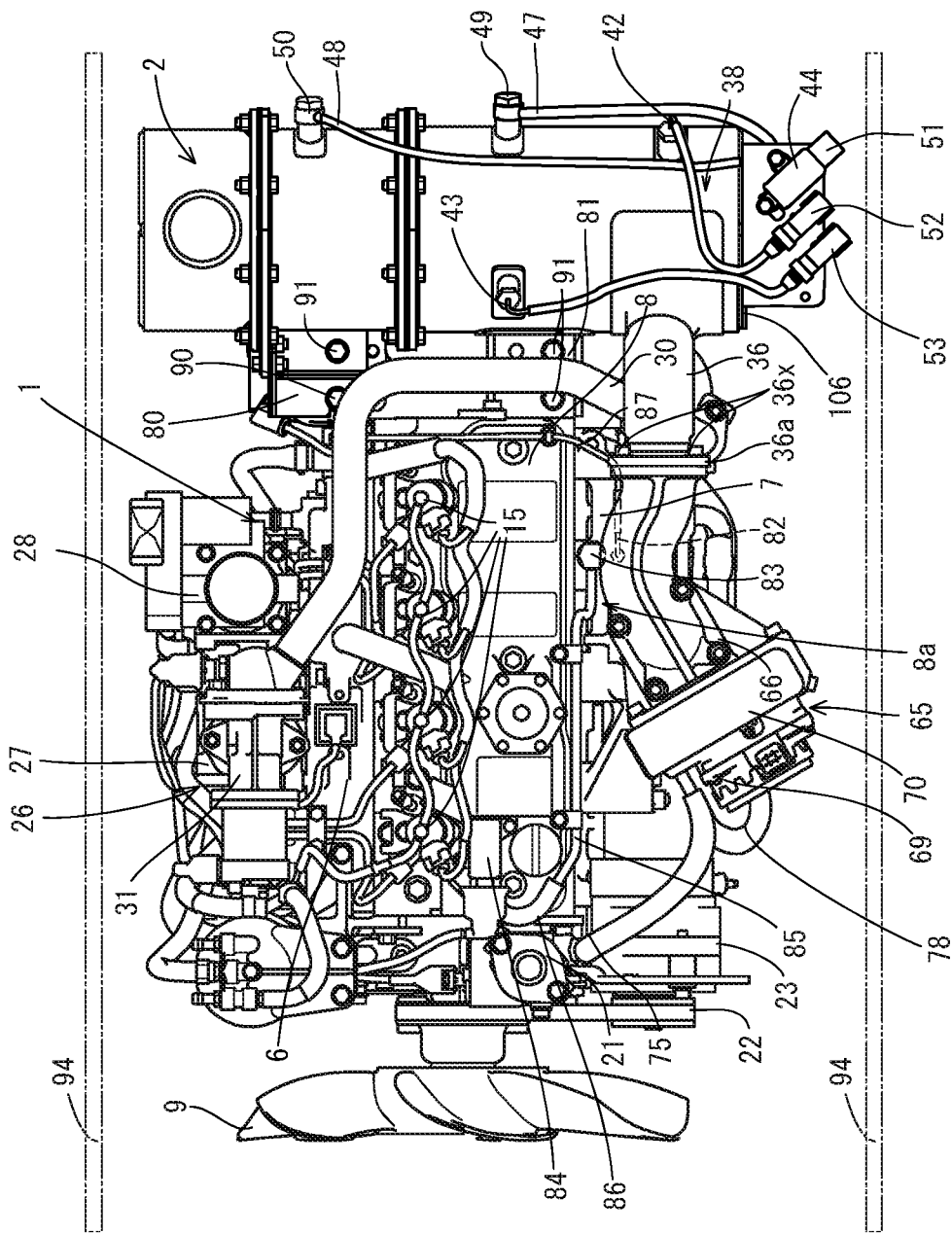
FIG. 27 is a perspective plan view of the diesel engine.
Figure 28:
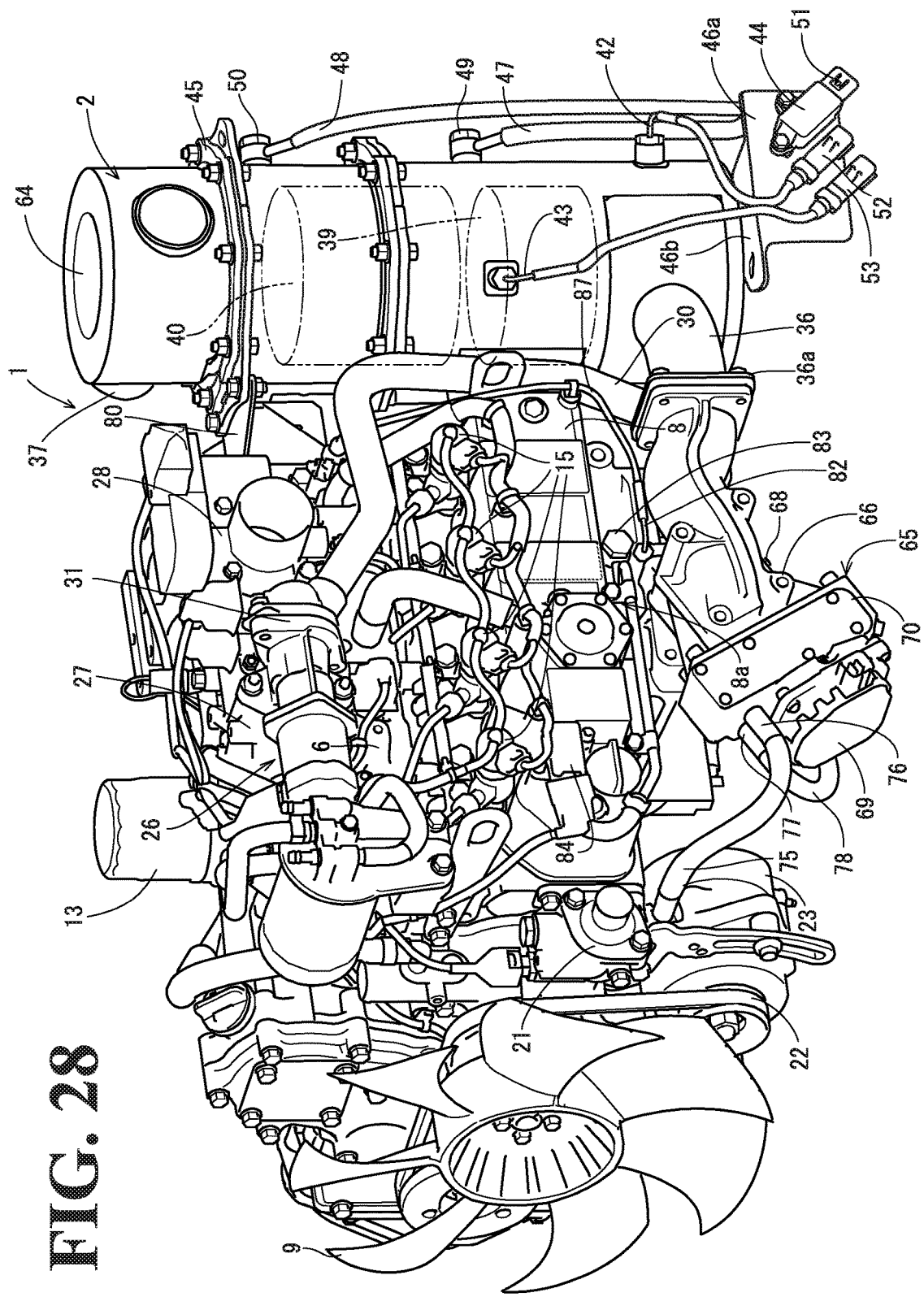
FIG. 28 is an external perspective plan view of an exhaust-gas purification device mounted in the diesel engine.
Figure 29:
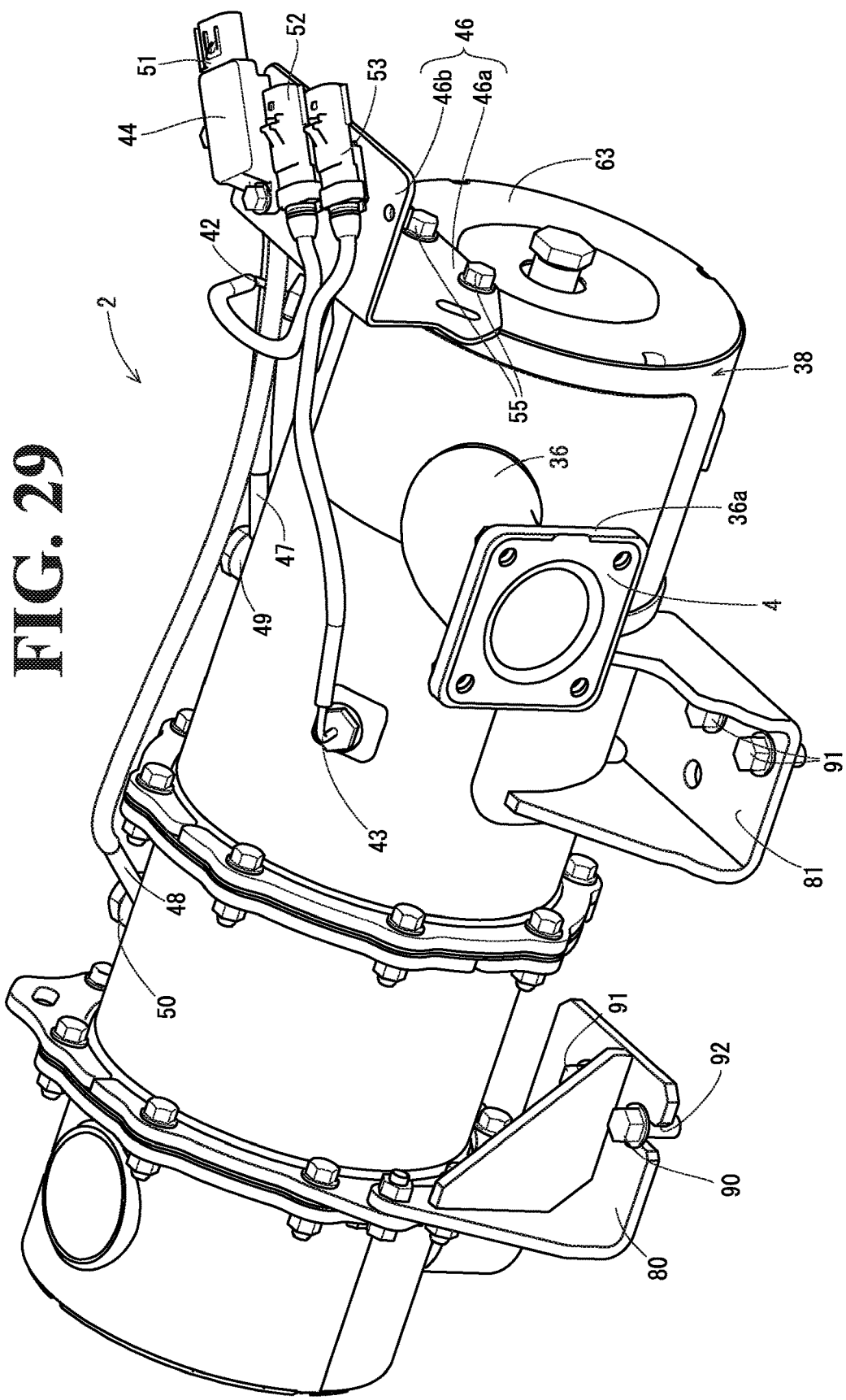
FIG. 29 is a plan, cross-sectional view of a stationary work machine.

For example, as shown in FIG. 24, the shutter plate 263, for use in the opening/shutting the ventilation opening 261, may be omitted. As shown in FIG. 24, in such a stationary work machine including the work unit 268, serving as the compressor or the power generator, the engine device, and the machine chassis 252, which contains the work unit 268 and the engine device, when the ventilation opening 261, which allows communication between the inside and the outside of the machine chassis 252, is disposed in the upper face of the machine chassis 252, and the exhaust-gas purification device 2 is allowed to face the ventilation opening 261 from below, excessively heated air generated in the exhaust-gas purification device 2 is discharged to the outside of the machine chassis 252 via the ventilation opening 261, and thus, this configuration contributes to the optimization of a heat balance inside the machine chassis 252.

Next, an engine device according to further another embodiment of the present invention will be described with reference to FIGS. 25 to 29. In the engine device, according to this further another embodiment, a differential sensor 44 is supported together with electric wiring connectors 52 and 53 for temperature sensors 42 and 43 by an approximately L-shaped sensor bracket (a sensor support member) 46. The differential sensor 44 integrally includes an electric wiring connector 51. The sensor bracket 46 is attachably/detachably secured to an upstream-side cover 63. A vertical plate portion of the sensor bracket 46 is bolted with bolts 55 to a sensor support portion provided on the upper side of the upstream-side cover 63.

The sensor bracket 46 includes a coupling portion 46a and a sensor mounting portion 46b. The coupling portion 46a is a vertical plate portion mechanically coupled to the upstream-side cover 63. The sensor mounting portion 46b is bent relative to the coupling portion 46a, and supports the differential sensor 44 and the connectors 52 and 53. The sensor bracket 46 allows the supporting portion 46a to extend from the outer circumference side (i.e., the outer radius side) of an exhaust-gas purification case 38 so as to allow the sensor mounting portion 46b to be disposed at a position above the exhaust-gas purification case 38. The sensor mounting portion 46b includes tube coupling portions on its lower face facing the outer circumference face of the exhaust-gas purification case 38. The tube coupling portions protrude from the lower face of the sensor mounting portion 46b, and are coupled to sensor tubes 47 and 48 for the differential sensor 44. The upper face of the sensor mounting portion 46b is directed opposite a direction toward the outer circumference face of the exhaust-gas purification case 38, and the differential pressure sensor 44 and the connectors 51 to 53 are supported by the upper face of the sensor mounting portion 46b.

The sensor bracket 46 supports the differential pressure sensor 44 and the connectors 51 to 53 on the upper face, which is directed opposite a direction toward an exhaust-gas purification device 2, to block radiant heat from the exhaust-gas purification device 2. Accordingly, the differential sensor 44 and the connectors 51 to 53 are disposed at positions distanced from the exhaust-gas purification device 2, and this configuration reduces the influence of radiant heat from the exhaust-gas purification case 38 on the above electrical components, and as a result, reduces their malfunctions due to the heat.

The sensor bracket 46 allows the sensor mounting portion 46b to extend from the upper edge side of the coupling portion 46a in a direction outwardly from the exhaust-gas purification device 2 (i.e., in a direction outwardly from the upstream side in the exhaust-gas movement direction). The sensor bracket 46 allows the upper face of the sensor mounting portion 46b to support the differential sensor 44 and the connectors 51 to 53 to allow the differential sensor 44 and the connectors 51 to 53 to be disposed at positions distanced from the exhaust-gas purification device 2. That is, the differential sensor 44 and the connectors 51 to 53 are disposed at positions located at the right side of an upstream-side end face 63 (i.e., the upstream-side cover 63) of the exhaust-gas purification case 38 and located above the outer circumference face of the exhaust-gas purification case 38 (the outer circumference face of a catalyst case 39a).

The sensor bracket 46, which is mechanically coupled to the upstream-side cover 38 of the exhaust-gas purification case 38, supports the differential pressure sensor 44 and the connectors 51 to 53 to allow the differential pressure sensor 44 and the connectors 51 to 53 to be disposed at a more upstream side than a diesel oxidation catalyst 39 in the exhaust-gas movement direction. The sensor bracket 46 allows electrical components including the differential sensor 44, the connectors 51 to 53, and any other electric component to be disposed at a more upstream side than the diesel oxidation catalyst 39, having a small heat capacity, and thus, this configuration reduces the influence of heat from the exhaust-gas purification device 2 on the electrical components.

As described above, the sensor bracket 46 (the support bracket) is secured to the upstream-side end face (i.e., the upstream-side cover) 63 of the exhaust-gas purification device 2. Electronic components including the differential sensor 44, the connectors 51 to 53, and any other electrical component are disposed at positions located at the outside of the exhaust-gas purification device 2 and located at the upstream side in the exhaust-gas movement direction inside the exhaust-gas purification device 2. The sensor bracket 46, which is mechanically coupled to one end face of the exhaust-gas purification case 38, included in the exhaust-gas purification device 2, allows the electronic components including the differential sensor 44, the connectors 51 to 53, and any other electrical component to be disposed at positions at the outside of the exhaust-gas introduction portion (the purification inlet tube 36). The electrical components are disposed at positions located at a more upstream side than the exhaust-gas purification device 2 and located at positions distanced from the exhaust-gas purification device 2, and thus, this configuration reduces the influence of conductive heat and radiant heat from the exhaust-gas purification device 2, and as a result, reduces the malfunction of the electrical components due to the heat.

Figure 30:
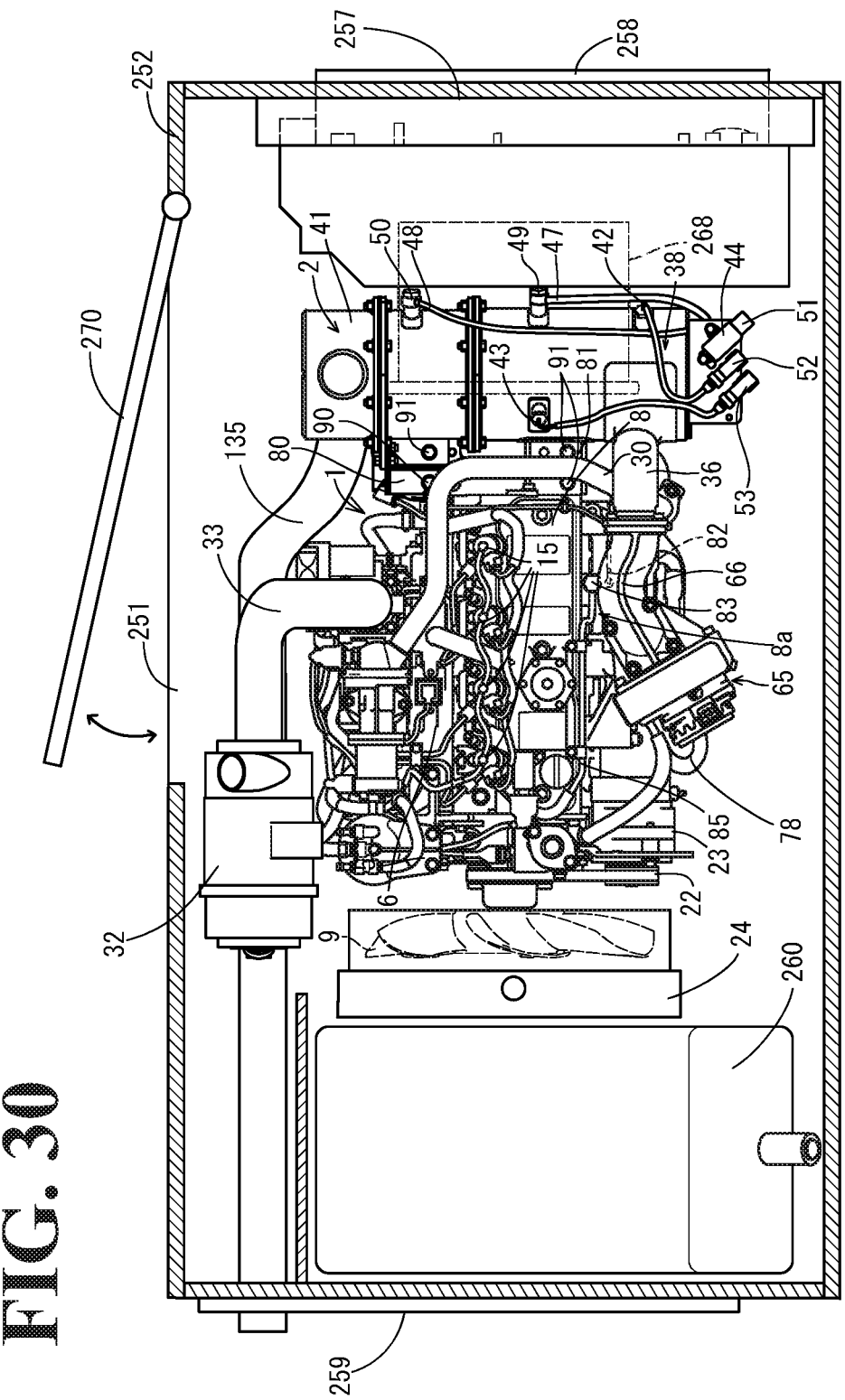
FIG. 30 is a side, cross-sectional view of the stationary work machine.
Figure 31:
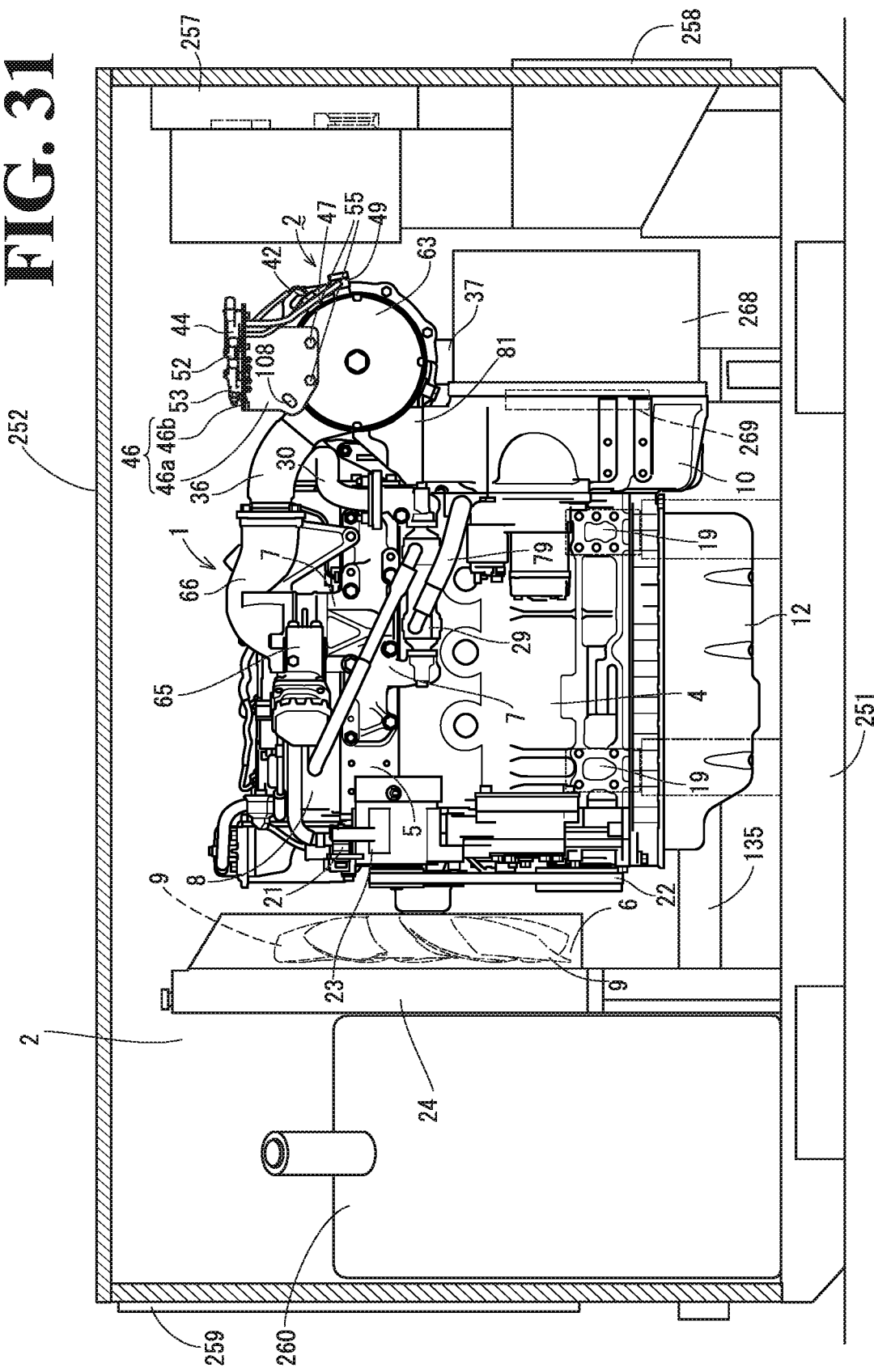
FIG. 31 is a right side view of the diesel engine, further another embodiment of the present invention.

FIGS. 30 and 31 are diagrams illustrating an exemplary engine generator serving as a stationary work machine and including the engine device according to the another embodiment, shown in FIGS. 25 to 29. The detailed configuration of this engine generator is basically similar to the configurations of the foregoing embodiments, and thus, detailed description of this engine generator is omitted here.

Next, the structure of a wheel loader 211 will be described with reference to FIGS. 32 and 33. In this wheel loader 211, the engine device according to the another embodiment, shown in FIGS. 25 to 29, is mounted.

Figure 32:
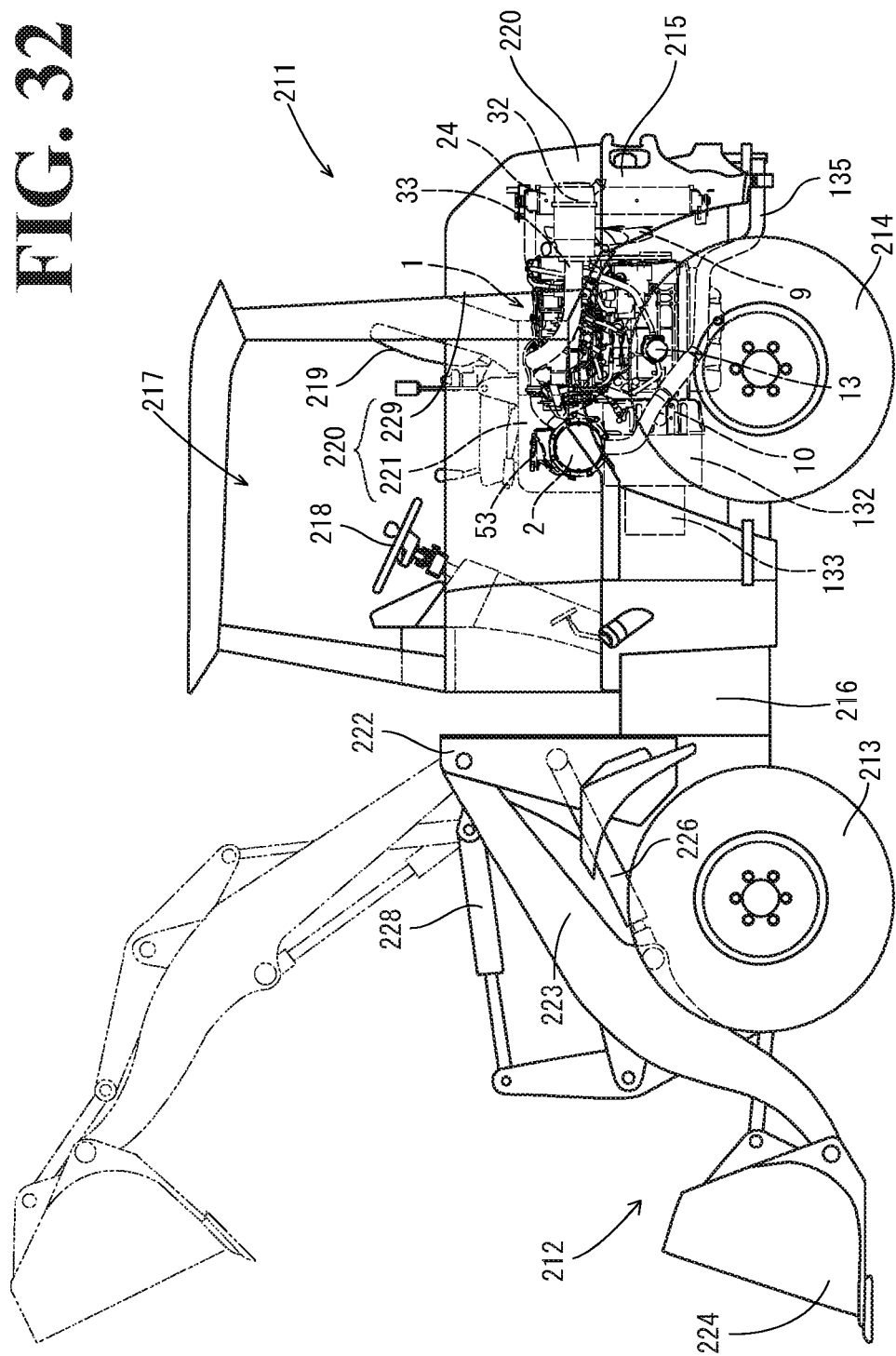
FIG. 32 is a left side view of a wheel loader, another embodiment of a work machine mounting the diesel engine, the further another embodiment of the present invention.
Figure 33:
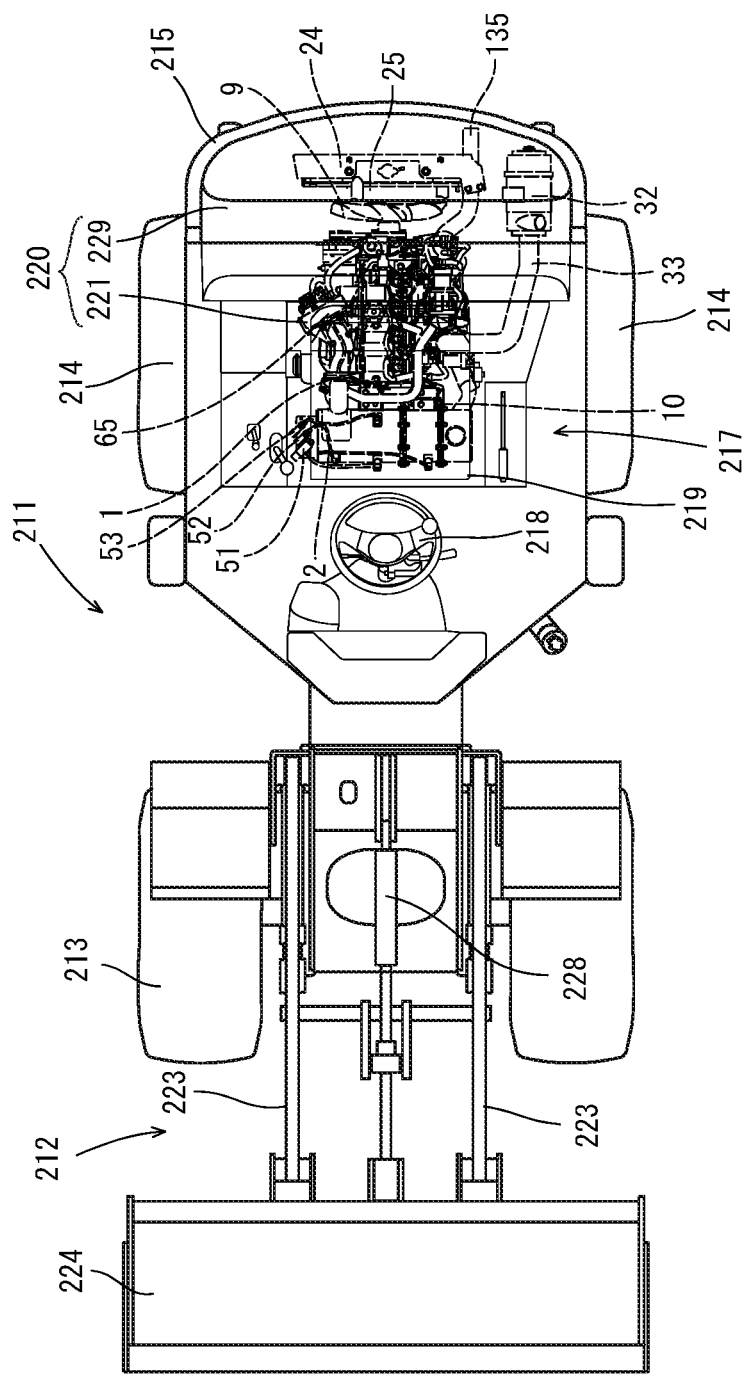
FIG. 33 is a plan view of the wheel loader.

The wheel loader 211, shown in FIGS. 32 and 33, includes a travelling machine body 216, and this travelling machine body 216 includes a pair of left and right front wheels 213 and a pair of left and right rear wheels 214. An engine 1 and a steering unit 217 are mounted in the travelling machine body 216. The wheel loader 211 is configured to mount a loader device 212, serving as a work unit, in the front-side portion of the travelling machine body 216 so as to be able to carry out loader work. The steering unit 217 includes a steering seat 219, a steering handle 218, levers/switches, and any other component. The steering seat 219 is a seat on which an operator sits, and the levers/switches serve as operation means for use in output operation of the engine 1 and any other component, and also serve as operation means for use in operation of the loader device 212.

In a front portion above the pair of front wheels 213 in the wheel loader 211, as described above, the loader device 212, serving as a work unit is disposed. The loader device 212 includes loader posts 222, a pair of left and right lift arms 223, and a bucket 224. The loader posts 222 are disposed at both of the left and right sides of the travelling machine body 216. The left and right, lift arms 223 are coupled to the upper end portions of the respective loader posts 222 so as to be upwardly and downwardly pivotable. The bucket 224 is coupled to the front end portions of the respective left and right, lift arms 223 so as to be upwardly and downwardly pivotable.

Lift cylinders 226 are disposed between the loader posts 222 and the lift arms 223, each associated with a corresponding one of the loader posts 222, to allow the lift arms 223 to pivot upwardly and downwardly. A bucket cylinder 228 is disposed between the bucket 224 and the left and right, lift arms 223 to allow the bucket 224 to pivot upwardly and downwardly. In this case, a configuration is made such that operations of loader levers (omitted from illustration) by an operator on the steering seat 219 elongate and contract the lift cylinders 226 and the bucket cylinder 228 to cause the lift arms 223 and the bucket 224 to pivot upwardly and downwardly so as to allow the loader work to be carried out.

In the wheel loader 211, configured in this way, the engine 1 is disposed below the steering seat 219, and a flywheel 10 is disposed so as to be located at the front side of the travelling machine body 216. That is, the engine 1 is disposed so as to allow the direction of an engine output to be along a front-and-back direction in which the loader device 212 and a counterweight 215 are arranged. Further, at the back side of the engine 1, an oil cooler 25 and a radiator 24 are arranged in order from the front side in a portion located at the back side of the cooling fan 9 and facing the cooling fan 9.

The exhaust-gas purification device 2 allows its purification inlet tube 36 to be directly coupled to an exhaust outlet 71 of an exhaust manifold 7 disposed at the right side of the engine 1. The exhaust-gas purification device 2 is disposed so as to allow the movement direction of the exhaust gas from the exhaust manifold 7 to be the same as the disposition direction of the exhaust-gas purification device 2. That is, the exhaust gas, which is flown into the exhaust-gas purification case 38 from the purification inlet tube 36, is flown from the right side to the left side inside the purification case 38 so as to allow particulate matter (PM) to be removed. Further, the purified exhaust gas is emitted to the outside of the machine through a tail pipe 135. The tail pipe 135 is coupled to the lower left-side face of the exhaust-gas purification device 2.

Further, the engine 1 is coupled to an air cleaner 32 at the left side of the engine 1. The air cleaner 32 suctions fresh air (external air). Further, the air cleaner 32 is disposed at a position located at the back left side of the engine 1 and located distanced from the exhaust-gas purification device 2, heated by exhaust heat based on the exhaust gas. That is, the air cleaner 32 is disposed at a position located at the left side of the radiator 24, disposed behind the engine 1, and uninfluenced by the heat from the exhaust-gas purification device 2.

The engine 1, the exhaust-gas purification device 2, the radiator 24, and the air cleaner 32, each of which is disposed below or behind the steering seat 219 in such a manner described above, covered by a bonnet 220. The bonnet 220 is disposed at the upper side of the counterweight 215. The bonnet 220 serves as a seat frame (a front cover portion) 221 and a bonnet cover (a protruding cover portion) 229. The seat frame 221 protrudes from a floor face of the steering unit 217; while the bonnet cover 229 is openable/closable, and is constituted by a front-side portion inside the steering unit 217 and a back-side portion outside the steering unit 217.

That is, the covering of the seat frame 221 on the upper front portion of the engine 1 leads to covering of the seat frame 221 on the exhaust-gas purification device 2 disposed at the upper front side of the engine 1. Additionally, the bonnet cover 229 has the shape that allows covering from the upper back portion of the engine 1 toward the back side of the engine 1, and this configuration leads to covering of the bonnet cover 229 on the radiator 24 and the oil cooler 25, which are disposed at the back side of the engine 1.

The steering seat 219 is attachably/detachably disposed above the seat frame 221 of the bonnet 220. This configuration allows the upper face of the seat frame 221 to be opened when the steering seat 219 is detached from the steering frame 221, and thus, facilitates the maintenance of the engine 1, the exhaust gas purification device 2, and any other component, which are disposed under the seat frame 221. It is to be noted that, without limited to the configuration, which allows the steering seat 219 to be attachable/detachable, a configuration that allows the steering seat 219 to be inclined forward above the seat frame 221 to allow the upper face of the seat frame 221 to be opened may be employed. In this case, a different configuration that allows the seat frame 221 itself, to which the steering seat 219 is fixed, to be inclined forward to allow the upper side of the engine 1 and any other component to be opened may be also employed.

This configuration, in which the bonnet 220 is provided with the seat frame 221, which enables its upper face to be opened, at the front side of the bonnet 220 itself, allows the seat frame 1 to cover the exhaust-gas purification device 2, which is disposed at the upper front side of the engine 1. This configuration, therefore, reduces the lowering of ambient temperature of the exhaust-gas purification device 2 due to wind and rain, and any other cause, and thus, facilitates keeping the ambient temperature of the exhaust-gas purification device 2 to an appropriate temperature. Further, this configuration reduces the possibility that a worker touches the exhaust-gas purification device 2. Moreover, this configuration allows the upper front side of the engine 1 to be opened when the upper face of the seat frame 221 is opened, and thus, facilitates the access to the exhaust-gas purification device 2, which is disposed at the upper front side of the engine 1, so as to facilitate maintenance work.

Meanwhile, at the back side of the seat frame 211, the bonnet 220 is provided with the bonnet cover 229, protruding upwardly from the upper face of the seat frame 221. The configuration, in which the bonnet cover 229 is disposed at the upper side of the counterweight 215, allows the bonnet cover 229 to cover the radiator 24 and the oil cooler 25, which are disposed at the back side of the engine 1, and to be openable/closable.

The engine 1 allows a mission case 132 to be coupled to the engine 1 itself at the front side of the flywheel housing 10. The power of the diesel engine 1 is transmitted to a mission case 132 via the flywheel 11. In the mission case 132, the power is appropriately gear-changed, and then is transmitted to the front wheels 122, the rear wheels 214, and a hydraulic drive source 133 for the lift cylinders 226, the bucket cylinder 228, and any other component.

The individual configurations in the present invention are not limited to the illustrated embodiments, and may be variously changed within the scope not departing the gist of the present invention.

The embodiments of the present invention relates to an engine device mounting an exhaust-gas purification device for removing particulate matter (soot) and any other exhaust gas constituent, and a stationary work machine provided with the exhaust-gas purification device.

What is claimed is:

1. An engine device comprising:
   an engine;
   an exhaust-gas purification device configured to purify exhaust gas from the engine;
   at least one electrical component configured to detect a state of the exhaust-gas purification device; a support bracket secured to an exhaust-gas purification case of the exhaust-gas purification device, the support bracket configured to support the at least one electrical component at a position outside the exhaust-gas purification device;
   a cooling-water circulation mechanism configured to circulate cooling water for cooling the engine, wherein a portion of the cooling water circulated by the cooling-water circulation mechanism cools the at least one electrical component; and
   a cooling-water supply tube which extends from the engine to outside of the engine to a location proximate to the electrical component,
   wherein the cooling-water supply tube is:
     disposed on the support bracket at a position between the at least one electrical component and the exhaust-gas purification device; and
     configured to enable the portion of the cooling water, circulated by the cooling-water circulation mechanism, to flow in the cooling-water supply tube.

2. The engine device according to claim 1, further comprising:
   the exhaust-gas purification case; and
   wherein the at least one electrical component is disposed on the support bracket.

3. The engine device according to claim 1, further comprising:
   a flywheel housing disposed at one side of the engine; and
   a crankshaft for the engine,
   wherein the exhaust-gas purification device is disposed on the flywheel housing and is configured such that a longitudinal direction of the exhaust-gas purification device is perpendicular to a longitudinal direction of the crankshaft.

4. The engine device according to claim 1, wherein the exhaust gas moves from an upstream side to a downstream side of the exhaust-gas purification device, and wherein the at least one electrical component is disposed outside of the exhaust-gas purification device and proximate to the upstream side of the exhaust-gas purification device.

5. The engine device according to claim 1, further comprising a radiator.

6. The engine device according to claim 1, wherein the engine is arranged in a position between the at least one electrical component and the exhaust-gas purification device.

7. The engine device according to claim 1, wherein the at least one electrical component comprises a differential pressure sensor.

8. The engine device according to claim 4, further comprising:
   an exhaust manifold disposed at one side of the engine;
   an exhaust-gas introduction unit coupling the exhaust-gas purification device to the exhaust manifold; and
   the exhaust-gas purification case included in the exhaust-gas purification device; and
   wherein the support bracket secured to an end face of the exhaust-gas purification case; and
   wherein the at least one electrical component is disposed at a position outside the exhaust-gas introduction unit.

9. The engine device according to claim 1, further comprising:
   a cooling fan disposed at one side of the engine;
   a flywheel housing disposed at another side of the engine; and
   a flywheel disposed inside the flywheel housing,
   wherein the flywheel is coupled to a work unit and is configured to transfer power of the engine to the work unit, and
   wherein the exhaust-gas purification device is disposed at an upper-face side of the flywheel housing such that the exhaust-gas purification device is located above the work unit.

10. A stationary work machine comprising:

the engine device according to claim 9;

the work unit, which comprises a compressor or a power generator;

a chassis containing the work unit and the engine device, and a ventilation opening disposed at an upper face of the chassis and configured to connect an inside and an outside of the chassis, wherein the exhaust-gas purification device is arranged to face the ventilation opening from below.

11. The stationary work machine according to claim 10, further comprising a shutter plate arranged inside the chassis and configured to open and shut the ventilation opening, wherein the shutter plate is configured to receive wind from the cooling fan and close the ventilation opening when the engine is in a driven state, and wherein the shutter plate is configured to open the ventilation opening with the weight of the shutter plate when the engine is in a stop state.

12. The stationary work machine according to claim 10, further comprising:

a shutter plate configured to open and close the ventilation opening;

a key switch having a first position and an second position; and an actuator configured to drive the shutter plate to close the ventilation opening when the key switch in in the first position and configured to drive the shutter plate to open the ventilation opening when the key switch is in the second position.

13. A station work machine comprising:

a work unit comprising a compressor or a power generator;

an engine;

a chassis containing the work unit and the engine;

a cooling fan disposed at one side of the engine;

a flywheel housing disposed at another side of the engine; and a flywheel disposed inside the flywheel housing, the flywheel coupled to the work unit and configured to transfer power of the engine to the work unit;

a ventilation opening disposed at an upper face of the chassis and configured to connect an inside and an outside of the chassis; and an exhaust-gas purification device configured to purify exhaust gas from the engine, wherein the exhaust-gas purification device is:

disposed at an upper-face side of the flywheel housing such that the exhaust-gas purification device is located above the work unit; and arranged to face the ventilation opening from below;

at least one electrical component configured to detect a state of the exhaust-gas purification device;

a cooling-water circulation mechanism configured to circulate cooling water for cooling the engine, wherein a portion of the cooling water circulated by the cooling-water circulation mechanism cools the at least one electrical component; and a shutter plate arranged inside the chassis and configured to:

open the ventilation opening with the weight of the shutter plate when the engine is in a stop state; or receive wind from the cooling fan and close the ventilation opening when the engine is in a driven state.

14. The stationary work machine according to claim 13, wherein the at least one electrical component comprises a differential pressure sensor.

15. The stationary work machine according to claim 13, further comprising:

a cooling-water supply tube which extends from the engine to outside of the engine to a location proximate to the electrical component.

16. The stationary work machine according to claim 13, further comprising:

a key switch; and an actuator configured to drive the shutter plate based on a position of the key switch.

17. The stationary work machine according to claim 16, wherein:

the actuator is configured to drive the shutter plate to close the ventilation opening when the key switch in in a first position.

18. The stationary work machine according to claim 17, wherein:

the actuator is configured to drive the shutter plate to open the ventilation opening when the key switch is in a second position.

* * * * *